United States Patent [19]

Shimizu et al.

[11] Patent Number: 5,694,264
[45] Date of Patent: Dec. 2, 1997

[54] RECORDING AND/OR REPRODUCING APPARATUS HAVING NO CAPSTAN AND NO PINCH ROLLER AND METHOD OF CONTROLLING THE SAME

[75] Inventors: Kunio Shimizu, Chiba; Yoshitomo Nakano, Tokyo, both of Japan

[73] Assignee: Sony Corporation, Tokyo, Japan

[21] Appl. No.: 558,153

[22] Filed: Feb. 12, 1996

Related U.S. Application Data

[62] Division of Ser. No. 92,864, Jul. 19, 1993, Pat. No. 5,502,602.

[30] Foreign Application Priority Data

| Jul. 21, 1992 | [JP] | Japan | 4-214727 |
| Jul. 21, 1992 | [JP] | Japan | 4-214728 |
| Jul. 21, 1992 | [JP] | Japan | 4-214729 |
| Jul. 21, 1992 | [JP] | Japan | 4-214730 |
| Jul. 21, 1992 | [JP] | Japan | 4-214731 |

[51] Int. Cl.$^6$ .................................................. G11B 15/52
[52] U.S. Cl. ......................... 360/73.14; 242/334.4; 360/73.09
[58] Field of Search ................................ 360/71, 73.01, 360/73.04, 73.05, 73.07, 73.08, 73.09, 73.14, 73.11; 242/334.4

[56] References Cited

U.S. PATENT DOCUMENTS

| 4,224,645 | 9/1980 | Mauch | 360/73.09 X |
| 4,400,745 | 8/1983 | Shu | 360/73.11 X |
| 4,916,560 | 4/1990 | Kawaguchi | 360/73.11 X |
| 5,166,841 | 11/1992 | Wakiyama et al. | 360/73.14 |
| 5,356,088 | 10/1994 | Fujisawa et al. | 242/334.4 |

*Primary Examiner*—Andrew L. Sniezek
*Attorney, Agent, or Firm*—Jay H. Maioli

[57] ABSTRACT

A recording and/or reproducing apparatus which includes no pinch roller and no capstan and wherein the converging time to a rated speed upon starting of feeding of a tape can be reduced and the tape can be fed stably at the rated speed during recording and/or reproduction of the tape. A rotary encoder for detecting a period of rotation is disposed between a recording and/or reproducing head and a take-up side reel, and a deviation from a predetermined reference value or a feeding position of the tape is calculated from the period of rotation detected by the rotary encoder.

5 Claims, 42 Drawing Sheets

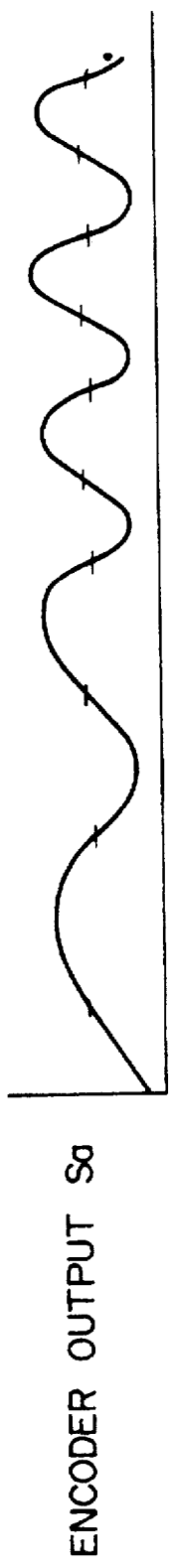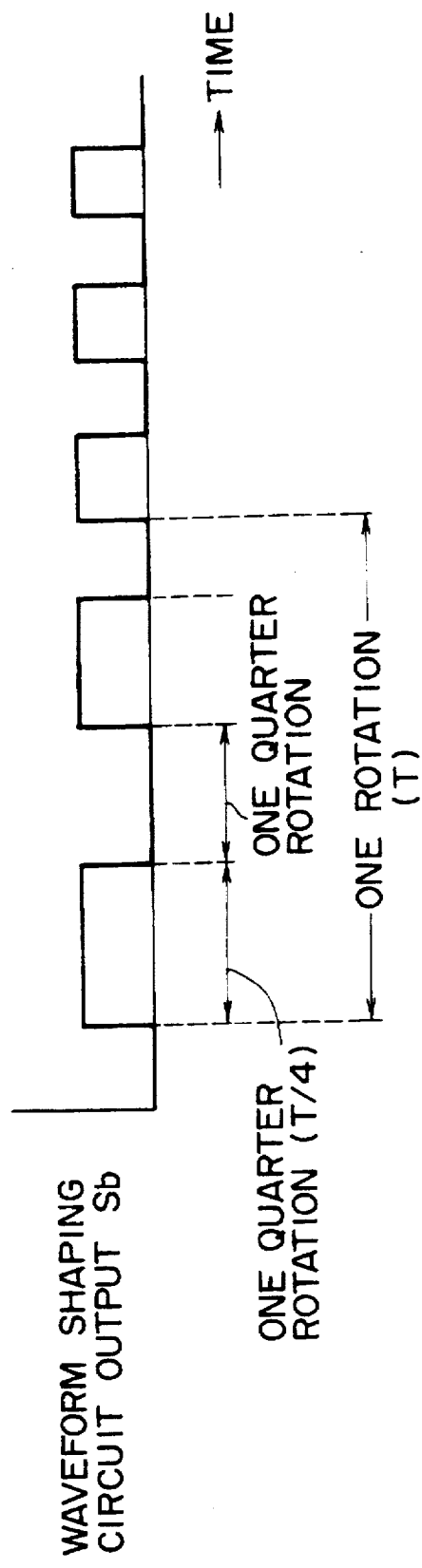
FIG. 11(a) ENCODER OUTPUT Sa
FIG. 11(b) WAVEFORM SHAPING CIRCUIT OUTPUT Sb

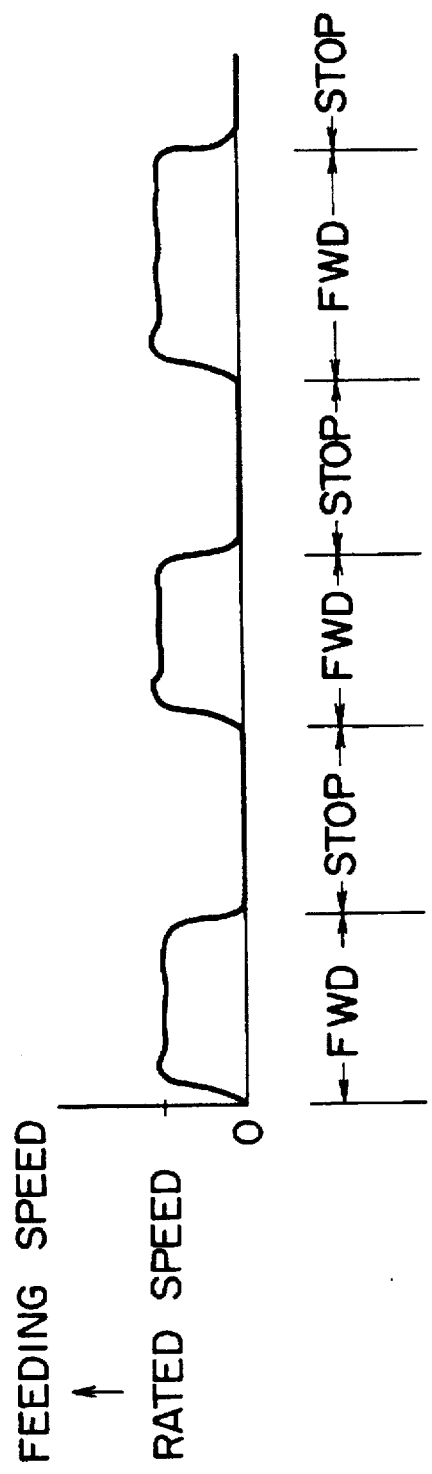
F I G. 19(a)
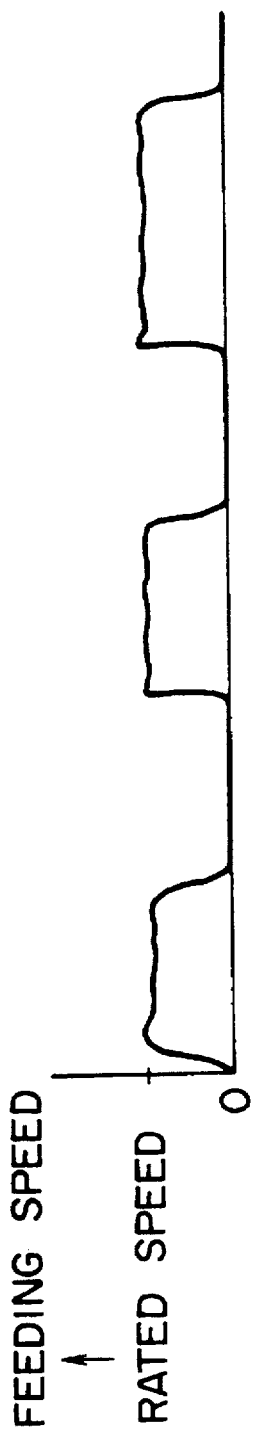
F I G. 19(b)

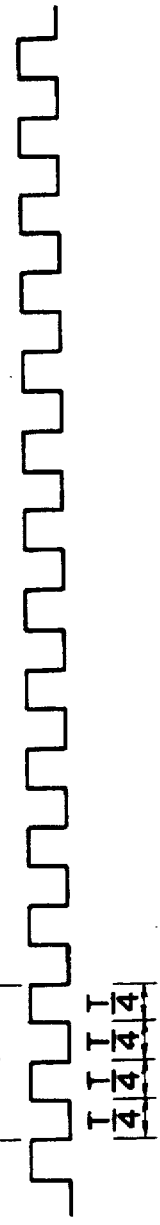
FIG. 26(a) ENCODER OUTPUT Sa
FIG. 26(b) WAVEFORM SHAPING CIRCUIT OUTPUT Sb
FIG. 26(c)
FIG. 26(d)
FIG. 26(e)
FIG. 26(f)
FIG. 26(g)
FIG. 26(h)

F I G. 30(a)
F I G. 30(b)
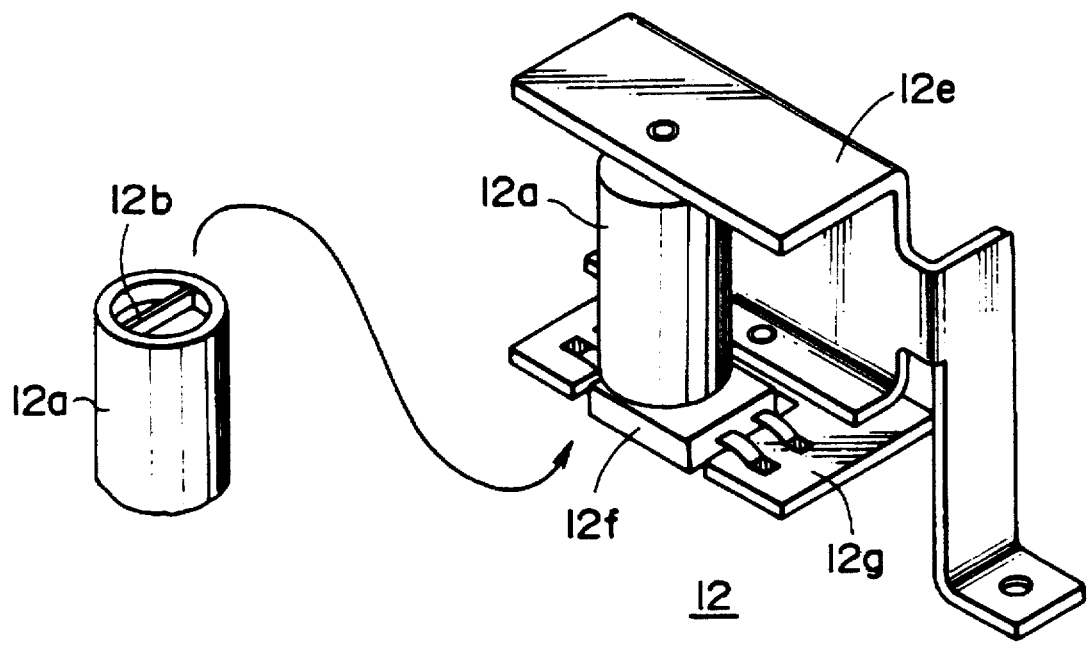
F I G. 30(c)
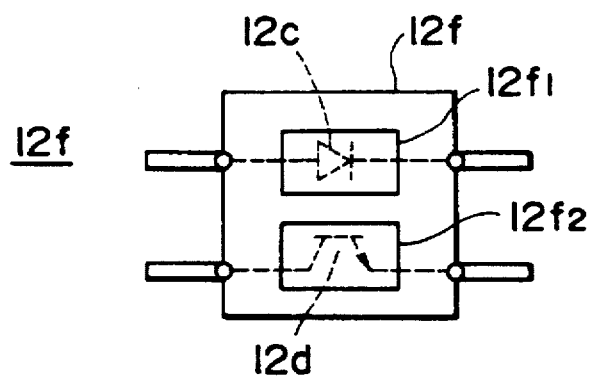

F I G. 46
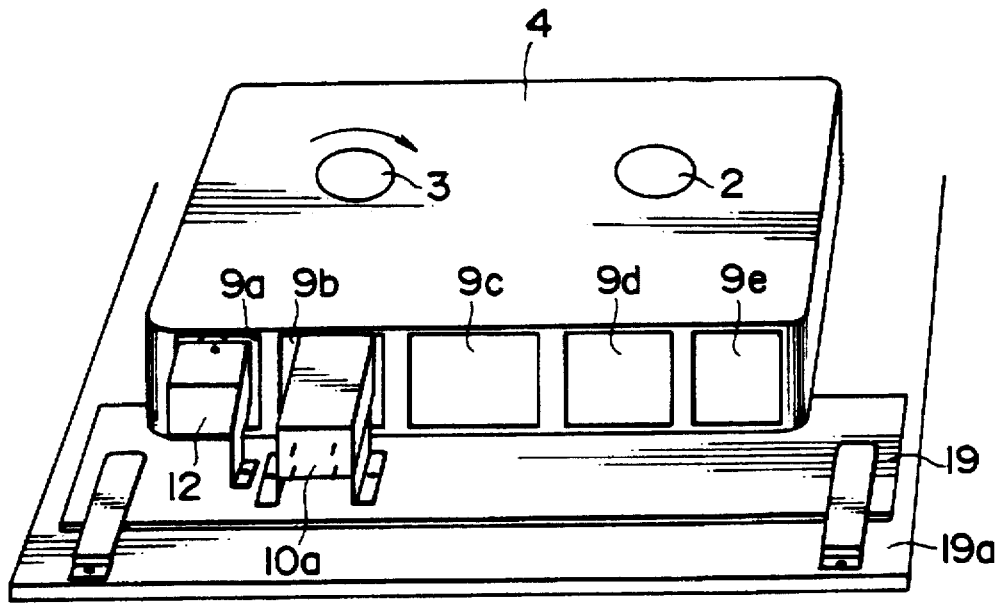
F I G. 47
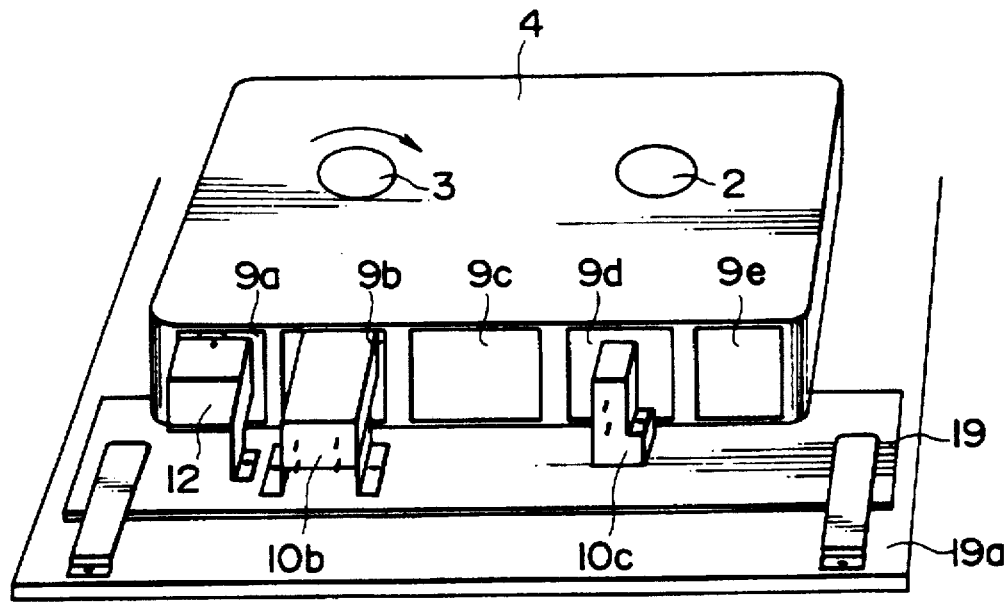

RECORDING AND/OR REPRODUCING APPARATUS HAVING NO CAPSTAN AND NO PINCH ROLLER AND METHOD OF CONTROLLING THE SAME

This is a division of application Ser. No. 08/092,864 filed Jul. 19, 1993, now U.S. Pat. No. 5,502,602.

BACKGROUND OF THE INVENTION

1. Field of the Invention

This invention relates to a recording and/or reproducing apparatus for a recording medium in the form of a tape, and more particularly to a recording and/or reproducing apparatus of the reel drive type wherein the speed of rotation of a reel is controlled to feed a recording medium in the form-of a tape at a fixed speed and a method of controlling the recording and/or reproducing apparatus.

2. Description of the Related Art

Recording and/or reproducing apparatus wherein, for example, a magnetic tape accommodated in a tape cassette housing or an open reel tape is employed as a recording medium are well known. In the recording and/or reproducing apparatus, normally a capstan and a pinch roller are contacted with a magnetic tape and the speed of rotation of the capstan is controlled to rotate at a fixed speed to feed the magnetic tape at a fixed speed.

In order to realize feeding of the tape at a fixed speed in a recording and/or reproducing apparatus of the reel drive type, it is one of several possible measures to detect the speed of feeding of the tape and perform velocity servo control of a reel motor in response to the detected speed. A suitable means to detect the tape feeding speed involves employment of a rotary encoder having a roller which contacts and is rotated by the tape when the tape is fed.

By the way, in a recording and/reproducing apparatus of the reel drive type, when the take-up side reel (reel spindle meshed with the take-up side reel) is driven to rotate at a fixed speed, the diameter of the tape wound on the reel varies gradually, and consequently the load to the tape varies and the tape feeding speed varies. While depending upon the length of the tape, the tape feeding speed immediately before the tape is taken up completely sometimes varies, for example, by two times or more compared to that immediately after feeding of the tape is started from its starting end.

Accordingly, even where a same recording medium is used, it is not compatible both with recording and/or reproducing apparatus of the reel drive type and recording and/or reproducing apparatus of the capstan type, which are well known at present. Further, a recording and/or reproducing apparatus of the reel drive type is not suitable as a recording and/reproducing apparatus for which fidelity in sound quality is required since the frequency characteristic and the S/N (signal to noise) ratio are varied from the starting end to the last end of the tape by the variation of the tape feeding speed. For those reasons, recording and/or reproducing apparatus of the reel drive type have a problem in that they are not suitable for practical use while they have an advantage in that they are simplified in construction due to absence of a capstan.

For example, a recording and/or reproducing apparatus is disclosed in Japanese Patent Laid-Open No. Heisei 3-134848 wherein a rotating roller contacts a magnetic tape and a reel is driven in response to the difference between a period of rotation of the rotating roller and a reference period of rotation for the rotating roller without using a capstan and a pinch roller.

When the tape stops, naturally a reel must stop, and therefore, In order to realize fixed speed feeding of the tape with a recording and/or reproducing apparatus of the reel drive type, upon starting the feeding of the tape, rotation of the reel must be raised rapidly to the speed for fixed speed rotation.

In addition, it is not possible for the reel to continue its rotation at a fixed speed like a capstan, when the recording and/or reproducing apparatus is in a stopped condition, and from the necessity for the rising operation, much time is required until the feeding of the tape reaches the predetermined speed. This gives rise to such serious problems as failure in recording at a starting end and a variation in musical interval upon reproduction.

Further, even during recording or reproduction, when the tape feeding speed is displaced by a significant amount from the predetermined speed, much time is required for recovery, resulting in such problems as failure in recording at a starting end and a variation in musical interval upon reproduction.

Further, when it is tried to realize fixed speed feeding of the tape with a recording and/or reproducing apparatus of the reel drive type, it is one of available measures to detect the tape feeding speed and control the speed of rotation of the reel motor by servo control.

However, the tape feeding speed is not always detected precisely due to, vibrations applied to the apparatus from the outside, a momentary variation of the operating voltage or an influence of irregularity in thickness, wrinkles and so forth of the magnetic tape. Thus, it is a problem that rotation of the reel motor is liable to be placed out of control by an error in detection of the tape feeding speed arising from some of the factors just described. Accordingly, It is difficult to realize fixed speed feeding that makes use of a rotational servo mechanism.

One of possible means for detecting the tape feeding speed involves a rotary encoder having roller which contacts with and is rotated by the tape so that pulses are generated from the rotary encoder.

In this instance, where the rotary encoder is constructed so as to generate a large number of pulses during one rotation of the roller, a high resolution is obtained so that information of the tape feeding speed is obtained at a short interval of time and servo control of a high reliability is obtained. However, the construction requires a large size for the tape feeding speed detecting means and particularly for the roller and the pulse generating means, which is not preferable.

On the other hand, where the rotary encoder is constructed so as to generate one pulse or a small number of pulses for one rotation of the roller, reduction in size of the tape feeding speed detecting means can be achieved, but since information of the tape feeding speed can be obtained only at a comparatively long interval of time, servo control of a high reliability cannot be achieved and a delay in servo control may result.

Further, even during recording or reproduction, when the tape feeding speed is displaced by a significant amount from the predetermined speed, much time is required for recovery, resulting in such problems as failure in recording at a starting end and a variation in musical interval upon reproduction.

Furthermore, when the speed is detected by means of the rotary encoder, a slip between the tape and the roller makes it difficult to detect the speed accurately. Accordingly, there is a problem in that it is difficult to achieve accurate servo control.

For example, if the back tension of the supply side reel is insufficient, the contacting pressure or the contacting area between the roller and the tape is rendered unstable so that a slip may occur between the roller and the tape.

On the other hand, when it is tried to obtain sufficient back tension of the supply side reel to eliminate such a possible slip as described above, then complication of the structure, increased torque of the take-up side reel and employment of a motor of a large size and a high power for such torque, increased power dissipation and so forth are involved.

Further, a rise of the slip torque may result in damage to the tape.

SUMMARY OF THE INVENTION

It is an object of the present invention to provide a recording and/or reproducing apparatus of the reel drive type which is high in reliability upon starting and high in accuracy in speed of feeding of a tape.

It is another object of the present invention to provide a recording and/or reproducing apparatus of the reel drive type which assures stabilized feeding of a tape at a fixed speed.

It is a further object of the present invention to provide a recording and/or reproducing apparatus of the reel drive type wherein a rise to a predetermined speed upon the start of feeding of a tape is performed rapidly.

It is a still further object of the present invention to provide a recording and/or reproducing apparatus of the reel drive type which eliminates a reel motor from being placed out of servo control in rotation by an error in detection of a feeding speed of a tape.

It is a yet further object of the present invention to provide a recording and/or reproducing apparatus of the reel drive type which realizes reduction in size of detection means for detecting the feeding speed of a tape-formed recording medium and a concise servo operation.

It is a yet further object of the present invention to provide a recording and/or reproducing apparatus of the reel drive type wherein the position at which tape feeding speed detection means contacts a tape-formed recording medium is set suitably so that accurate tape feeding speed information can be detected.

In order to attain the objects described above, according to the present invention, there is provided a recording and/or recording apparatus of a type which has no capstan and no pinch roller, which comprises reel driving means including a motor for driving a reel to rotate to perform a feeding operation of a recording medium in the form of a tape, tape feeding speed detection means including a roller for contacting the tape-formed recording medium so as to be rotated by the tape-formed recording medium when the tape-formed recording medium is fed, rotation period measurement means for measuring a period of rotation of the roller of the tape feeding speed detection means, deviation calculation means for calculating a deviation from a predetermined speed of the tape-formed recording medium using a measured value from the rotation period measurement means, constant generation means for generating a constant which defines a servo control output range corresponding to a rotational speed range of the motor of the reel driving means, servo control value calculation means for calculating a servo control value, which increases in proportion to the rotational speed range of the motor of the reel driving means, using the deviation calculated by the deviation calculation means, the constant generated from the constant generation means and a servo control value calculated in the last control cycle by the servo control value calculation means, storage means for storing the servo control value outputted from the servo control value calculation means and supplying the stored servo control value as a servo control value in the last control cycle to the servo control value calculation means, and servo means for controlling the rotational speed of the motor of the reel driving means in response to the servo control value calculated by the servo control value calculation means so that the feeding speed of the tape-formed recording medium is be equal to the predetermined speed.

The recording and/or reproducing apparatus may further comprise gain coefficient generation means for generating a gain coefficient for a servo operation, and the servo control value calculation means may calculate a servo control value, which increases in proportion to the rotational speed range of the motor of the reel driving means, in accordance with the gain coefficient generated from the gain control generation means, the deviation calculated by the deviation calculation means, the constant generated from the constant generation means and a servo control value calculated in the last control cycle by the servo control value calculation means.

Further, the gain coefficient calculation means may generate a different gain coefficient in response to a value of the deviation calculated by the deviation calculation means.

The deviation calculation means may measure a rotation period of one rotation of the roller of the tape feeding speed detection means and calculate a deviation from the predetermined speed of the tape-formed recording medium using a measured value of the period of rotation.

In the recording and/or reproducing apparatus, the speed of rotation of the reel (a reel shaft for driving the reel) is controlled so that the tape feeding speed may be a constant speed from the starting end to the ending end of the tape.

Meanwhile, since a servo gain coefficient is used for calculation of a servo control circuit, the responsibility of a servo operation can be set to a desired value. Further, since the servo gain coefficient is varied in response to a calculated deviation, the responsibility can be varied in response to the tape feeding condition to execute an appropriate servo operation. Furthermore, since measurement of a period of rotation of the roller of the tape feeding speed detection means, which represents a tape feeding speed, is performed in units of one rotation period of the roller, the error in accuracy of the roller itself can be cancelled.

The deviation calculation means may include first deviation calculation means for measuring a one rotation period of the roller of the tape feeding speed detection means and calculating a deviation from the predetermined speed of the tape-formed recording medium using a measured value of the one rotation period, second deviation calculation means for measuring a 1/n rotation period of the roller of the tape feeding speed detection means and calculating a deviation from the predetermined speed of the tape-formed recording medium using a measured value of the 1/n rotation period, change-over means for selectively changing over between the first deviation calculation means and the second deviation calculation means, and one rotation detection means for detecting completion of one rotation of the roller after feeding of the tape-formed recording medium is started, and the one rotation detection means may output the deviation from the second deviation means after feeding of the tape-formed recording medium is started, and after the one rotation detection means detects completion of one rotation of the roller, the change-over means may change over from the second deviation calculation means to the first deviation calculation means.

The recording and/or reproducing apparatus may further comprise tape position calculation means for calculating a feeding position of the tape-formed recording medium using a measured value of the period of rotation of the roller of the tape feeding speed detection means, second servo control value calculation means for calculating a speed of rotation of the motor of the reel driving means corresponding to the feeding position of the tape calculated by the Gape position calculation means and calculating a servo control value which increases in proportion to a calculated value of the speed of rotation of the motor, and change-over means for changing over a servo control value to be supplied to the storage means between the servo control value from the second servo control value calculation means which increases in proportion to the speed of rotation of the motor and the servo control value from the first-mentioned servo control value calculation means calculated using the deviation.

In this instance, the change-over means may output, when feeding of the tape-formed recording medium is started, the servo control value from the second servo control value calculation means to the storage means, but after such servo control value from the second servo control value calculation means is outputted a predetermined number of times, the change-over means may output the servo control value from the first-mentioned servo control value calculation means calculated using the deviation to the storage means.

Similarly, recording-and/or reproducing apparatus may further comprise deviation determination means for comparing the deviation calculated by the deviation calculation means with a predetermined reference value, the change-over means being controlled in response to the deviation determination means.

Instead, the recording and/or reproducing apparatus may further comprise detection means for detecting a power off condition and/or a no cassette condition, and initial value generation means for generating a servo control value to be used as an initial value, a servo control value of the initial value being stored into and outputted from the storage means when the detection means detects a power off condition and/or a no cassette condition.

By obtaining speed information in a ¼ rotation of the roller only upon starting of feeding of the tape-formed recording medium, a rapid servo operation is allowed, and a rise to the rated speed (for example, 4.76 cm/sec in a compact cassette tape) can be performed in a short period of time.

Also by detecting a feeding position of the tape-formed recording, medium only upon starting of feeding of the tape-formed recording medium, a rapid servo operation is allowed and a rise to the rated speed can be performed in a short period of time.

Further, where a servo operation is performed in response to the deviation such that, when the deviation is small, a servo operation based on calculation of a deviation is performed, but when there is no deviation, another servo operation based on detection of a feeding position of the tape-formed recording medium is performed, even upon starting of feeding of the tape-formed recording medium or when the speed of the tape-formed recording medium fluctuates by a great amount from the rated speed, a rise to or recovery of the rated speed can be performed rapidly.

Further, the driving of the reel motor using an initial value upon the start feeding of the tape-formed recording medium is performed only when the power source is turned on or only upon the start of feeding of a tape-formed recording medium for the first time after loading of the tape-formed recording medium into the recording and/or reproducing apparatus and the reel motor is driven, upon the start of feeding in any other case. using a servo control value obtained immediately before the last stop of feeding, since a servo operation is started from a condition considerably proximate to that at the rated speed upon any other start of feeding than the start feeding when the power source is turned on or the start of feeding for the first time after loading of the tape-formed recording medium into the recording and/or reproducing apparatus, a rise to the rated speed can be performed in a very short period of time.

The recording and/or reproducing apparatus may further comprise deviation storage means capable of holding the last n deviations including a current deviation supplied thereto from the deviation calculation means, n being a natural number, and average value calculation means for calculating an average value of selected ones or all of the deviations stored in the deviation storage means, the deviation calculation means and the average value calculation means being interposed between the deviation calculation means and the servo control value calculation means.

In this instance, the recording and/or reproducing apparatus may further comprise change-over means for changing over between the output from the deviation calculation means and the output from the average value calculation means, and change-over control means for controlling the change-over means in response to a number of deviations stored in the deviation storage means, the deviation storage means, the average value calculation means and the change-over means being interposed between the deviation calculation means and the servo control value calculation means.

With the recording and/or reproducing apparatus of the construction described above, since a servo control value is calculated in accordance with part or all of the last n deviations, an error caused by an influence of a disturbance or the like in the deviation can be cancelled.

The rotation period calculating means may include period measurement means for measuring a 1/n rotation period of the roller, n being a natural number, period information storage means for storing the last n 1/n rotation period information values including a current 1/n rotation period information value outputted from the period measurement means, and one rotation period calculation means for calculating a one rotation period of the roller from the n 1/n rotation period information values stored in the period information storage means.

With the recording and/or reproducing apparatus of the construction, by obtaining period information of the roller for each 1/n rotation of the roller and storing such period information for the last n control cycles, period information of the roller for one rotation can be obtained, for each 1/n rotation of the roller, from the period information for the last n control cycles.

The recording and/or reproducing apparatus may further comprise one rotation detection means for detection one rotation of the roller of the tape feeding speed detection means, and the change-over means may be controlled to change over in response to the one rotation detection means whether it outputs the servo control value from the second servo control value calculation means which increases in proportion to the speed of rotation of the motor to the storage means or it outputs the servo control value from the first-mentioned servo control value calculation means calculated using the deviation to the storage means.

The roller of the tape feeding speed detection means may be disposed so as to contact the tape-formed recording medium on a tape feeding path in a section from a recording and/or reproducing head to the take-up side reel.

In this instance, the roller of the tape feeding speed detection means may be-provided in an opposing relationship to a pad provided for contacting a rear face of a recording medium in the form of a tape in a tape cassette load in the recording and/or reproducing apparatus.

With the recording and/or reproducing apparatus of the construction, the tension of the tape-formed recording medium is in a very stabilized condition in the tape feeding path in the section from the recording and/or reproducing head to the take-up side reel, and a sufficient contacting force to rotate the roller particularly of a low weight and a low rotational torque can be obtained there. Further, even with contact of the roller with the pad with the tape-formed recording medium interposed therebetween, the contacting force and the contacting area between the roller and the tape-formed recording medium can be stabilized.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 11(a) and 11(b) are time charts showing output signals of a rotary encoder and a waveform shaping circuit of the recording and/or reproducing apparatus of FIG. 8:

FIGS. 19(a) and 19(b) are time charts illustrating servo conditions of the recording and/or reproducing apparatus of FIG. 17;

FIGS. 26(a) to 26(h) are time charts illustrating a servo condition of the recording and/or reproducing apparatus of FIG. 24;

FIG. 30(a) is a perspective view showing a mounted condition of a rotary encoder in a recording and/or reproducing apparatus to which the present invention is applied, FIG. 30(b) is a partial perspective view of a roller of the rotary encoder, and FIG. 30(c) is a diagrammatic view schematically showing an electric construction of the rotary encoder;

FIGS. 32 to 48 are perspective views showing different mechanical arrangements of a magnetic head or heads and a rotary encoder in a recording and/or reproducing apparatus to which the present invention can be applied;

DETAILED DESCRIPTION OF THE PREFERRED EMBODIMENTS

Figure 1:
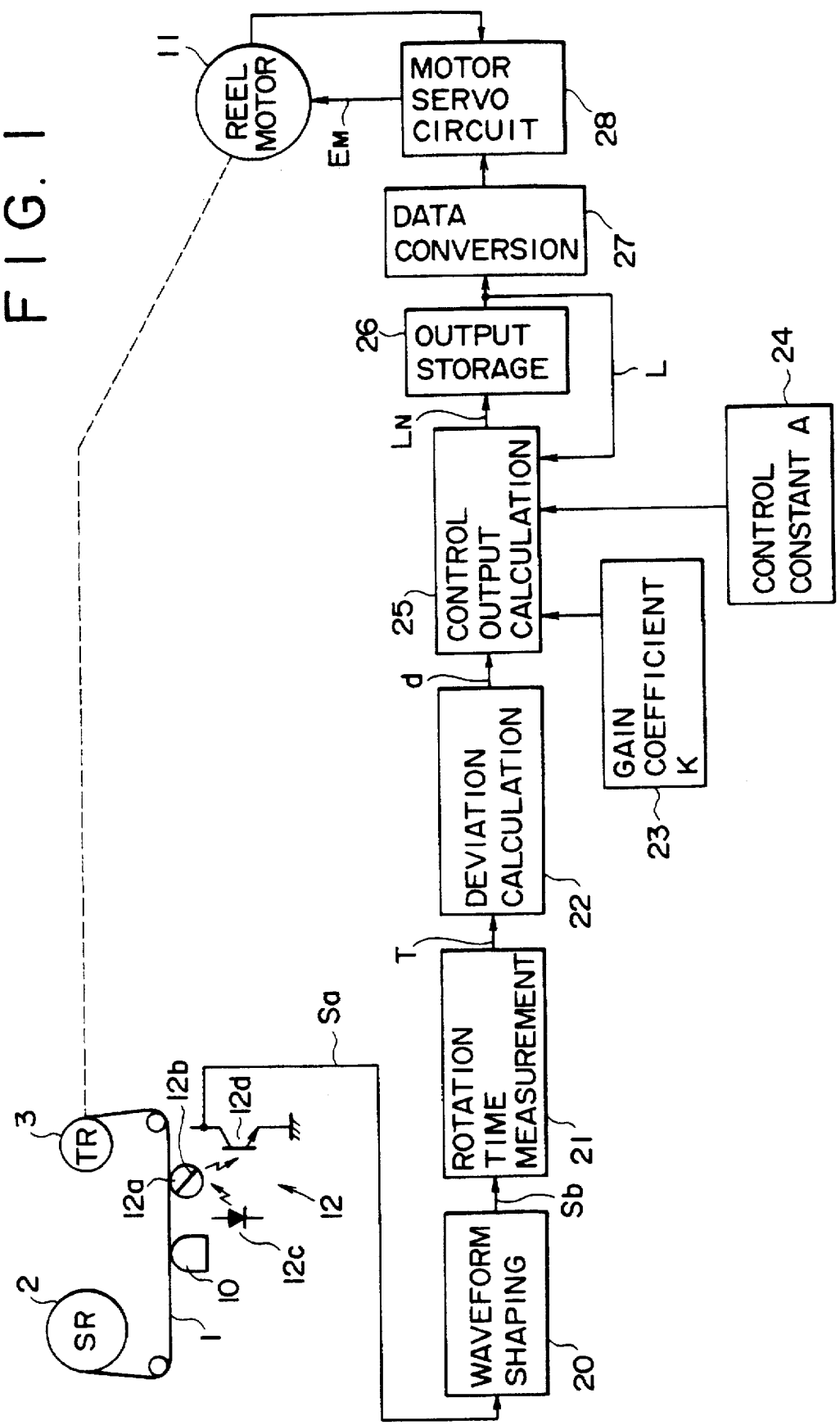
FIG. 1 is a block diagram of a recording and/or reproducing apparatus showing a preferred embodiment of the present invention.

Referring first to FIG. 1, there is shown in block diagram a recording and/or reproducing apparatus to which the present Invention is applied. A magnetic tape 1 is wound on a supply reel 2 and a take-up reel 3 and accommodated in a body of a tape cassette not shown. The magnetic tape 1 is loaded in position and fed in the recording and/reproducing apparatus when a recording and/or reproducing operation for audio information or the like is performed by a magnetic head 10.

Figure 29:
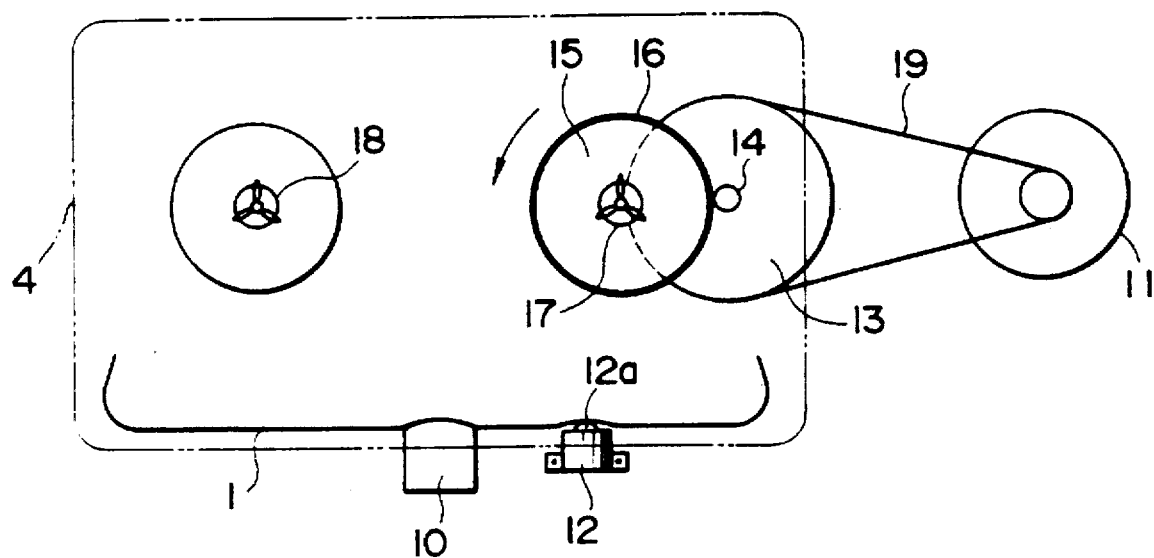
FIG. 29 is a schematic view of a reel drive structure of a recording and/or reproducing apparatus to which the present invention is applied.

The magnetic tape 1 is fed when the take-up reel 3 is driven to rotate by a reel motor 11. Referring also to FIG. 29, rotation of the reel motor 11 is transmitted to a flywheel 13 by way of a belt 19 so that a drive shaft 14 provided on the flywheel 13 is rotated. A take-up reel receiver 15 is held in contact with the drive shaft 14 by way of a rubber belt 16 provided on a circumferential face of the take-up reel receiver 15. Consequently, when the drive shaft 14 rotates, the take-up reel receiver 15 is rotated by the drive shaft 14 to rotate a reel driving shaft 17 mounted on the take-up reel receiver 15.

Then, when the tape cassette 4 is loaded in position as indicated by a broken line in FIG. 29, a hub of the take-up reel 3 is engaged with the reel driving shaft 17, and consequently, the take-up reel 3 is rotated by the reel driving shaft 17 to feed the magnetic tape 1. The supply reel 2 has a reel shaft 18 thereon.

A rotary encoder 12 As provided in order to detect the feeding speed of the magnetic tape 1 and includes a roller 12a, a shutter plate 12b provided on the roller 12a, a photo-diode 12c serving as a light outputting element, and a phototransistor 12d for detecting an optical output of the photo-diode 12c and converting it into an electric signal.

Referring now to FIGS. 30(a) to 30(c), the roller 12a is mounted for rotation on a frame 12e, and a photo-reflector 12f in the form of a single chip element including the photo-diode 12c and the phototransistor 12d is mounted on a base plate 12g below the roller 12a. The photo-reflector 12f has a window 12f1 and another window 12f2 formed therein so that light from the photodiode 12 is outputted through the window 12f1 while light to be detected by the photo-transistor 12d is admitted through the window 12f2.

The shutter plate 12h is formed on a lower face of the roller 12a opposing to the photo-reflector 12f such that, when the angular position of the shutter plate 12b with respect to the photo-reflector 12f is varied by rotation of the roller 12a, light emitted from the photodiode 12c is admitted into the photo-transistor 12d or intercepted from entering the photo-transistor 12d.

Figure 31A:
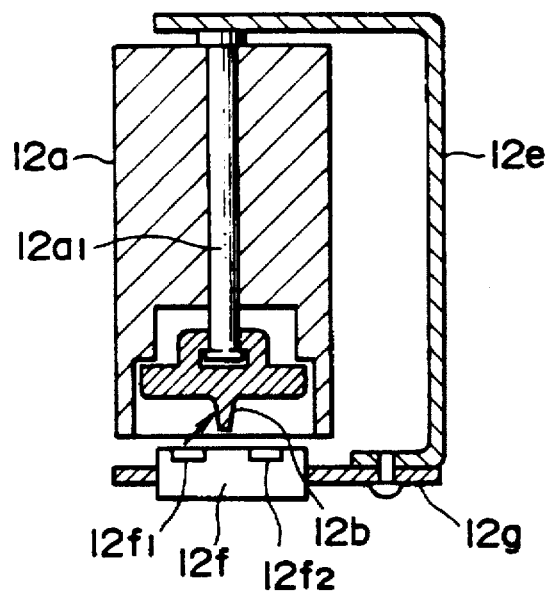
FIGS. 31(a) and 31(b) are schematic sectional views illustrating a detecting operation of the rotary encoder shown in FIGS. 30(a) to 30(c)
Figure 31B:
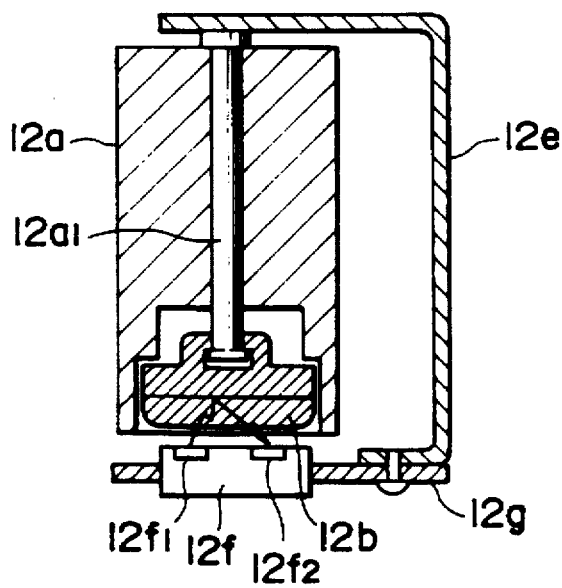
Figure 32:
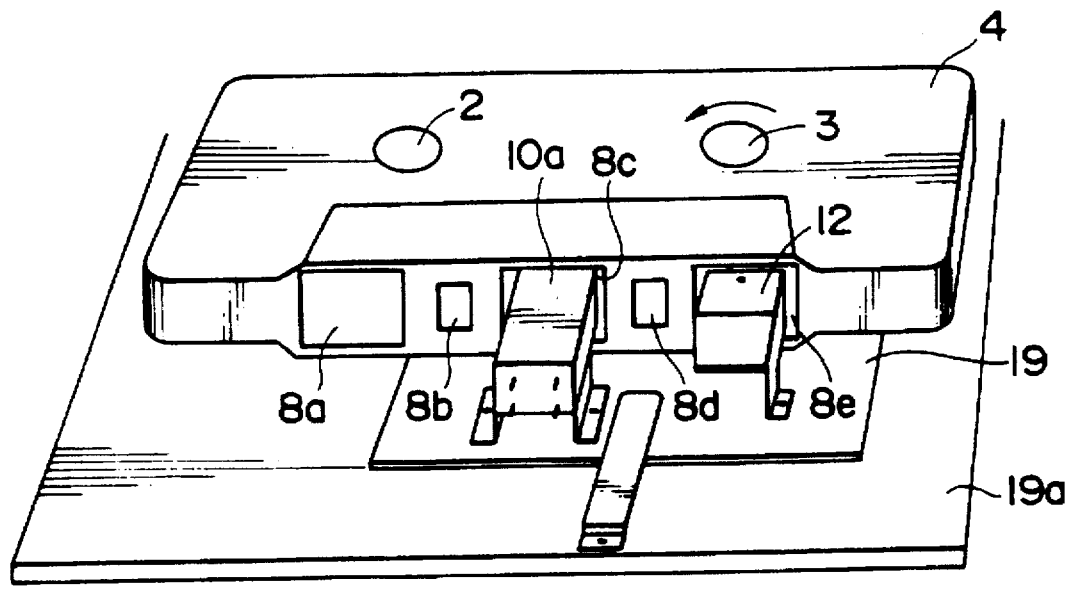
Figure 33:
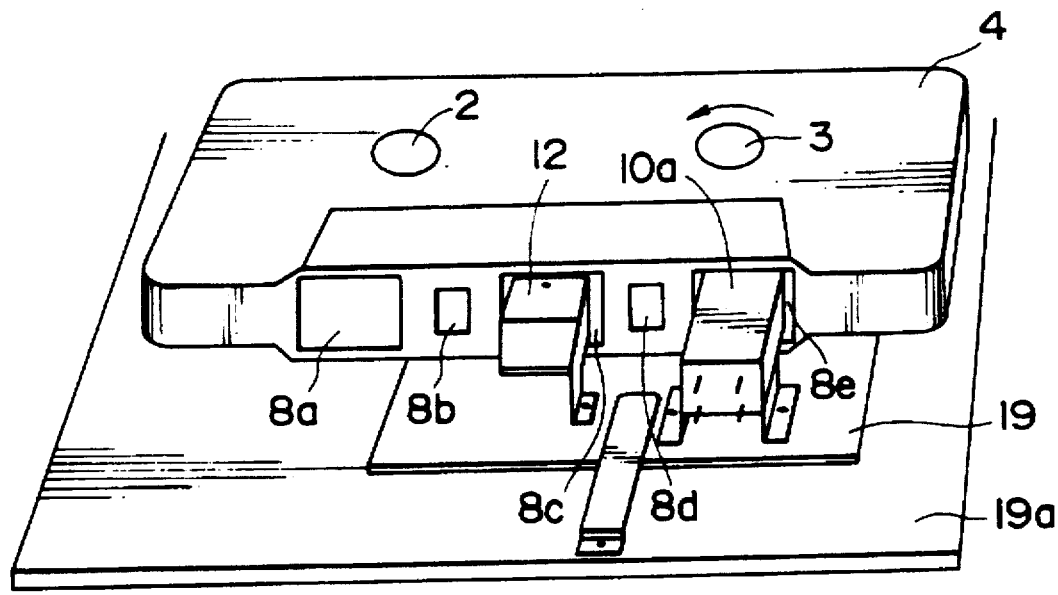
Figure 34:
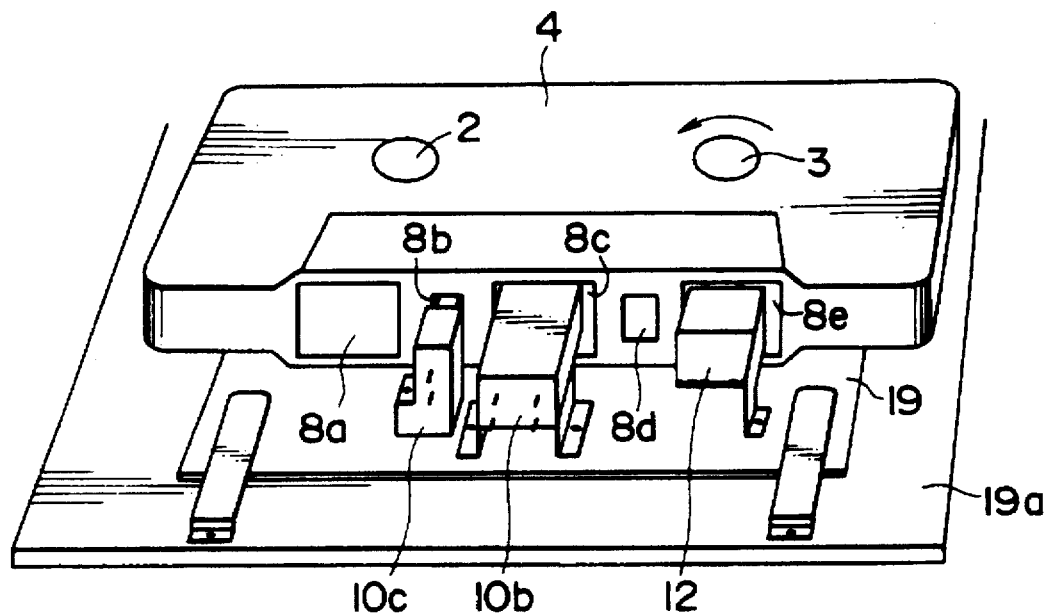
Figure 35:
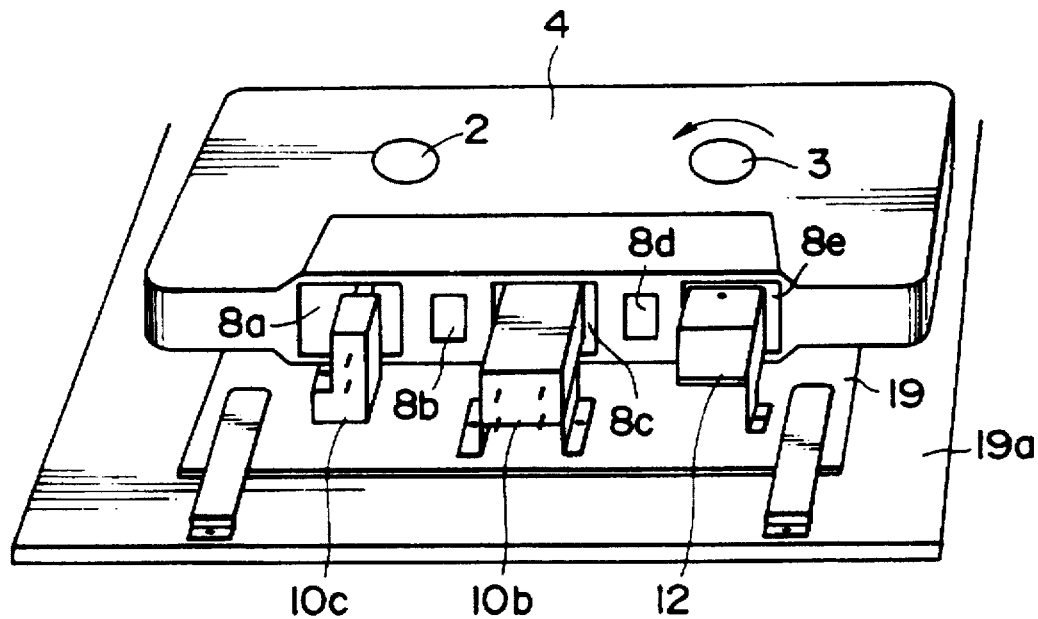
Figure 36:
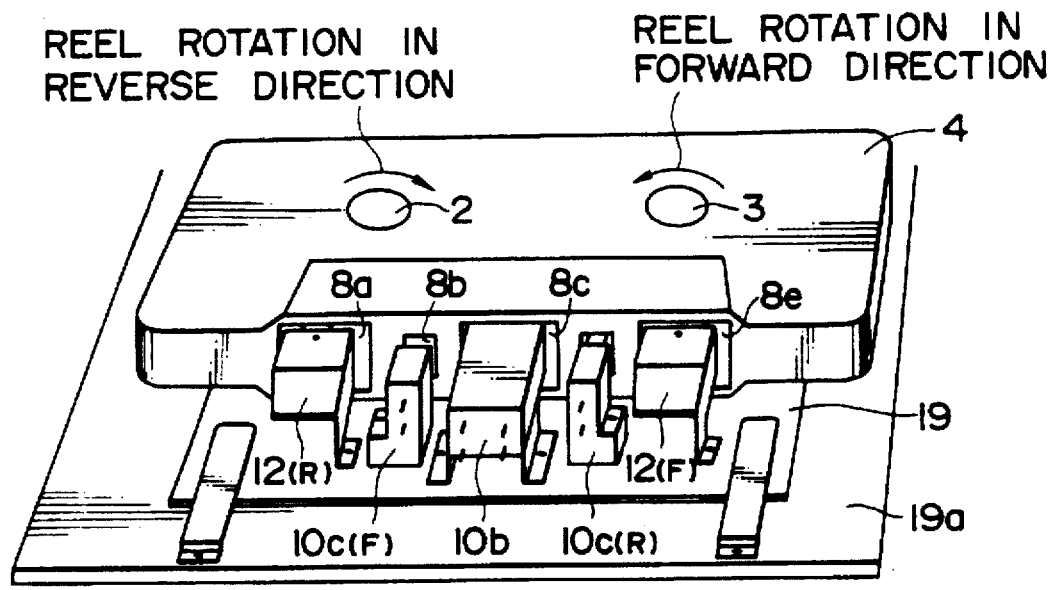
Figure 37:
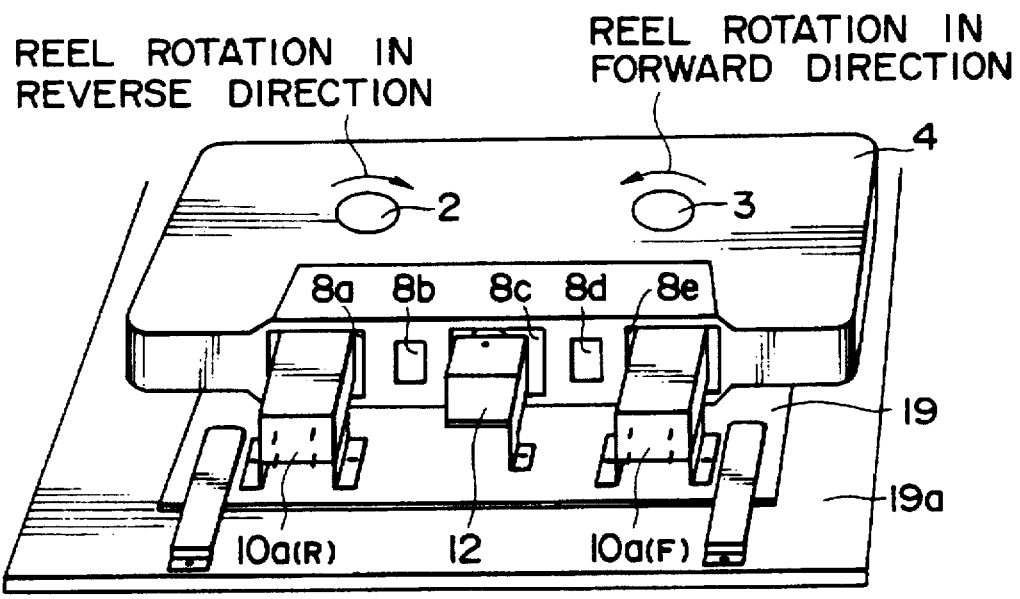
Figure 38:
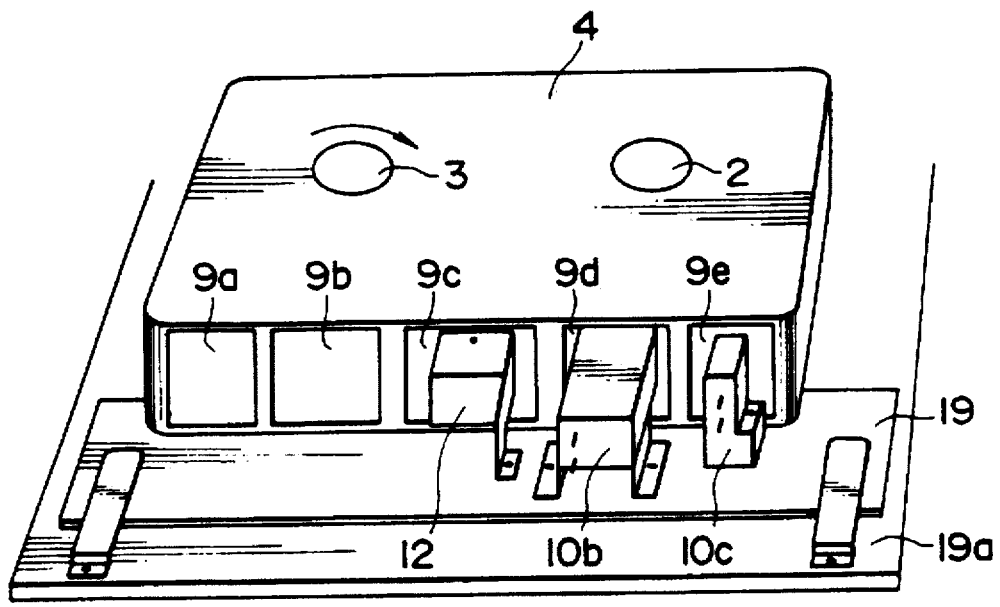
Figure 39:
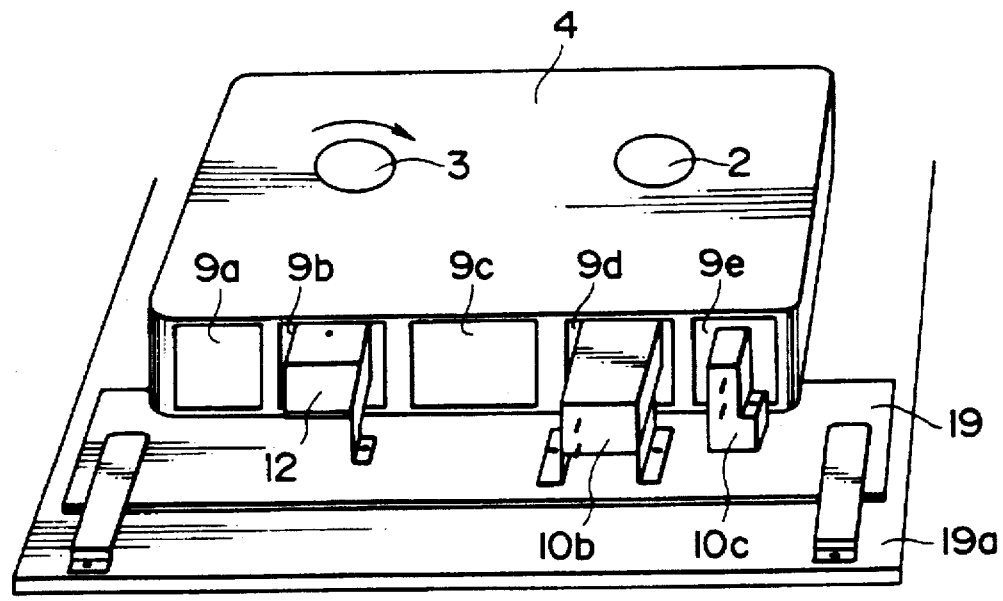
Figure 40:
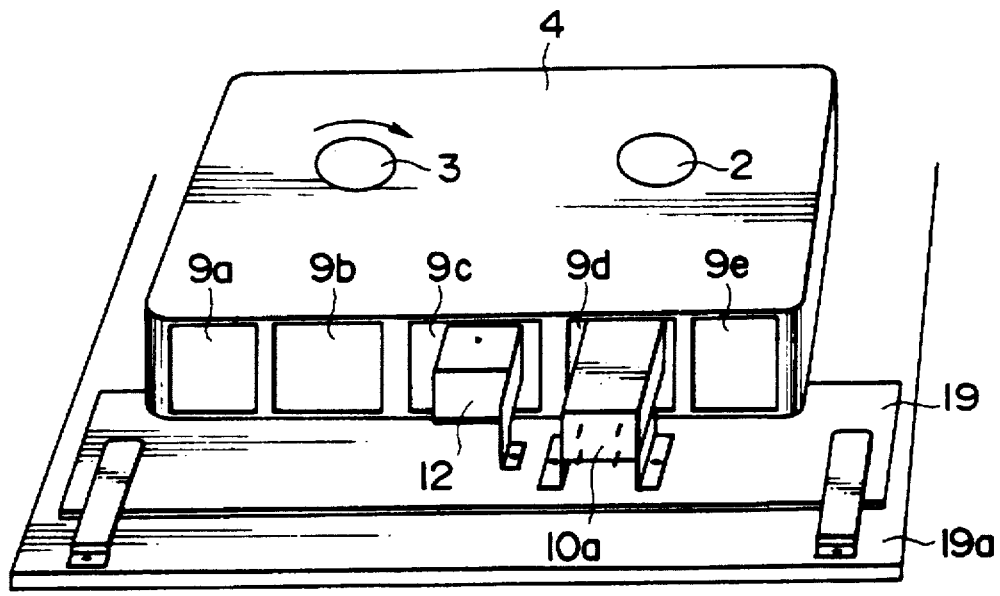
Figure 41:
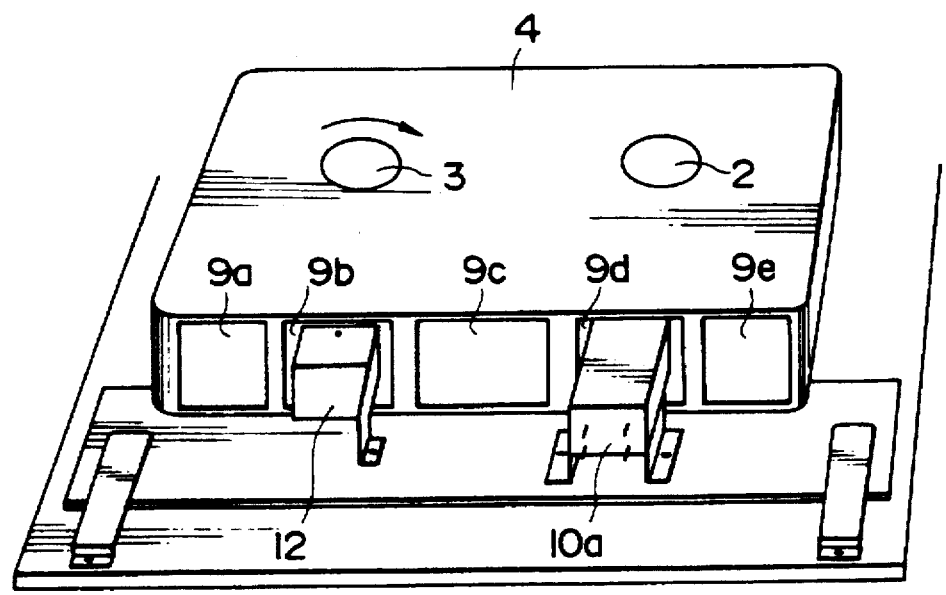
Figure 42:
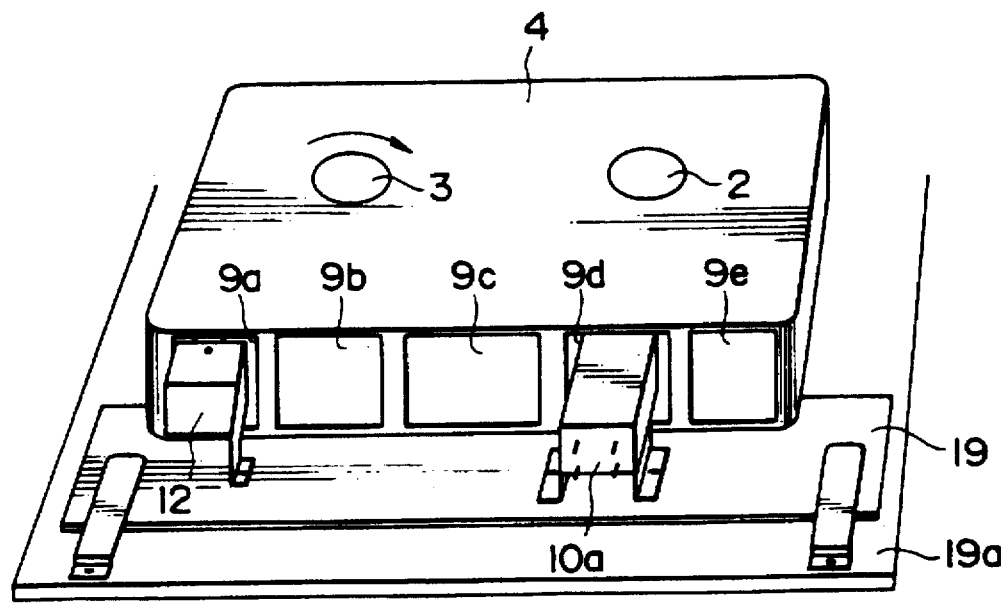

In particular, referring also to FIGS. 31(a) and 31(b), the roller 12a and the shutter plate 12b are mounted for rotation around a shaft $12a_1$ relative to the frame $12e$, and accordingly, when the roller 12a contacts the magnetic tape 1 as shown in FIG. 1, as the magnetic tape 1 is fed, the roller 12a is rotated by the magnetic tape 1 and rotates the shutter plate 12b. Here, when the shutter plate 12b is at such a rotational position as shown in FIG. 31(a) relative to the photo-reflector 12f, light emitted from the photodiode 12c and outputted through the window $12f_1$ is intercepted by the shutter plate 12b, and consequently, it is not detected by the photo-transistor 12d. On the other hand, when the shutter plate 12b is at another rotational position as shown in FIG. 31(b) relative to the photo-reflector 12f, light emitted from the photodiode 12c and outputted through the window $12f_1$ is not intercepted by the shutter plate 12 and is introduced into the phototransistor 12d through the window $12f_2$.

Figure 3A:
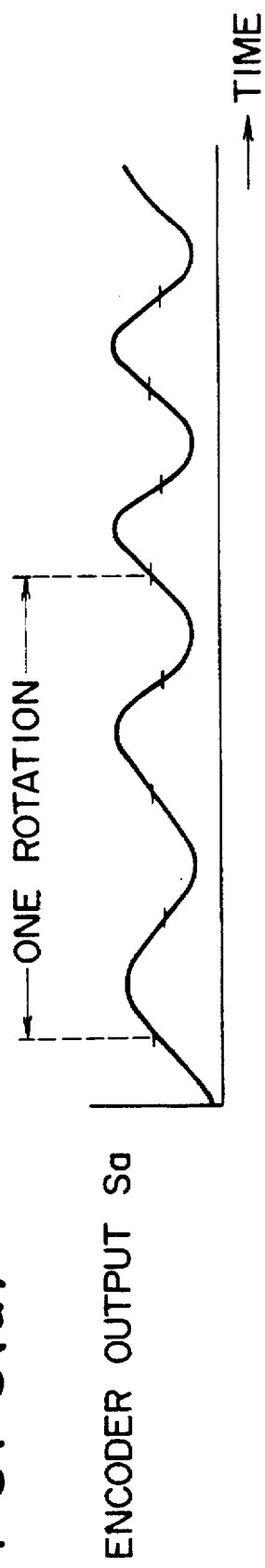
FIGS. 3(a) and 3(b) are time charts showing output signals of a rotary encoder and a waveform shaping circuit of the recording and/or reproducing apparatus of FIG. 1.

Accordingly, admission or non-admission of light into the photo-transistor 12d is repeated each time the roller 12a rotates ¼ rotation. Consequently, such a detection waveform as indicated, for example, by FIG. 3(a), 11(a) or 26(a) is outputted from the photo-transistor 12d.

It is to be noted that the roller 12a has such a diameter that it rotates four rotations for one second when the magnetic tape 1 is fed at a rated speed (4.76 cm/sec with a compact cassette tape).

Figure 3B:
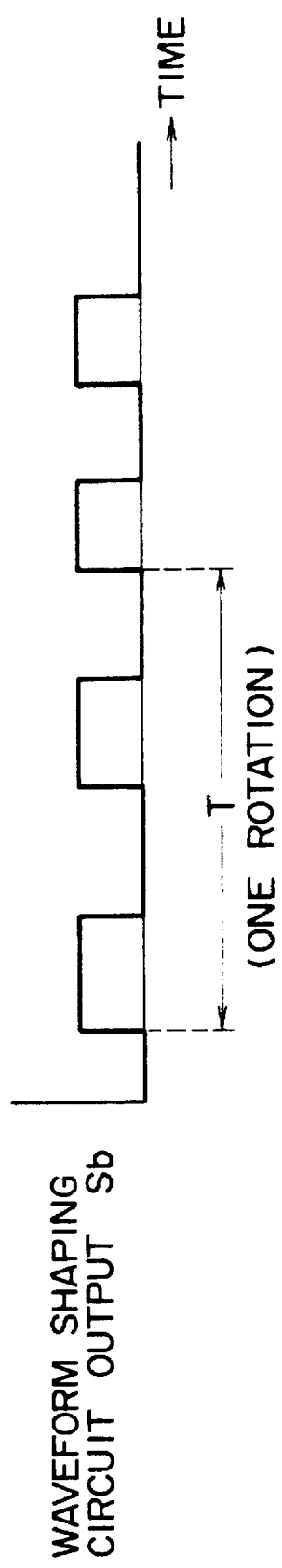

Referring back to FIG. 1, a waveform shaping circuit 20 shapes the waveform of an output of the photo-transistor 12d, which may have some distortion, into a rectangular waveform. In particular, the waveform shaping circuit 20 has a predetermined threshold level having a hysteresis for the output Sa of the rotary encoder 12 of FIG. 3(a), 11(a) or 26(a) and produces such a waveform shaped output Sb as seen from FIG. 3(b), 11(b) or 26(b).

A rotation time measurement section 21 calculates a time required for one rotation of the roller 12a. One rotation of the roller 12a corresponds to a period T in FIG. 3(b), 11(b) or 26(b), that is, a period from the rising edge (or the falling edge) of a pulse to the rising edge (or the falling edge) of a second pulse next to the first pulse.

A deviation calculation section 22 holds in advance therein information (hereinafter referred to as rated period information $T_{O25}$) of the period of one rotation of the roller 12a at a rated speed in feeding of the magnetic tape 1. It is to be noted that, since the roller 12a is rotated four rotations for one second when the magnetic tape 1 is fed at the rated speed, the rated period information $T_{O25}$ is 0.25 seconds.

The deviation calculation section 22 calculates a deviation d using the rated period information $T_{O25}$ and the period T of an actual one rotation inputted thereto. In particular, the deviation d is calculated in accordance with the following equation:

$$d = \frac{T - T_{O25}}{T_{O25}} \quad (1)$$

A gain coefficient generation section 23 outputs a coefficient K to be used for setting of a servo gain. It is to be noted that, when the coefficient K should always be kept equal to K=1, the gain coefficient generation section 23 need not be provided. However, by setting the coefficient K to a predetermined value, the servo gain can be set to a desired value and the responsibility of a servo operation which will be hereinafter described can be set arbitrarily.

A control constant generation section 24 generates a control constant A calculated in accordance with a functional expression between a range of speed of rotation of the reel motor 11 and a servo control value L which will be hereinafter described. The control contact A is used to obtain a servo control value L which appropriately coincides with the range of variation of rotation of the reel motor 11, and accordingly, the control constant A is a fixed value peculiar to the apparatus. The control constant A is calculated in accordance with the following equation:

$$A = \frac{(L_{MAX} - L_{MIN})^* - N_{MIN}}{N_{MAX} - N_{MIN}} \quad (2)$$

where $N_{MAX}$ is a speed of rotation of the reel motor 11 at the starting end of the magnetic tape 1, $N_{MIN}$ is a speed of rotation of the reel motor 11 at the last end of the magnetic tape 1, $L_{MAX}$ is a servo control value at the starting end of the magnetic tape 1, and $L_{MIN}$ is a servo control value at the last end of the magnetic tape 1.

The recording and/or reproducing apparatus further includes a control output calculation section 25 for calculating and outputting a servo control value $L_N$, and an output storage section 26 for storing the servo control valve $L_N$ outputted from the control output calculation section 25 and supplying the servo control value $L_N$ to a data conversion section 27 which will be hereinafter described. The servo control value $L_N$ supplied to the output storage section 26 is stored as a servo control value L in the output storage section 26, and the servo control value L is fed back as a servo control value In a preceding control cycle to the control output calculation section 25 and used for calculation of a servo control value $L_N$.

The control output calculation section 25 calculates, using the deviation d, the gain coefficient K, the control constant A and the servo control value L thus fed back, a servo control value $L_N$ for a current control cycle In accordance with the following expression:

$$L_N = L + d*A*K \quad (3)$$

The data conversion section 27 converts the servo control value L supplied thereto from the output storage section 26 into a reference value for a servo operation. For example, the data conversion section 27 converts the servo control value L into a resistance value, a voltage value, a pulse width or a pulse period corresponding to the servo control value L. In the present embodiment, the servo control value L is converted into a PWM (pulse width modulation) signal having a corresponding "L period" (period of a low level) with respect to a fixed "H period" (period of a high level). Accordingly, the servo control values $L_{MAX}$ and $L_{MIN}$ used for calculation of the control constant A described above represent the pulse widths of an "L period" of the PWM signal at the start end and the terminal end of the magnetic tape 1.

A motor servo circuit 28 converts the PWM signal supplied thereto, for example, into a voltage value or a resistance value and supplies a servo output EM to the reel motor 11 so that the voltage value or resistance value obtained by the conversion may coincide with a drive voltage value (or resistance value) fed back thereto from the reel motor 11 to control driving of the reel motor 11 so as to minimize the deviation d.

In the recording and/or reproducing apparatus of the present embodiment having such a construction as described above, servo control is performed so that the speed of rotation of the reel motor 11 may be kept substantially constant while the magnetic tape 1 is fed from the start end to the terminal end thereof.

Figure 2:
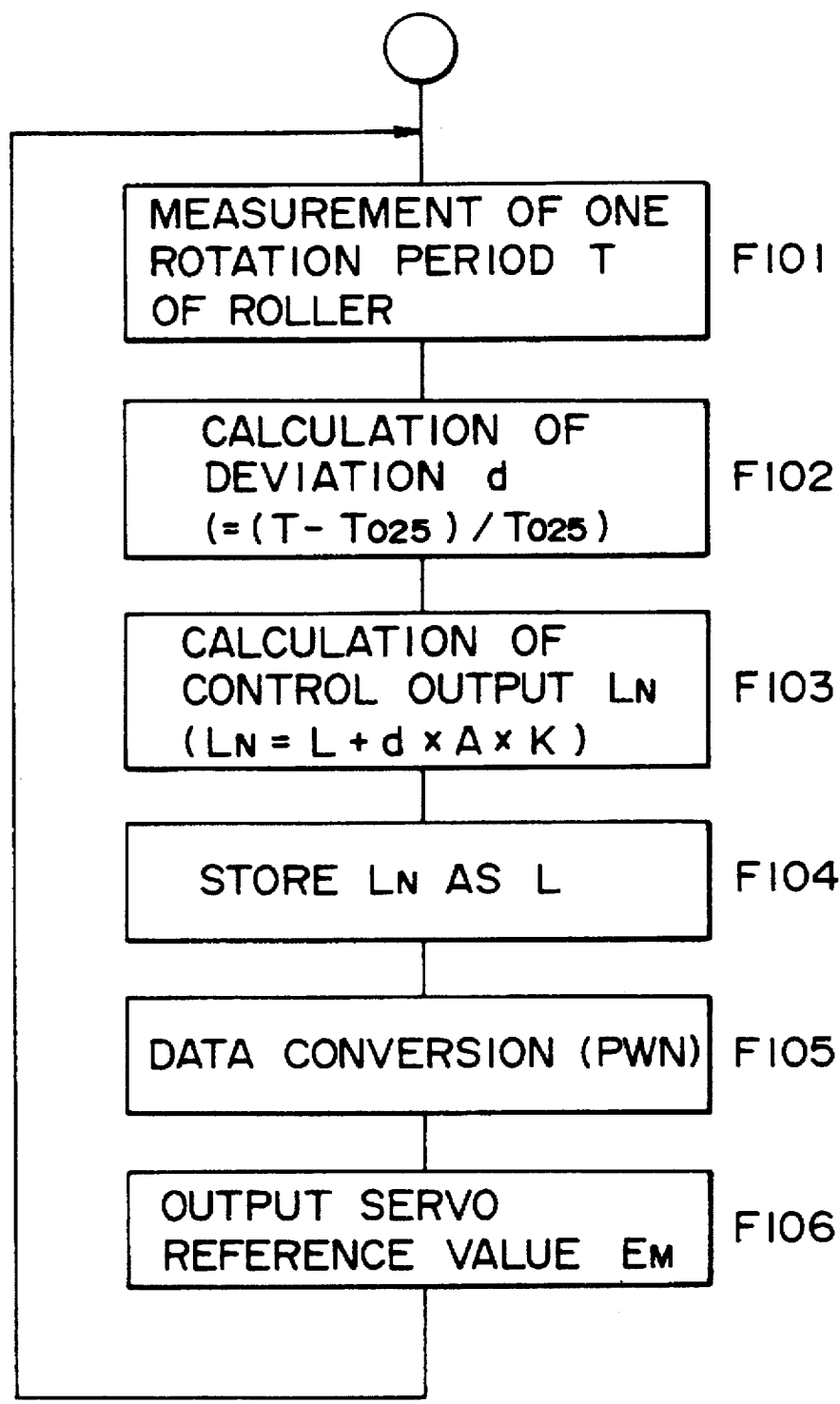
FIG. 2 is a flow chart illustrating operation of the recording and/or reproducing apparatus of FIG. 1.

A servo operation for the speed of rotation of the reel motor 11 is illustrated in the flow chart of FIG. 2. Referring to FIGS. 1 and 2, when the magnetic tape 1 is fed, the roller 12a is rotated by the magnetic tape 1, and thereupon, rotational speed information Sa is outputted from the rotary encoder 12 to the waveform shaping circuit 20 and a waveform shaped output Sb is outputted from the waveform shaping circuit 20. In response to the waveform shaped output Sb, a one rotation period T of the roller 12a is measured by the rotation time measurement section 21 (step F101). Then, using the one rotation period T, a deviation d is calculated in the deviation calculation section 22 as described above, and the deviation d is supplied to the control output calculation section 25 (step F102). The control output calculation section 25 calculates a servo control value $L_N$ for a current control cycle from the deviation d, a gain coefficient K, a control constant A and another servo control value L in a preceding control cycle (step F103), and supplies the servo control value LN to the output storage section 26 so that it may be stored into the output storage section 26 (step F104). The servo control value L thus stored is converted into a PWM signal by the data conversion section 27 (step F105), and in response to the PWM signal, the motor servo circuit 28 develops a servo output EM to control driving of the reel motor 11 (step F106).

The sequence of operations described above is repeated, and as the operations proceed, the speed of rotation of the reel motor 11 decreases gradually in accordance with the diameter of the magnetic tape 1 wound on the take-up reel 3 while the feeding speed of the magnetic tape 1 is kept substantially constant.

Figure 4:
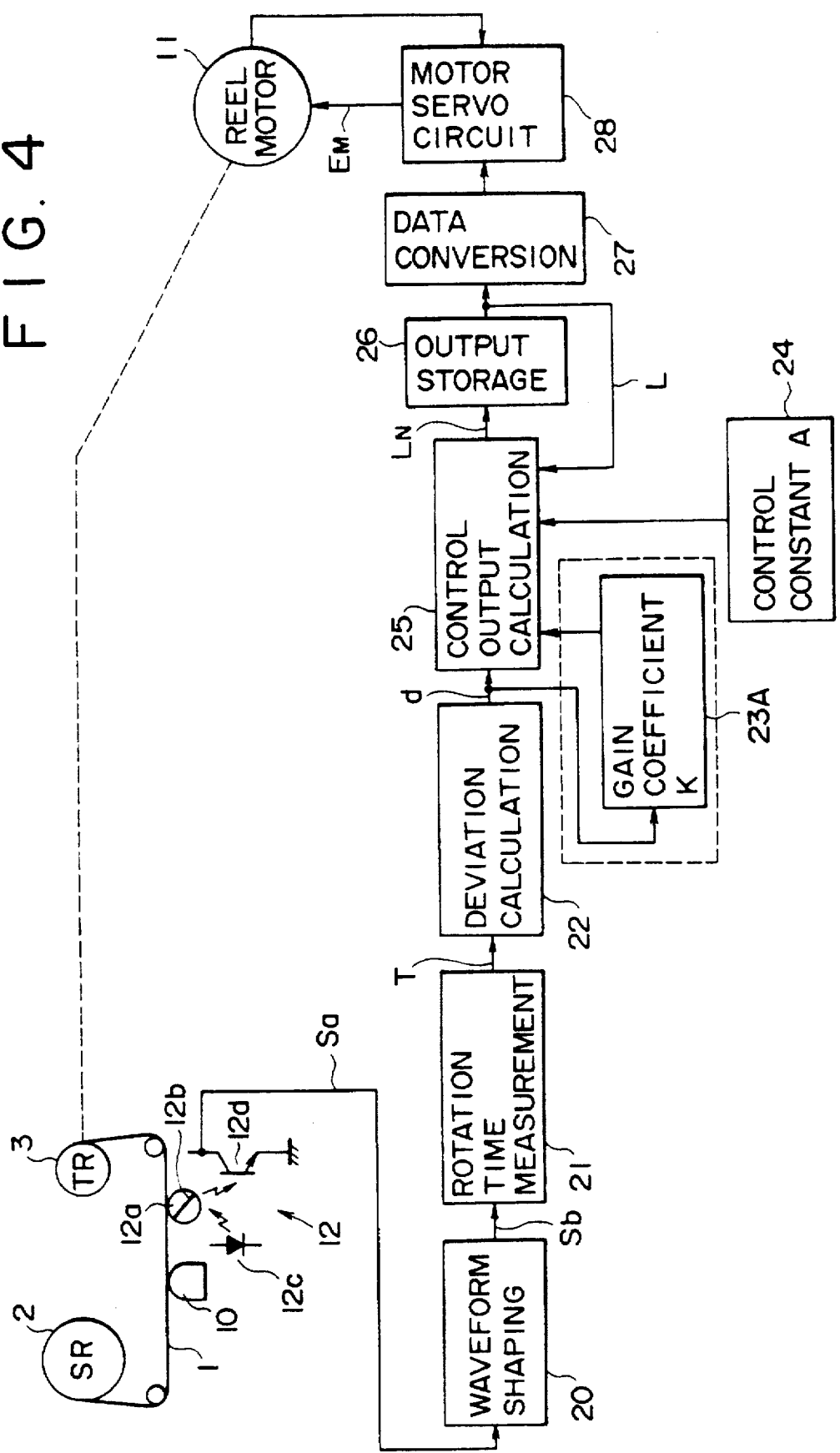
FIG. 4 is a block diagram of another recording and/or reproducing apparatus showing a second preferred embodiment of the present invention.

Referring now to FIG. 4, there is shown in block diagram another recording and/or reproducing apparatus to which the present invention is applied. The recording and/or reproducing apparatus is a modification to the recording and/or reproducing apparatus of the preceding embodiment and therefore has a similar basic construction including common elements, and overlapping description of the common components is omitted herein to avoid redundancy. It is to be noted that this similarly applies to recording and/or reproducing apparatus of the other embodiments which will be hereinafter described.

In the recording and/or reproducing apparatus of the present embodiment, a deviation d outputted from the deviation outputting section 22 is supplied to a gain coefficient generation section 23A, and the gain coefficient generation section 23A controls the gain coefficient K to be outputted therefrom in response to the deviation d.

Figure 6A:
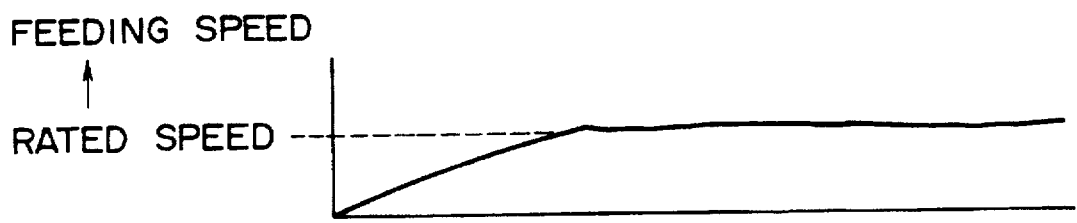
FIGS. 6(a) to 6(c) are time charts illustrating servo conditions of the recording and/or reproducing apparatus of FIG. 4.

While the servo responsibility is set in accordance with the gain coefficient K as described above, when the tape feeding speed is stable at the rated speed, the servo responsibility should be comparatively low so that the stable condition may not be disturbed readily by an influence of noise or the like. However, where the servo responsibility is set low, a long period of time is required until the rated speed is reached after the start of feeding of the tape 1 as seen from FIG. 6(a).

Figure 6B:
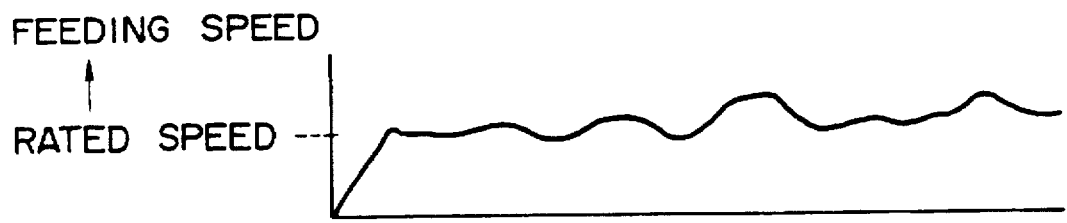

On the other hand, when it is desired for the rated speed to be reached in a short period of time after the start of feeding of the tape 1, a servo gain should be raised to set the responsibility to a high level. In this instance, however, the servo function responds to a very low noise as seen from FIG. 6(b), which makes the tape feeding speed during rated speed feeding unstable.

Therefore, in the recording and/or reproducing apparatus of the present embodiment, when the deviation d is great, that is, when the difference between the tape feeding speed and the rated speed is great, the gain coefficient K is set high, but on the contrary when the tape feeding speed is approximate to the rated speed, the gain coefficient K is set low.

Figure 5:
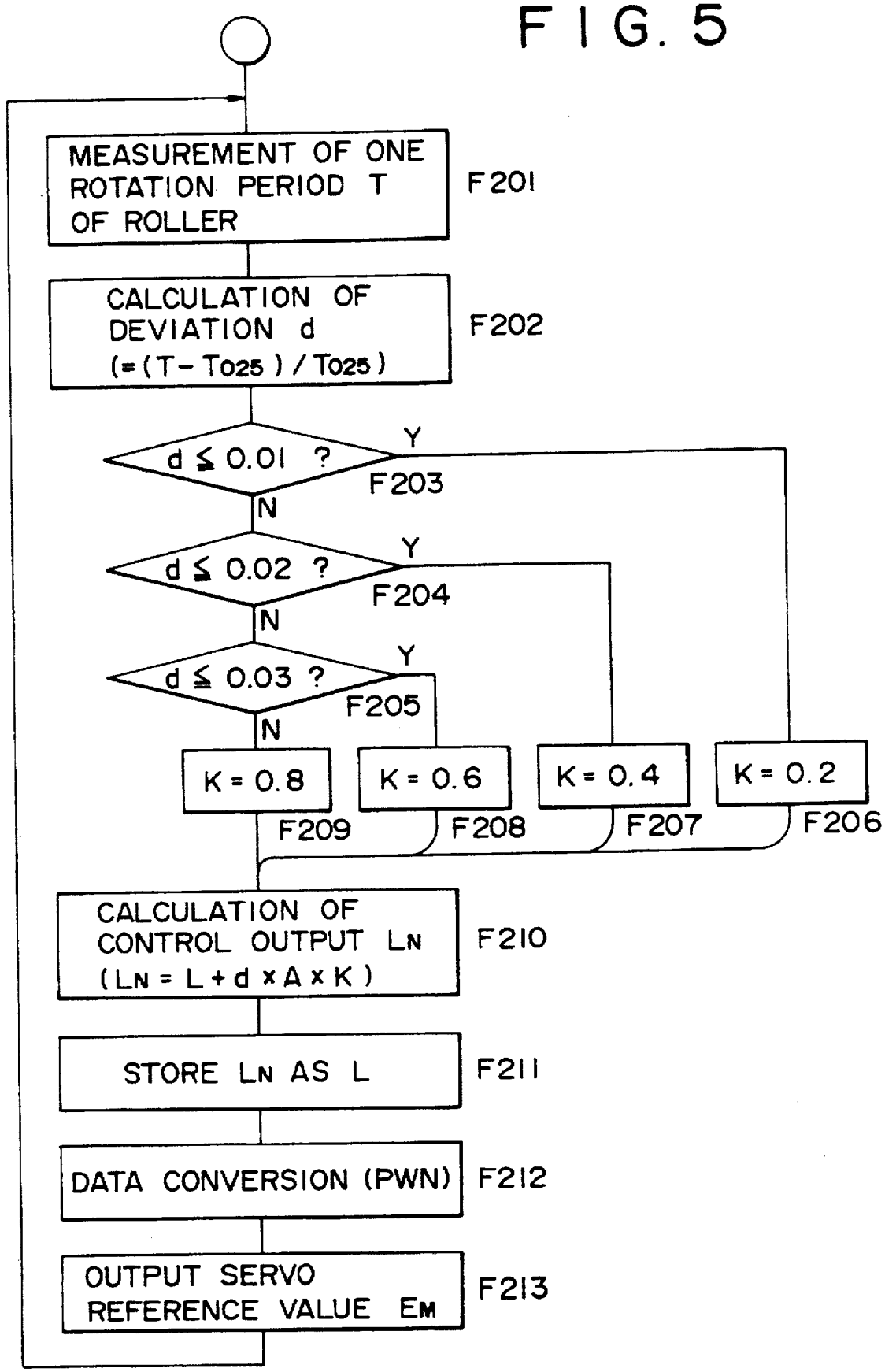
FIG. 5 is a flow chart illustrating operation of the recording and/or reproducing apparatus of FIG. 4.

A servo operation of the recording and/or reproducing apparatus of the present embodiment is illustrated in the flow chart of FIG. 5. Referring to FIGS. 4 and 5, when the magnetic tape 1 is fed, the roller 12a is rotated by the magnetic tape 1, and thereupon, rotational speed information Sa is outputted from the rotary encoder 12 and a waveform shaped output Sb is outputted from the waveform shaping circuit 20. In response to the waveform shaped output Sb, a one rotation period T of the roller 12a is measured by the rotation time measurement section 21 (step F201), and then a deviation d is calculated in, the deviation calculation section 22 and supplied to the control output calculation section 25 (step F202).

The deviation d is supplied also to the gain coefficient generation section 23A, in which a discrimination operation for the deviation d supplied thereto is performed at steps F203, F204 and F205. Then, if the deviation d is d≦0.01, or in other words, if the current tape feeding speed is not very much different from the rated feeding speed, then the gain coefficient generation section 23A outputs a gain coefficient K of K=0.2 (step F206). In short, the servo gain is restricted low to assure a comparatively low responsibility.

On the other hand, if the deviation d is d≦0.02, then the gain coefficient generation section 23A outputs a gain coefficient K of K=0.4 (step F207), but if the deviation d is d≦0.03, then the gain coefficient generation section 23A outputs a gain coefficient K of K=0.6 (step F208). Nevertheless, when the deviation d is greater than 0.03, in other words, when the current tape feeding speed is different by a great amount from the rated feeding speed, then the gain coefficient generation section 23A outputs a gain coefficient K of K=0.8 (step F209). In short, the servo gain is set high to assure a high responsibility.

The control output calculation section 25 calculates a servo control value $L_N$ for a current control cycle from the deviation d, a gain coefficient K, another servo control value L in a preceding control cycle and the gain coefficient K obtained in such a manner as described above from the gain coefficient generation circuit 23A (step F210), and supplies the servo control value $L_N$ to the output storage section 26 so that it may be stored into the output storage section 26 (step F211). The servo control value L thus stored is converted into a PWM signal by the data conversion section 27 (step F212), and in response to the PWM signal, the motor servo circuit 28 develops a servo output EM to control driving of the reel motor 11 (step F213).

Figure 6C:
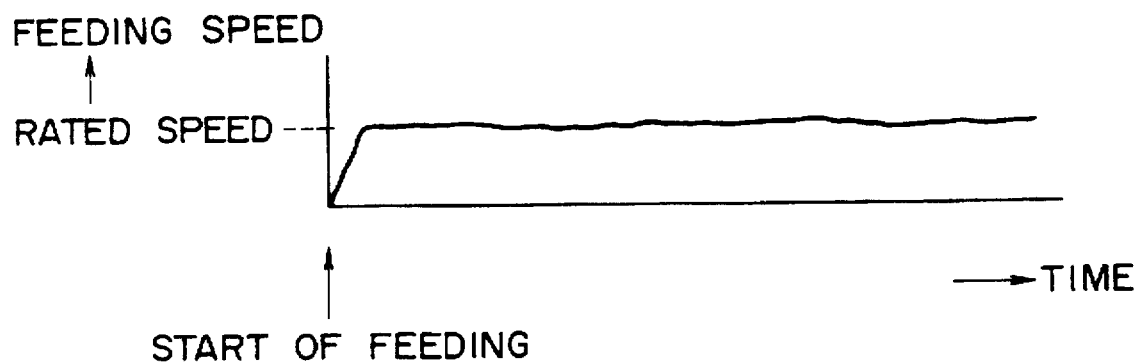

By varying the gain coefficient in response to the deviation d as described above, a rise to the rated speed upon starting rotation of the reel can be achieved rapidly as, for example, seen from FIG. 6(c) and the stability of the tape feeding operation upon rated speed feeding can be realized.

While the recording and/or reproducing apparatus of the first and second embodiments described above are constructed such that a deviation is calculated from a period of rotation of the roller and servo control is executed in accordance with the deviation, the servo control may alternatively be executed in accordance with another parameter.

Figure 7:
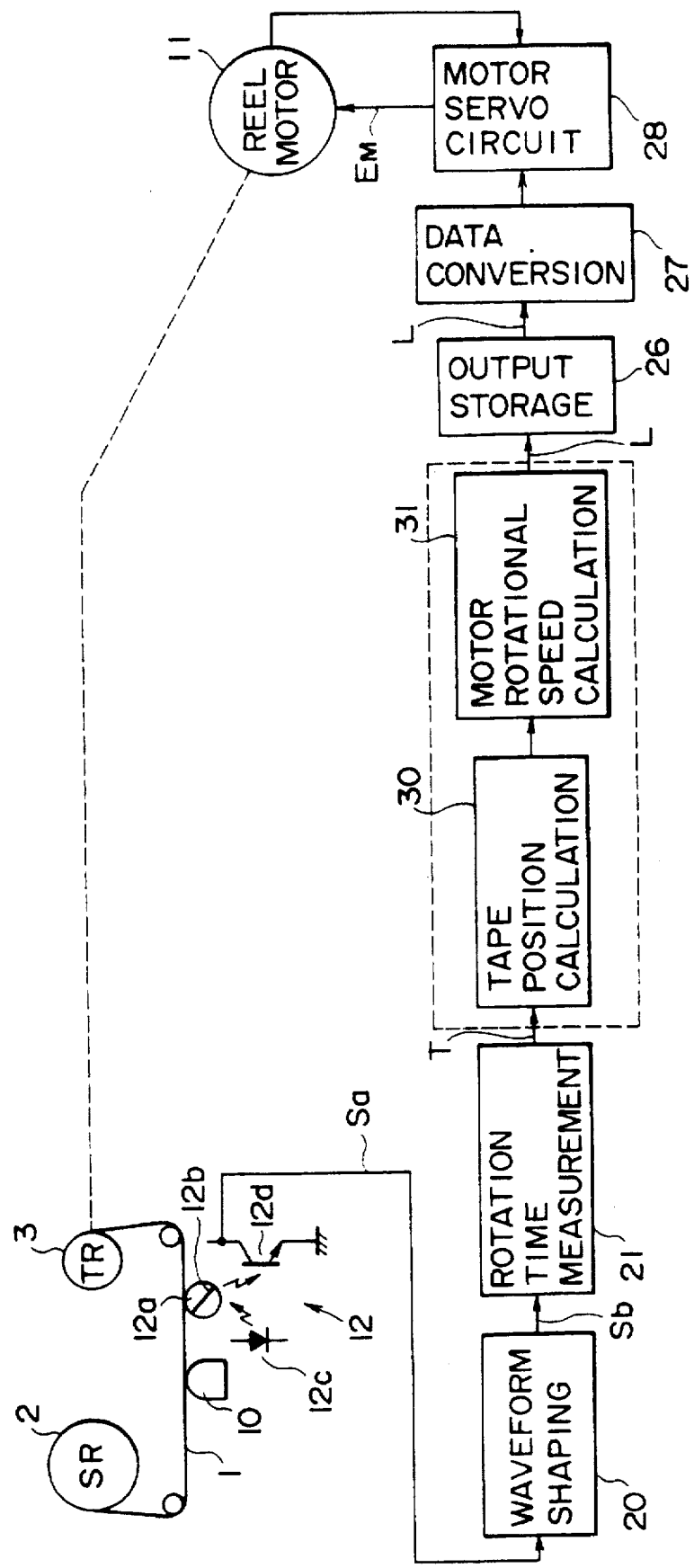
FIG. 7 is a block diagram of a further recording and/or reproducing apparatus showing a third preferred embodiment of the present invention.

Referring now to FIG. 7, there is shown in block diagram a further recording and/or reproducing apparatus to which the present invention is applied. The recording and/or reproducing apparatus of the present embodiment is constructed such that the current feeding position of the magnetic tape 1 is calculated from a one rotation period of the roller 12a and a speed M of rotation of the reel motor 11 is calculated from the thus calculated feeding position and used as a servo control value.

In particular, if the initial value of the speed of rotation of the reel motor 11 (a speed of rotation of the reel motor 11 at which the rated speed is obtained, for example, at the terminal end of the magnetic tape 1) and the diameter of the reel are known, then the current diameter of the magnetic tape 1 wound on the take-up reel 3 can be calculated from the output of the rotary encoder 12. Consequently, in response to the diameter of the magnetic tape 1 wound on the take-up reel 3, the speed of rotation of the reel motor 11 at which the magnetic tape 1 is fed at the rated speed can be calculated. Servo control is executed making use of this.

The recording and/or reproducing apparatus of the present embodiment includes a tape position calculation section 30 which calculates the tape position TP in accordance with the following equation:

$$TP = \frac{Tr \cdot Va \cdot T_{END} + \pi H^2}{16 R_T^2 \cdot Tr \cdot Va} - \frac{\pi \cdot H^2}{Tr \cdot Va} \text{ (seconds)} \quad (4)$$

where $R_T$ is a period (seconds) of rotation of the roller 12 when the reel motor 11 is driven at a predetermined initial value, $T_T$ is a thickness (mm) of the magnetic tape 1, $V_0$ is a rated feeding speed (mm/second) of the magnetic tape 1, $T_{END}$ is a time (seconds) required to feed the magnetic tape 1 from the start end to the terminal end, H is a radius (mm) of the take-up reel 3, and π is the circle ratio. It is to be noted that the tape position TP obtained by the equation (4) above is a value when the reel motor 11 is rotating at the initial value, and when the initial value is a value at which the rated speed is obtained at the start end of the magnetic tape 1, $T_{END}=0$.

A motor rotational speed calculation section 31 calculates the speed of rotation of the reel motor 11 in response to the tape position TP calculated by the tape position calculation section 30.

In particular, the motor rotational speed calculation section 31 calculates a magnification M of the initial value of the motor rotational speed and multiplies the initial value M by the magnification M to obtain a motor rotational speed. The magnification M is given by the following expression:

$$M = \sqrt{(Tr \cdot Va \cdot T_{END} + \pi H^2)/(Tr \cdot Va \cdot T_P + \pi H^2)} \quad (5)$$

After the magnification M is obtained, the motor rotational speed calculation 31 multiplies the initial value by the magnification M to obtain a motor rotational speed and generates a servo control value L corresponding to the motor rotational speed thus obtained. The servo control value h is supplied by way of the output storage section 28 to the data conversion section 27, and the motor servo circuit 27 outputs a servo control signal EM in response to an output signal of the data conversion section 27 so that the rotational speed of the reel motor 11 may coincide with the motor rotational speed calculated by the motor rotational speed calculation section 31.

Also with the recording and/or reproducing apparatus of the construction described above, constant speed feeding control of the magnetic tape 1 is realized.

Figure 8:
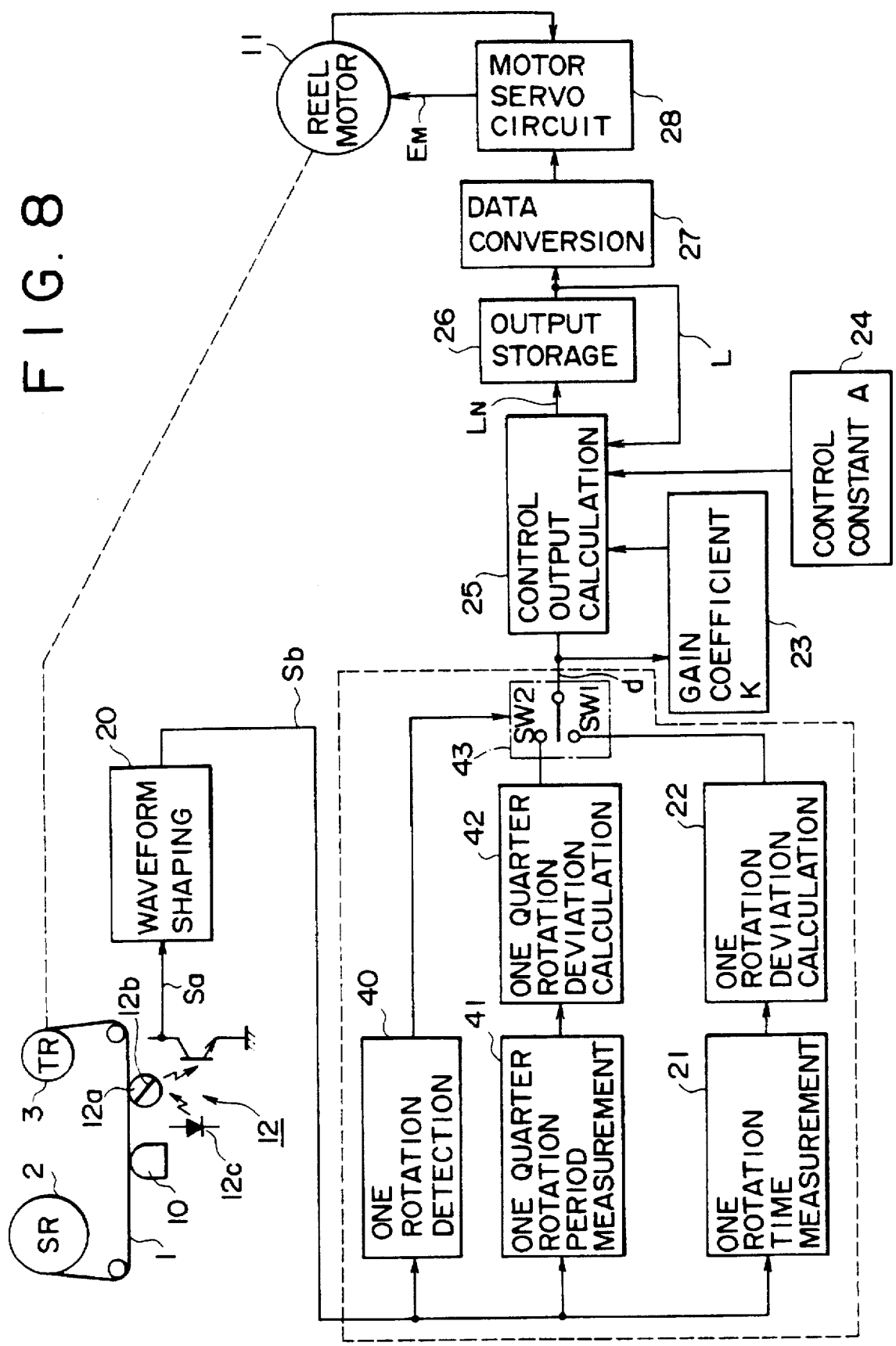
FIG. 8 is a block diagram of a still further recording and/or reproducing apparatus showing a fourth preferred embodiment of the present invention.

Referring now to FIG. 8, there is shown a recording and/or reproducing apparatus according to a fourth preferred embodiment of the present invention. In the recording and/or reproducing apparatus, a one rotation detection section 40 counts the rising edges of pulses Sb outputted from the waveform shaping circuit 20 to detect that the roller 12a has been rotated one full rotation after starting of feeding of the magnetic tape 1. In the recording and/or reproducing apparatus, a detection pulse is obtained for each one fourth rotation of the roller 12a, and accordingly, when the rising edge of the third pulse is counted, the one rotation detection section 40 develops an output of one rotation detection.

A one quarter rotation time measurement section 41 calculates a period of one quarter rotation of the roller 12a from the output Sb of the waveform shaping circuit 20. One quarter rotation of the roller 12a corresponds to a period of T/4 in FIG. 11(b), that is, a period from the rising edge to the falling edge of a pulse.

A deviation calculation section 42 holds in advance therein one quarter rotation period information (hereinafter referred to as ¼ rated period information $T_{025}Q$) at the rated speed in feeding of the magnetic tape 1. It is to be noted that here the ¼ rated period information $T_{025}Q$ is information for 0.0625 seconds.

The deviation calculation section 42 calculates a deviation d using the ¼ rated period information $T_{025}Q$ and the actual ¼ rotational period (T/4) inputted thereto from the one quarter rotation time measurement section 41. In this instance, the deviation d is calculated in accordance with the following equation:

$$d = \frac{4/T - T_{o25}Q}{T_{o25}Q} \quad (6)$$

A switching circuit 48 has a contact SW1 to which the deviation d outputted from the deviation calculation section 22 is supplied and another contact SW2 to which the deviation d outputted from the deviation calculation section 42 is supplied. Upon the start of feeding of the magnetic tape 1, the switching circuit 43 is switched to the contact SW2, but in response to a one rotation detection output of the one rotation detection section 40, the switching circuit 43 is switched to the contact SW1.

In the recording and/or reproducing apparatus of the fourth embodiment of the construction described above, except upon the start of feeding of the magnetic tape 1, servo control is executed in accordance with a servo control value $L_N$ obtained by calculation of the equation (3) above in accordance with a deviation d calculated from a one rotation period of the roller 12a obtained from the deviation calculation section 22, and consequently, the speed of rotation of the reel motor 11 is controlled so that the feeding speed of the magnetic tape 1 may be kept substantially constant from the start end to the terminal end of the magnetic tape 1.

Figure 12A:
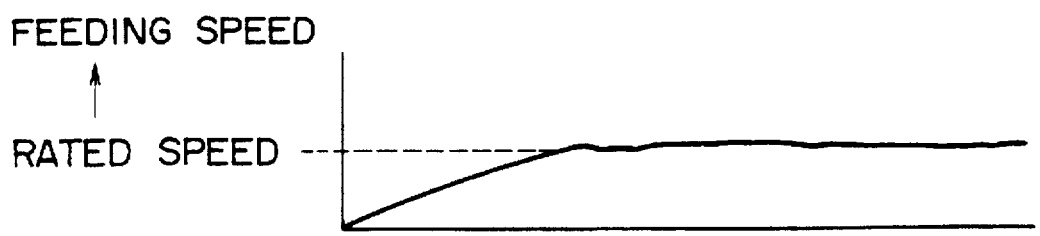
FIGS. 12(a) to 12(d) are time charts illustrating servo conditions of the recording and/or reproducing apparatus of FIG. 8.
Figure 12B:
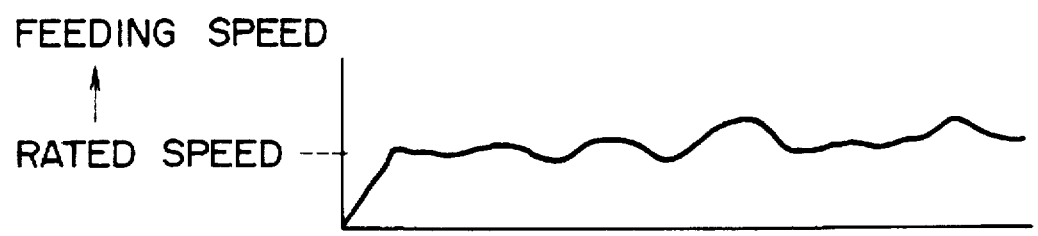
Figure 12C:
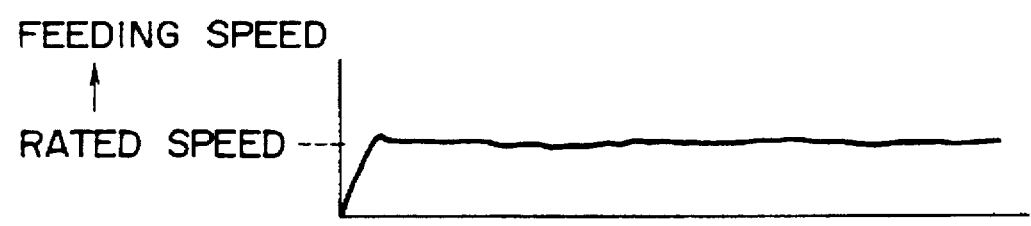

In this instance, a servo responsibility is set in response to a value of the gain coefficient K described above. If the gain coefficient K is varied in response to the value of the deviation d similarly as in the second embodiment described above, then a rise of the feeding speed of the magnetic tape 1 to the rated speed upon the start of rotation of the reel can be achieved comparatively rapidly as seen from FIG. 12(c).

Even where such coefficient variation control is performed, there still is some limitation in reduction of the rise time of the motor to the rated speed.

Figure 12D:
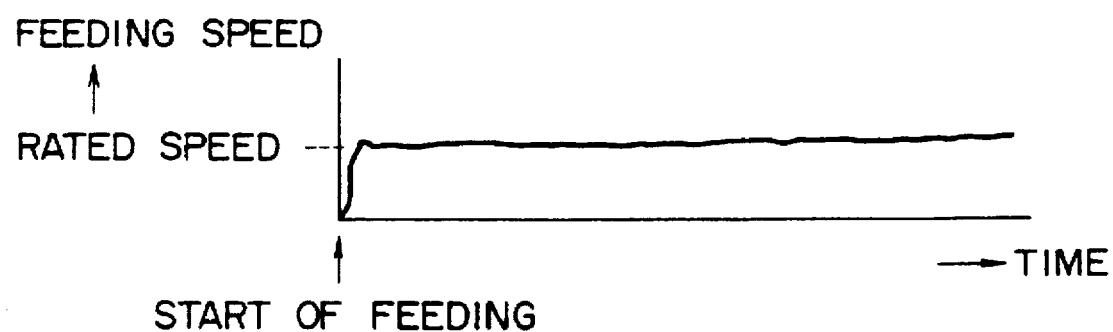

In order to realize a better recording and/or reproducing apparatus of the reel drive type, it is desired to further reduce the rise time of the motor as seen from FIG. 12(d).

Therefore, in the recording and/or reproducing apparatus of the fourth embodiment, upon the start of feeding of the magnetic tape 1, a deviation d is calculated by the deviation calculation section 42 using ¼ period information $T_{o25}Q$ obtained from the one quarter rotation time measurement section 41 and is used in execution of servo control.

Figure 9:
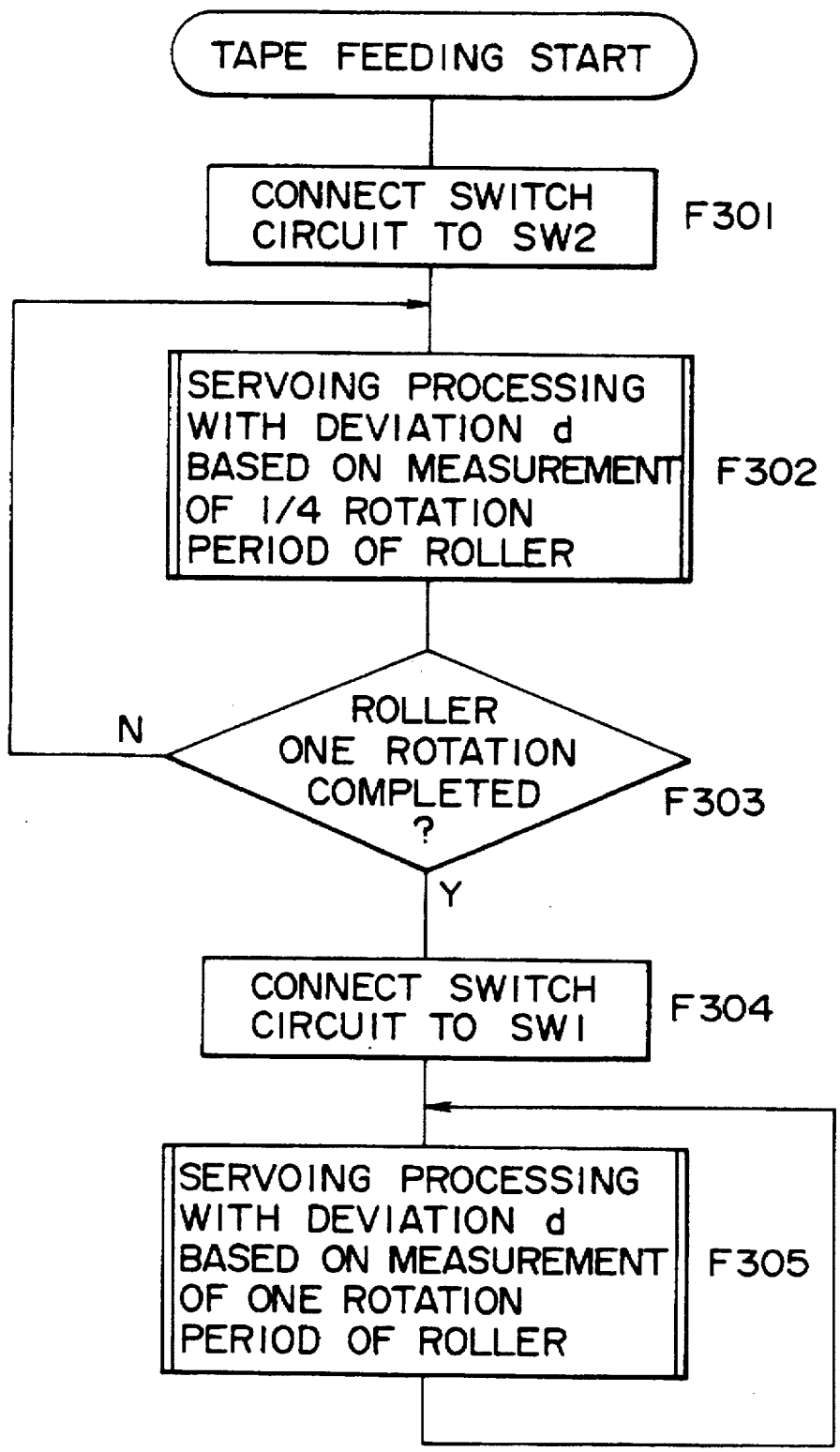
FIG. 9 is a flow chart illustrating operation of the recording and/or reproducing apparatus of FIG. 8.

A servo operation for the speed of rotation of the reel motor 11 in the recording and/or reproducing apparatus is illustrated in FIG. 9. Referring to FIGS. 8 and 9, when feeding of the magnetic tape 1 is to be started, the switching circuit 43 is first controlled to connect to the contact SW2 (step F301), and consequently, a servo operation based on ¼ rotation period measurement of the roller 12a is executed (step F302). Details of the servo operation are illustrated in FIG. 10(b).

Figure 10A:
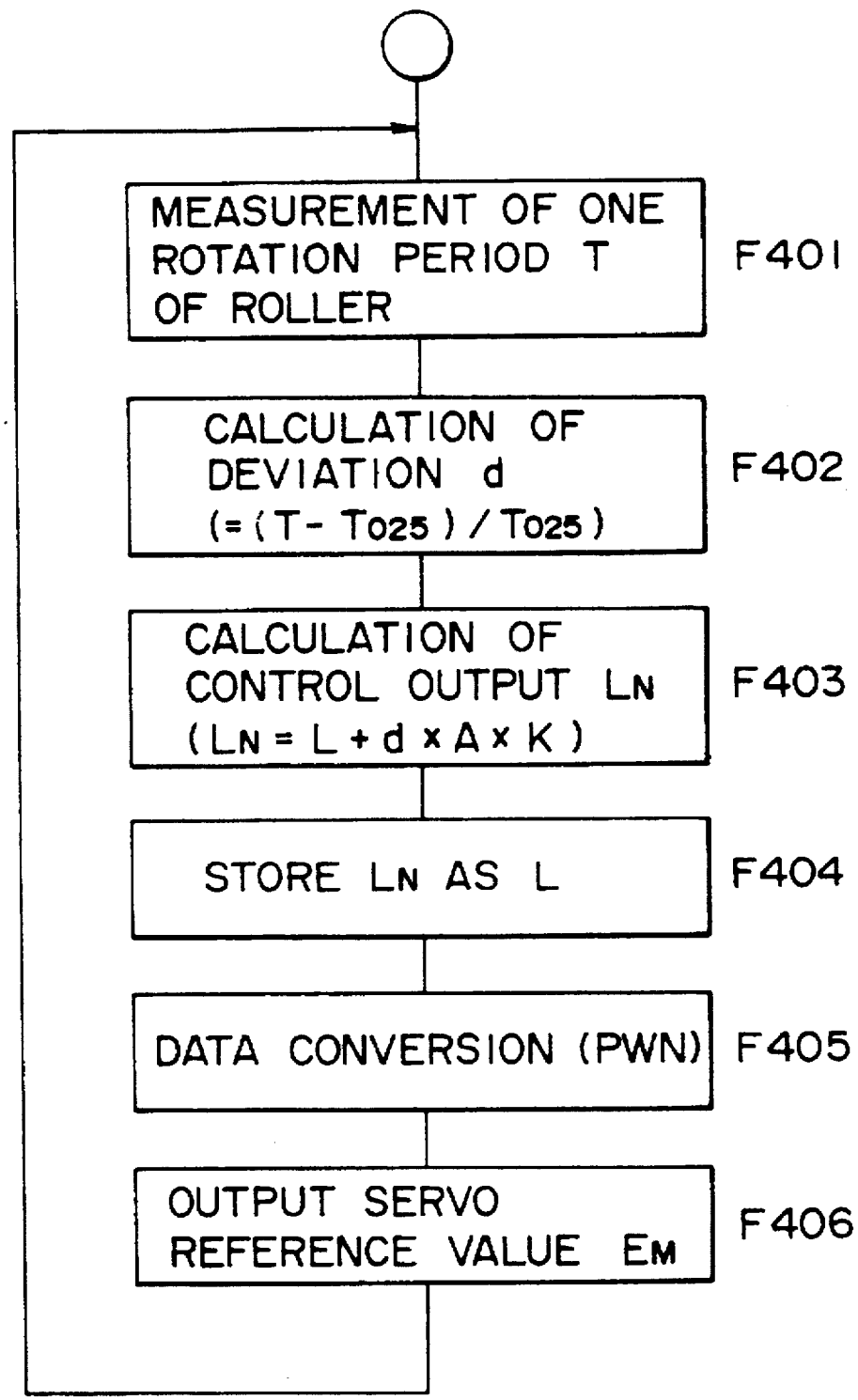
FIGS. 10(a) and 10(b) are flow charts showing subroutines of the flow chart of FIG. 9.
Figure 10B:
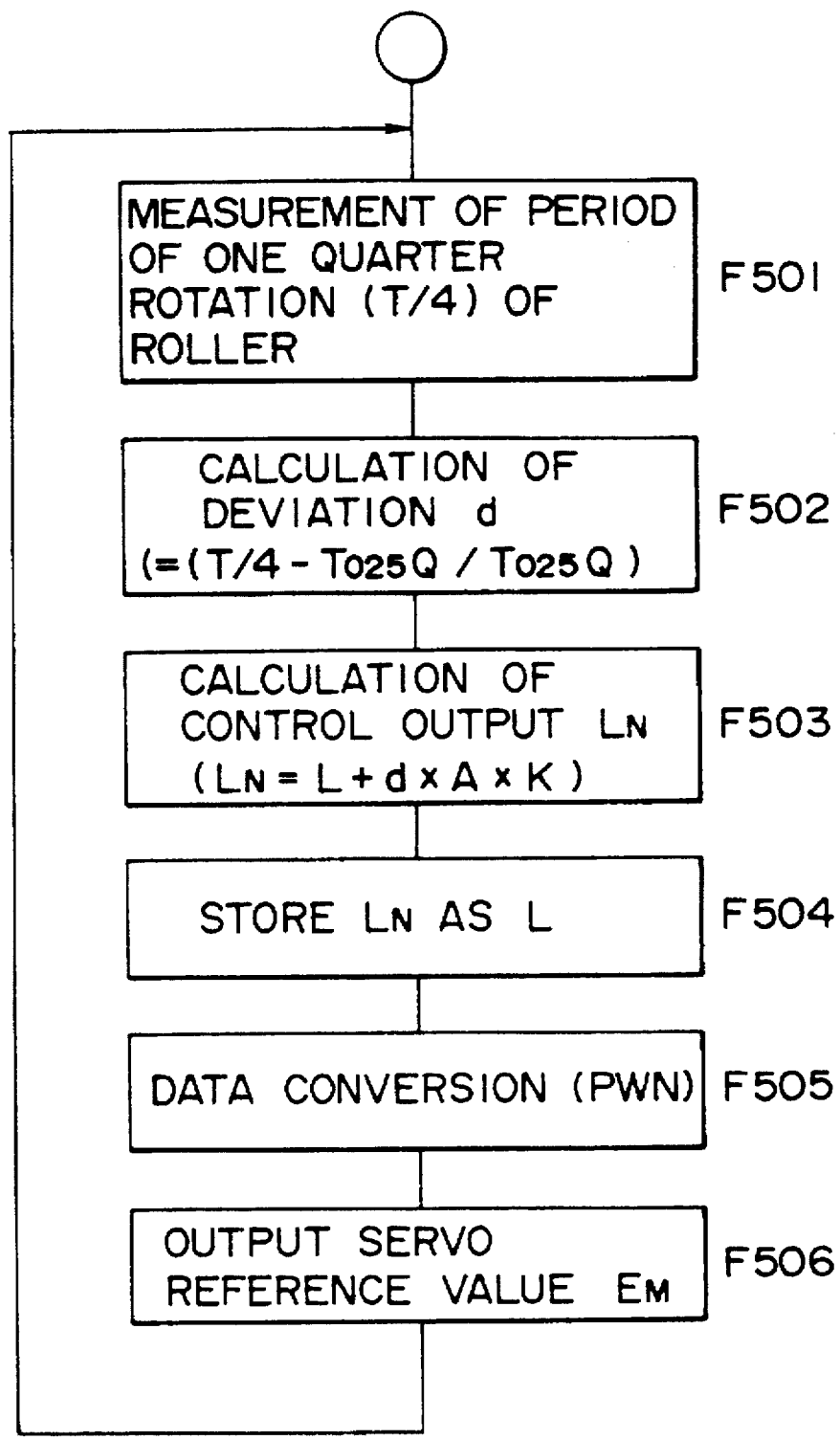

Referring to FIG. 10(b), a ¼ rotation period (T/4) is measured by the one quarter rotation time measurement section 41 (step F501), and a deviation d is calculated by calculation of the equation (6) given hereinabove by the deviation calculation section 42 (step F502). The deviation d is supplied by way of the switching circuit 43 to the control output calculation section 25, in which a servo control value $L_N$ is calculated by calculation of the equation (3) given hereinabove (step F503). It is to be noted that an initial value is stored in the output storage section 26 as a servo control value L in a preceding control cycle which is to be used for calculation of a servo control value $L_N$ in a first control cycle, and the initial value is used for calculation of a servo control value $L_N$ in a first control cycle.

The servo control value $L_N$ is supplied to and stored as a servo control value L into the output storage section 26 (step F504), and the thus stored servo control value L is converted into a PWM signal by the data conversion section 27 (step F505). The motor servo circuit 28 develops a servo output EM in response to the PWM signal to effect driving control of the reel motor 11 (step F506).

The processing of FIG. 10(b) is executed until the roller 12a is rotated one full rotation, that is, executed for each one quarter rotation of the roller 12a and accordingly executed four times for each one rotation.

Referring back to FIG. 9, if completion of one rotation of the roller 12a is detected by the one rotation detection section 40 at step F303, then the switching circuit 43 is controlled to be switched to the contact SW1 (step F304), and then, a servo operation based on one rotation period measurement of the roller 12a is executed (step F305). Details of the servo operation at step F305 are illustrated in FIG. 10(a).

Referring to FIG. 10(a), when the roller 12a is rotated so that rotation speed information Sa is outputted from the rotary encoder 12 to the waveform shaping circuit 20 and a waveform shaped output Sb is outputted from the waveform shaping circuit 20, a one rotation period T of the roller 12a is measured by the rotation time measurement section 21 (step F401). Then, a deviation d is calculated using the one rotation period T by the deviation calculation section 22 as described above and is supplied to the control output calculation section 25 by way of the switching circuit 43 (step F402). The control output calculation section 25 calculates a servo control value $L_N$ for a current control cycle similarly (step F403) and supplies the servo control value $L_N$ to the output storage section 26 so that it is stored as a servo control value L (step F404).

The thus stored servo control value L is converted into a PWM signal by the data conversion section 27 (step F405), and the motor servo circuit 28 develops a servo output EM In response to the PWM signal to effect driving control of the reel motor 11 (step F406).

Figure 13:
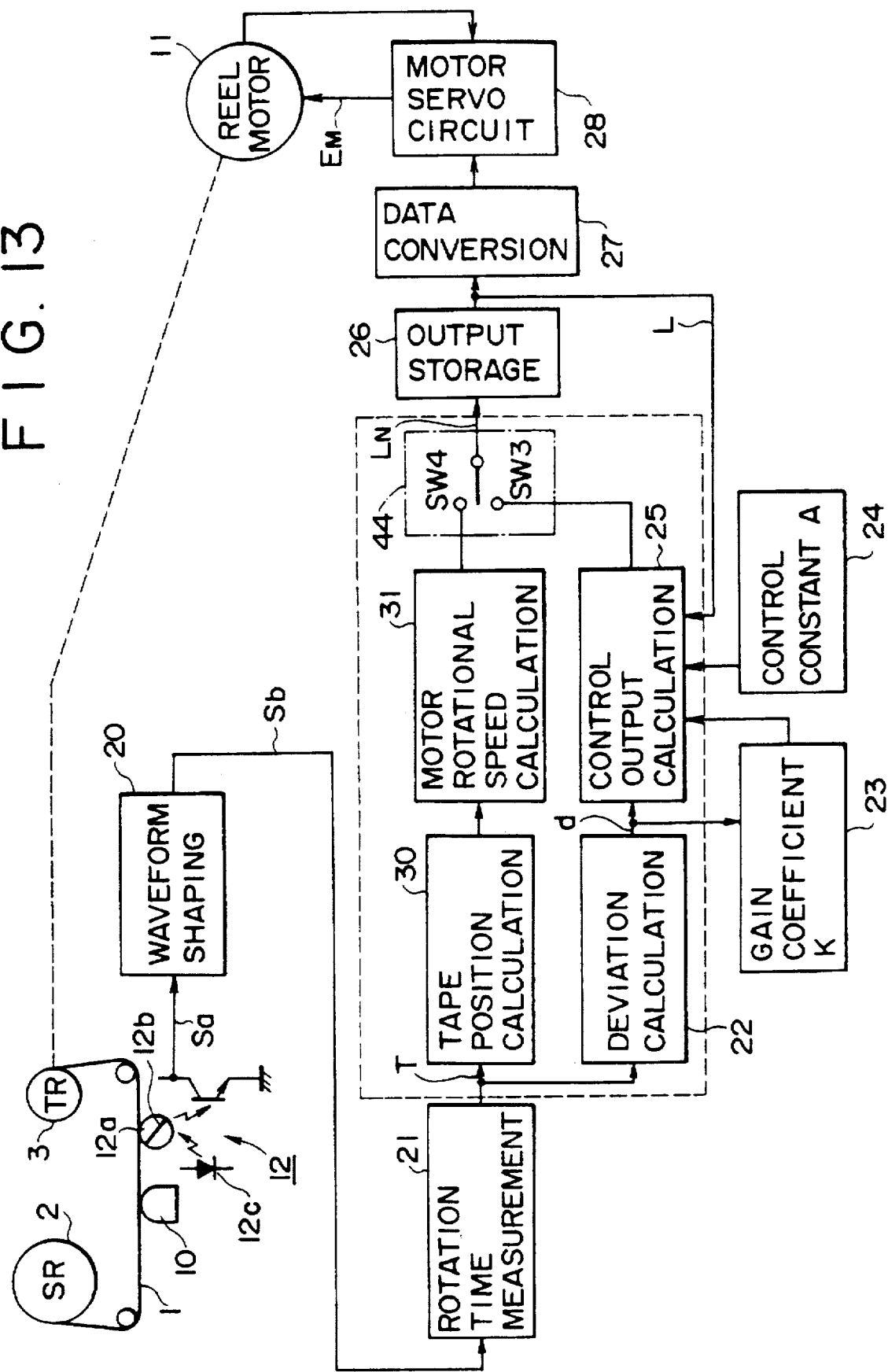
FIG. 13 is a block diagram of a yet further recording and/or reproducing apparatus showing a fifth preferred embodiment of the present invention.

Referring now to FIG. 13, there is shown a recording and/or reproducing apparatus according to a fifth preferred embodiment of the present invention. The recording and/or reproducing apparatus of the present embodiment is constructed such that servo control is executed using a deviation d outputted from the deviation outputting section 22 and a servo control value is obtained from a speed of rotation of the reel motor 11 calculated from a current feeding position of the magnetic tape 1 calculated from a period of rotation of the roller 12a.

In particular, if the initial value of the speed of rotation of the reel motor 11 (a speed of rotation of the reel motor 11 at which the rated speed is obtained, for example, at the terminal end of the magnetic tape 1) and the diameter of the reel are known, then the current diameter of the magnetic tape 1 wound on the take-up reel 3 can be calculated from the output of the rotary encoder 12. Consequently, in response to the diameter of the magnetic tape 1 wound on the take-up reel 3, the speed of rotation of the reel motor 11 at which the magnetic tape 1 is fed at the rated speed can be calculated. Servo control making use of this and servo control based on the deviation d are alternatively executed by the recording and/or reproducing apparatus of the present embodiment.

The recording and/or reproducing apparatus of the present embodiment includes a tape position calculation section 30 which calculates the tape position TP in accordance with the equation (4) given hereinabove.

A motor rotational speed calculation section 31 calculates the speed of rotation of the reel motor 11 in response to the tape position TP calculated by the tape position calculation section 30.

In particular, the motor rotational speed calculation section 31 calculates a magnification M to the initial value of the motor rotational speed and multiplies the initial value by the magnification M to obtain a motor rotational speed. The magnification M is given by the expression (5) given hereinabove.

A switching circuit 44 has a contact SW3 to which a servo control value $L_N$ calculated by the control output calculation section 25 in response to a deviation d outputted from the deviation calculation section 22 is supplied and another contact SW4 to which another servo control value $L_N$ calculated in response to a motor rotational speed obtained by multiplying the initial value by the magnification M by the motor rotational speed calculation section 31 is supplied. Upon the start of feeding of the magnetic tape 1, the switching circuit 44 is switched to the contact SW4, but after servo control is executed based on calculation of a motor rotational speed once, the switching circuit 44 is switched to the contact SW3.

Figure 14:
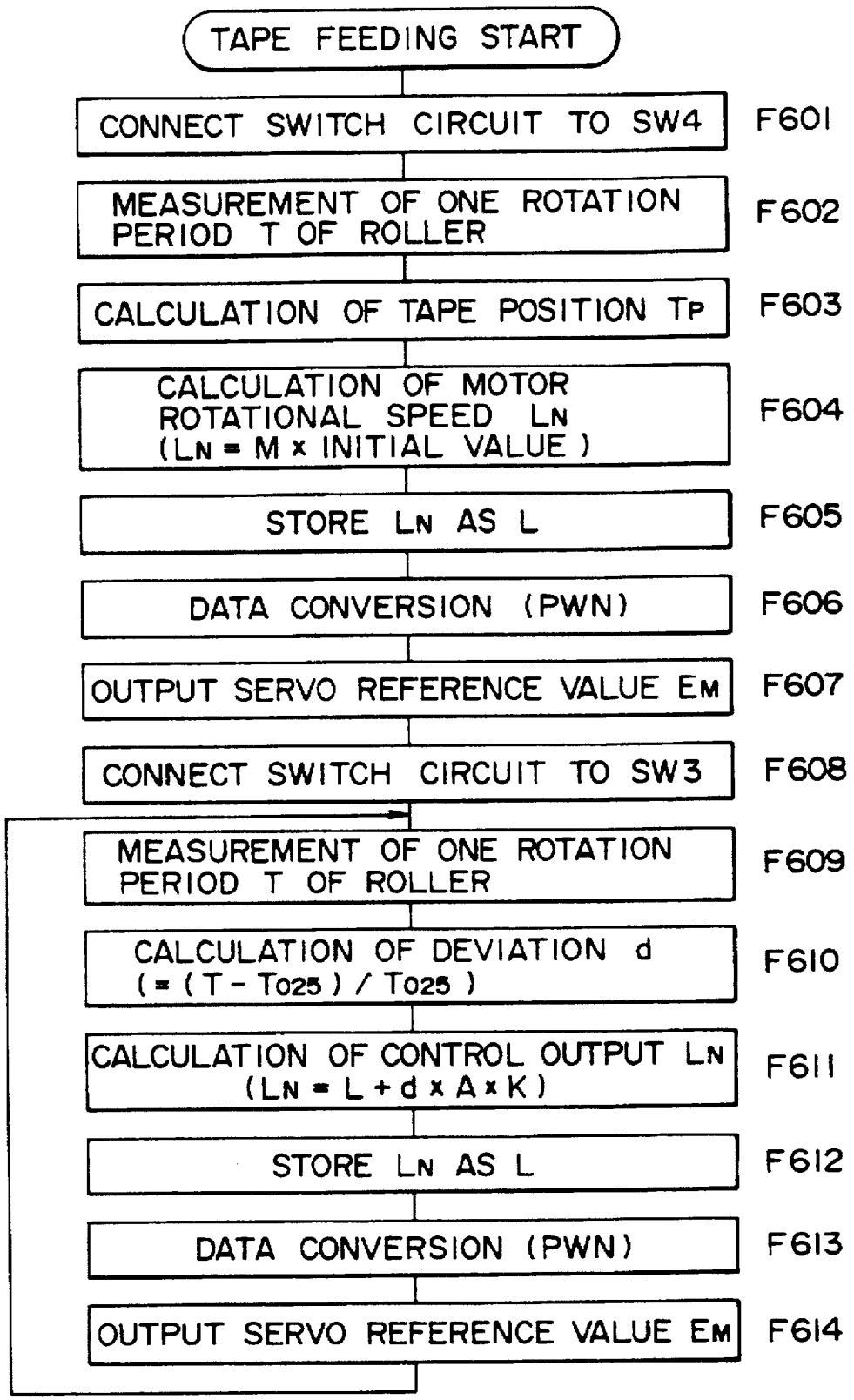
FIG. 14 is a flow chart illustrating operation of the recording and/or reproducing apparatus of FIG. 13.

A servo operation-of the recording and/or reproducing apparatus of the present embodiment is illustrated in FIG. 14.

Referring to FIGS. 13 and 14, when feeding of the tape 1 is to be started, the switching circuit 44 is first controlled to be connect to the contact SW4 (step F601). Accordingly, the tape position calculation section 30 calculates the tape position TP in accordance with the equation (5) given hereinabove from the rotation period T measured by the rotational time measurement section 21 (steps F602 and F603), and the motor rotational speed calculation section 31 calculates the magnification M in accordance with the equation (6) given hereinabove, whereafter a servo control value $L_N$ is calculated by multiplying the initial value by M (step F604).

The servo control value $L_N$ is supplied to and stored as a servo control value L into the output storage section 26 (step F605), and the thus stored servo control value L is converted into a PWM signal by the data conversion circuit 27 (step F606). The motor servo circuit 28 develops a servo output EM in response to the PWM signal to effect driving control of the reel motor 11 (step F607).

In short, since the present servo operation does not employ a feedback system using a deviation d, rotation of the reel motor 11 rises immediately (for example, in less than 1 second) to a speed in the proximity of a motor rotational speed which is appropriate for the current tape position.

After the servo control is executed, the switching circuit 44 is connected to the contact SW3 (step F608), and using the deviation d, servo control wherein the deviation d is converged so that it may be minimized is executed (steps F609 to F614). It is to be noted that the operation of the loop of the steps F609 to F614 is similar to that of FIG. 10(a) described above, and accordingly, overlapping description thereof is omitted herein to avoid redundancy.

Also with the recording and/or reproducing apparatus of the reel drive type of the construction described above, constant speed feeding control of the magnetic tape 1 is realized, and besides, a rapid rise in feeding is realized. Further, except upon starting of feeding of the magnetic tape 1, feedback control which minimizes the deviation d is executed, and consequently, a similar effect to that of the fourth embodiment described above that a stabilized servo operation is realized with an inexpensive and simple construction which is not influenced readily by an error in calculation, a temperature characteristic of an element, a variation of the power source voltage and so forth.

It is to be noted that the recording and/or reproducing apparatus of the present embodiment may be modified so that a one rotation detection section 40 is provided similarly as in the recording and/or reproducing apparatus of the fourth embodiment described above so as to control the switching circuit 44.

Figure 15:
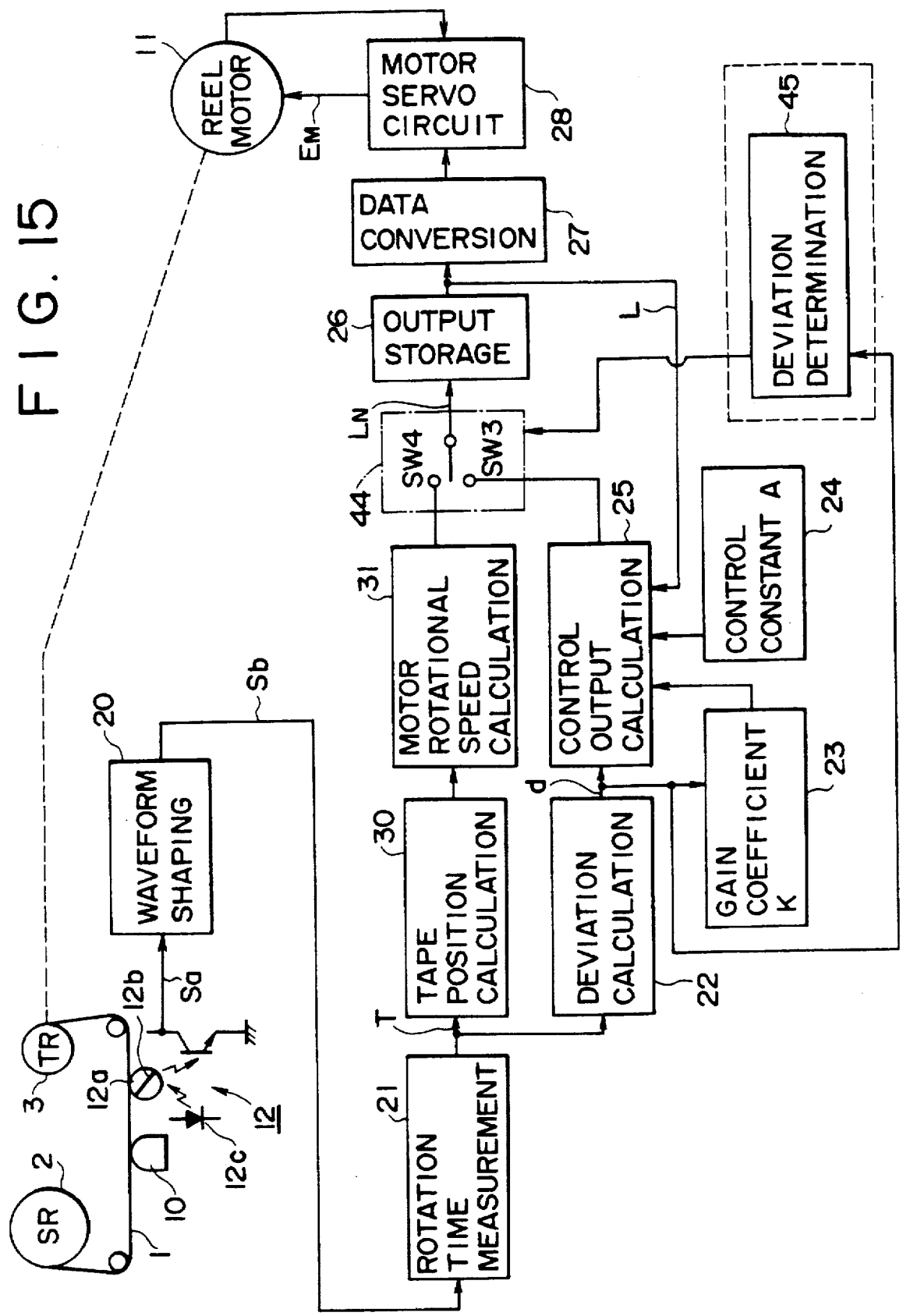
FIG. 15 is a block diagram of a yet further recording and/or reproducing apparatus showing a sixth preferred embodiment of the present invention.

Such modified recording and/or reproducing apparatus is shown as a sixth preferred embodiment of the present invention in FIG. 15. In particular, referring to FIG. 15, the recording and/or reproducing apparatus of the present embodiment is constructed such that it includes a deviation discrimination section 45 in addition to the construction of FIG. 13 described above, and the deviation discrimination section 45 compares a deviation d with a predetermined reference value and controls switching of the switching circuit 44 in response to a result of the comparison.

Figure 16:
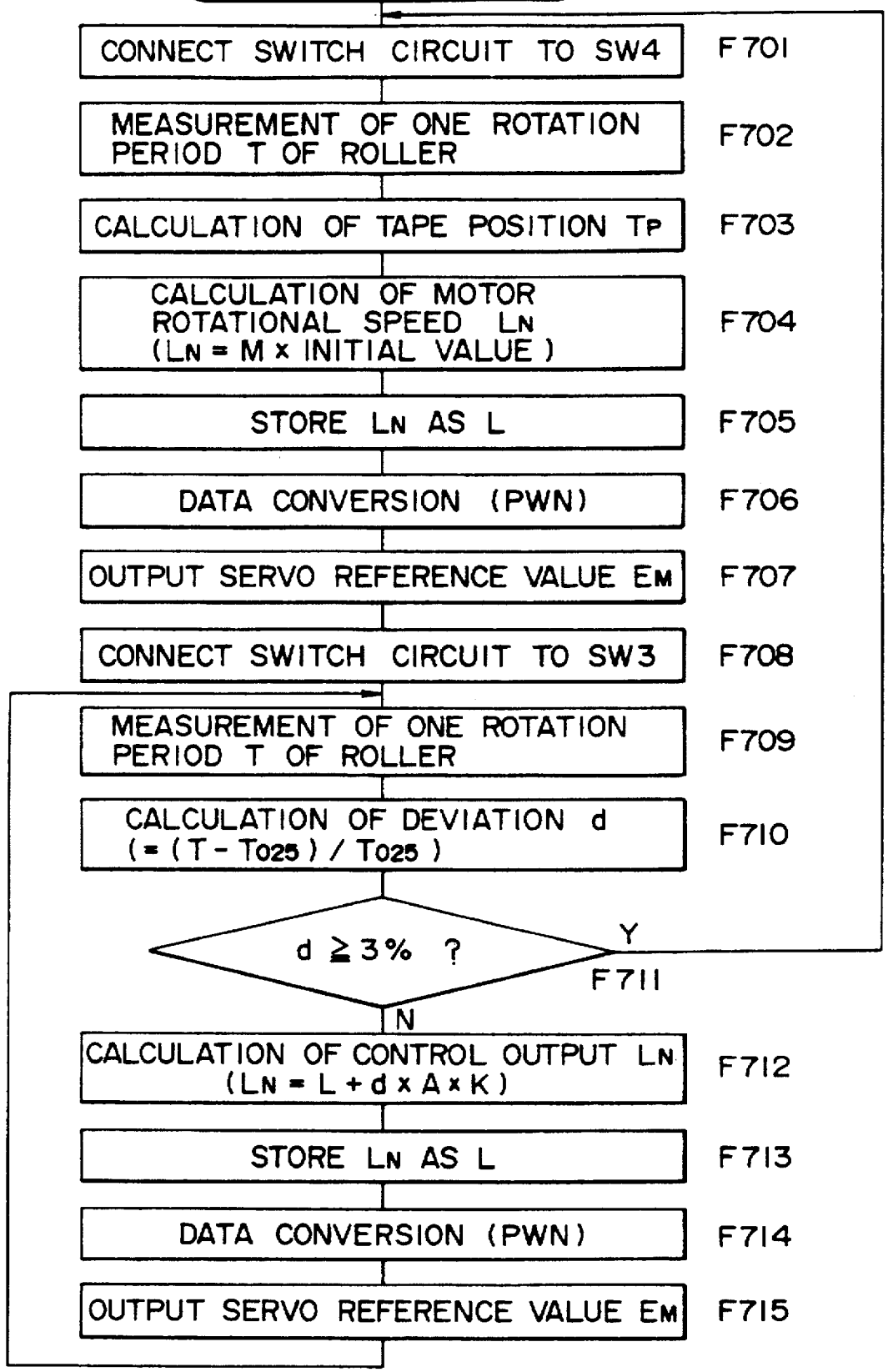
FIG. 16 is a flow chart illustrating operation of the recording and/or reproducing apparatus of FIG. 14.

Servo operation of the recording and/or reproducing apparatus is illustrated in FIG. 16. Referring to FIG. 16, the processing at steps F780 to F710 in the flow chart of FIG. 16 is similar to the processing at steps F601 to F610 of FIG. 14 and the processing at steps F712 to F715 is similar to the processing at steps F611 to F614 of FIG. 14. In other words, the servo operation of the recording and/or reproducing apparatus of the present embodiment includes deviation discrimination processing at step F711 in addition to the processing of FIG. 14.

After servo control for the first time after the start of feeding of the magnetic tape 1 is first executed in accordance with a servo control value L based on tape position calculation (steps F701 to F708), servo control in accordance with a servo control value L based on a deviation d is executed. During the servo control (steps F709 to F715) in accordance with the servo control value L based on the deviation d, the deviation d is compared with a reference value of, for example, 0.03 by the deviation discrimination section 45 (step F711). If the deviation d is d<0.03, then it is determined that the tape feeding speed is not displaced by a great amount from the rated speed, and servo control based on the deviation d is continued, but on the contrary if the deviation d is d≦0.03, then it is determined that the feeding speed is displaced by a great amount from the rated speed by some cause, and the switching circuit 44 is switched to the contact SW4 so that a servo operation in accordance with a servo control value L based on calculation of the tape position is executed (steps F711 to F701). Then, after the servo control is executed once, the switching circuit 44 is returned to the contact SW3 to resume the servo control based on the deviation d.

In the recording and/or reproducing apparatus of the present embodiment, not only upon the start of feeding of the magnetic tape 1 but also when the feeding speed is displaced by a great amount, a servo operation based on calculation of the tape position is executed, and accordingly, the recording and/or reproducing apparatus is advantageous, in addition to the advantages of the first and second embodiments described above, in that recovery to the rated speed upon occurrence of displacement of the feeding speed is achieved rapidly.

It is to be noted that the deviation discrimination section 45 of the recording and/or reproducing apparatus of the present embodiment may additionally be provided In the recording and/or reproducing apparatus of the-first embodiment so that, not only upon starting of feeding of the magnetic tape 1 but also when the deviation is increased excessively by displacement of the feeding speed, a servo operation may be executed using a deviation d calculated in units of a period of one quarter rotation.

Figure 17:
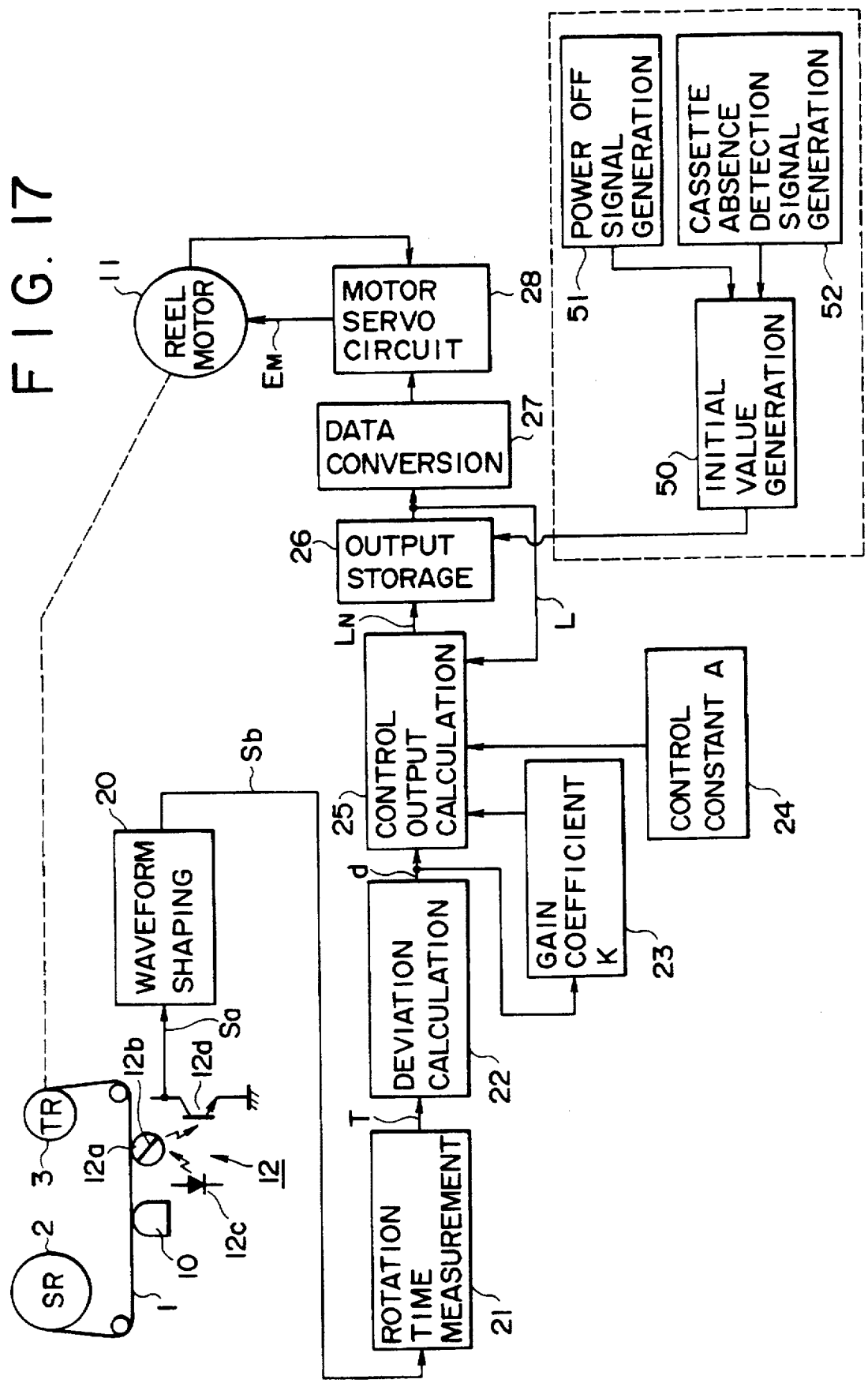
FIG. 17 is a block diagram of a yet further recording and/or reproducing-apparatus showing a seventh preferred embodiment of the present invention.

Referring now to FIG. 17, there is shown in block diagram a recording and/or reproducing apparatus according to a seventh preferred embodiment of the present invention. The recording and/or reproducing apparatus of the present embodiment is constructed such that a servo control value set as an initial value into the output storage section 26 is used only upon the initial start of feeding of the magnetic tape 1 after loading of a cassette or turning on of the power source.

In particular, if, upon start of feeding of the magnetic tape 1, driving of the reel motor is started using a predetermined initial value every time and a deviation d or a tape position TP is calculated from a feeding condition of the tape 1 by rotation of the motor to effect servo control, then the period of time until servo control for a first control cycle is executed (feedback period of the servo system) is a time necessary for a rise of feeding at all, and consequently, the time needed a rising operation to the rated speed cannot be decreased any more. Therefore, the initial value is used only at necessary minimum opportunities, and in any other case, servo control is started with a servo control value L in a preceding control cycle.

For example, when it is considered that reproduction or recording (FWD) and stopping are repeated as seen from FIG. 19(a), if servo control is started for each reproducing or recording operation, a period that cannot be shortened occurs and delays a rise to the rated speed as seen from FIG. 19(a). However, an initial value must be used without fail only upon the start of the initial feeding of the magnetic tape 1 after loading of a cassette or turning on of the power source. In any other case, it is suitable to use a servo control value L in a preceding control cycle (that is, a control cycle immediately before stopping). By using a servo control value L in a preceding control cycle in this manner, further reduction of the time can be realized for the start of feeding of the magnetic tape 1 for the second or following time after a cassette is loaded in position or the power source is turned on as seen from FIG. 19(b).

Referring back to FIG 17, the recording and/or reproducing apparatus of the seventh embodiment of the present invention includes an initial value generation section 50 for outputting and placing an initial value into the output storage section 28, a power source turning off signal generation section 51, and a cassette absence detection signal generation section 52.

Figure 18:
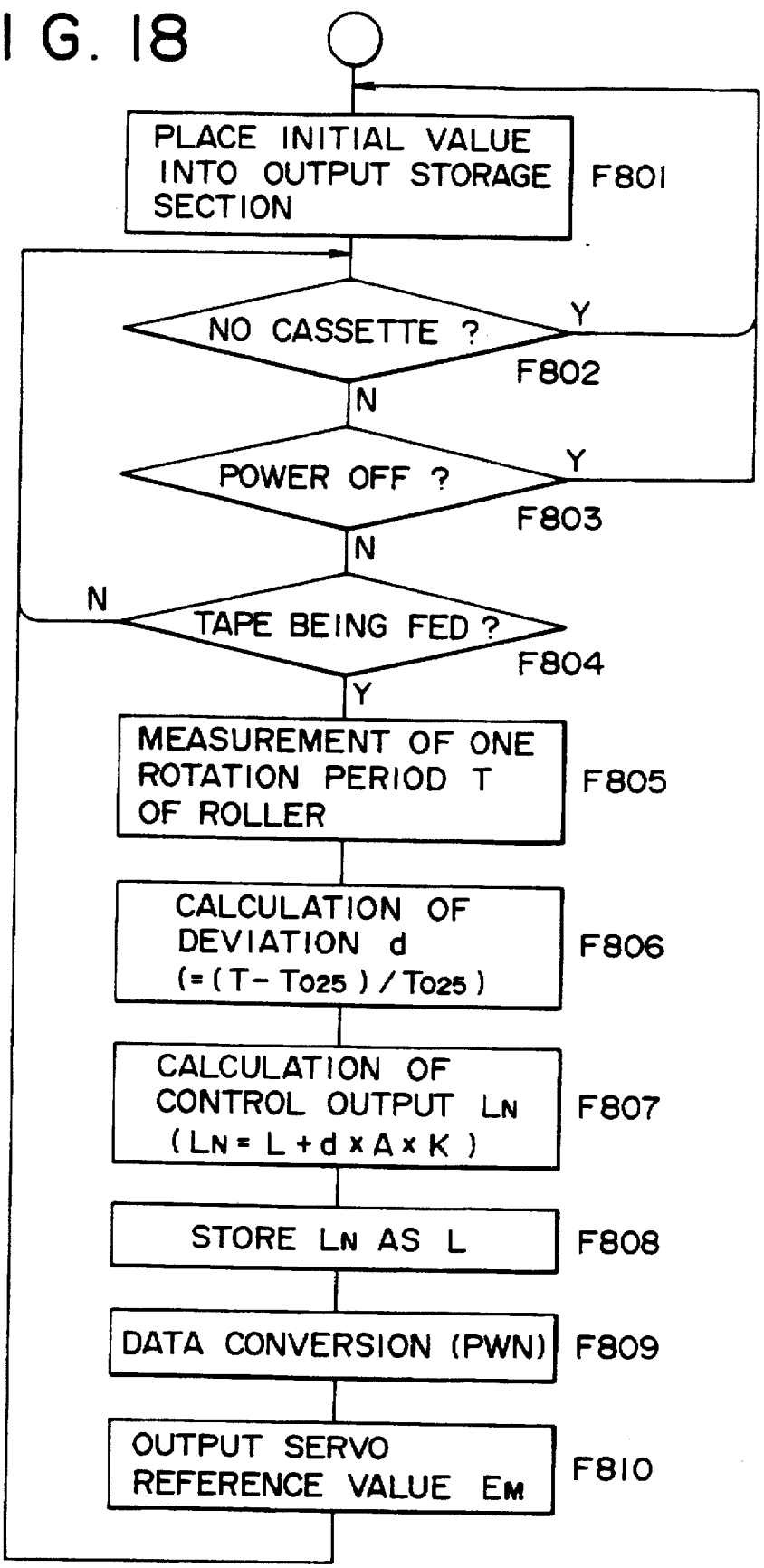
FIG. 18 is a flow chart illustrating operation of the recording and/or reproducing apparatus of FIG. 17.

A servo operation of the recording and/or reproducing apparatus Is illustrated in FIG. 18.

Referring to FIGS. 17 and 18, the initial value generation section 58 normally supervises detection signals from the power source turning off signal generation section 51 and the cassette absence detection signal generation section 52 (steps F802 and F803), and only when any of the detection signals is detected, the initial value generation section 50 outputs an initial value to the output storage section 26 (step F801). Then, while the magnetic tape 1 is being fed, servo control based on calculation of a deviation d is executed (steps F804 to F810). It is to be noted that the processing at steps F805 to F810 is similar to that of FIG. 10(a)

Here, even when feeding of the magnetic tape 1 is stopped once, unless a detection signal from the power source turning off signal generation section 51 or the cassette absence detection signal generation section 52 is detected, the initial value generation section 50 does not output the initial value (No at step F802, and No at step F803). Accordingly, a last servo control value L in a control cycle immediately before stopping is maintained in the output storage section 26.

Consequently, when feeding of the magnetic tape 1 is resumed, the reel motor 11 is started in response to the servo control value L stored in the output storage section 26.

Due to the operation described above, the period of time, which has not been reduced formerly, can be reduced for starting of feeding of the magnetic tape 1 in any of the second and following control cycles after loading of a cassette or turning on of the power source as seen from FIG. 19(b).

Accordingly, also with the recording and/or reproducing apparatus of the present embodiment, similar advantages to those of the recording and/or reproducing apparatus of the first to third embodiments described above can be obtained for starting of feeding of the magnetic tape in any of the second and following control cycles, and where it is adopted in combination with the fourth to sixth embodiments described above, it is realized, in addition to reduction of the time upon the start of feeding of the magnetic tape in the first control cycle after loading of a cassette or turning on of the power source, to remarkably reduce the time upon the start of feeding of the magnetic tape in any of the second and following control cycles.

Figure 20:
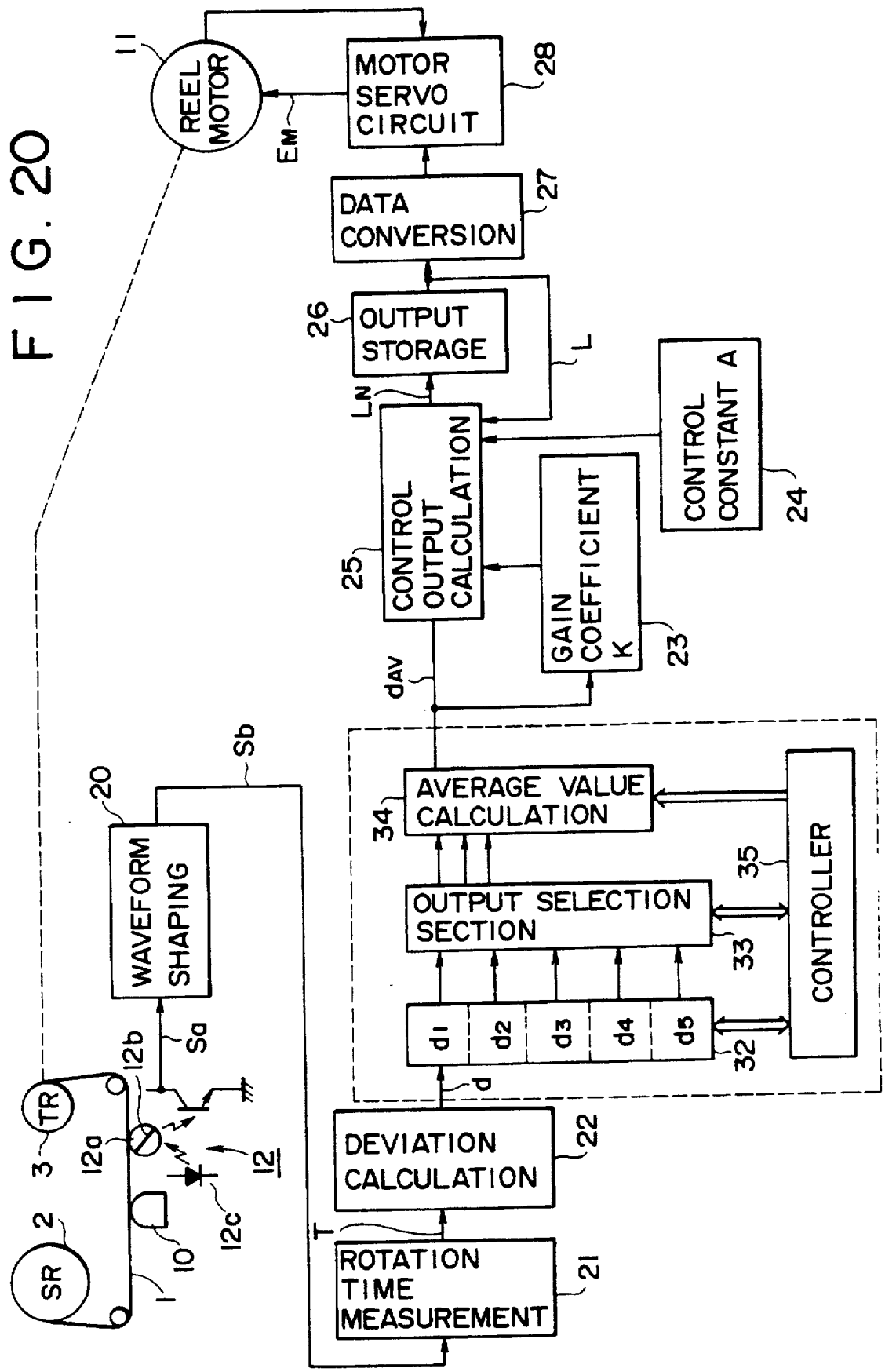
FIG. 20 is a block diagram of a yet further recording and/or reproducing apparatus showing an eighth preferred embodiment of the present invention.

Referring now to FIG. 20, there is shown in block diagram a recording and/or reproducing apparatus according to an eighth preferred embodiment of the present invention. In the recording and/or reproducing apparatus of the present embodiment, the control output calculation section 25 calculates a servo control value $L_N$ for a current control cycle using a deviation $d_{DU}$, a gain coefficient K, a control contact A and a servo control value L fed back thereto. The servo control value $L_N$ is calculated in accordance with a modified equation to the equation (3) given hereinabove wherein the deviation d is replaced by $D_{AB}$.

The recording and/reproducing apparatus includes a deviation storage section 32 for storing the last five deviations calculated by the deviation calculation section 22. In particular, the deviation storage section 32 holds a deviation d for a current control cycle as $d_1$ and holds deviations d calculated in the last four control cycles as deviations $d_2$ to $d_5$. The holding operation can be realized, for example, by means of data control based on an address shift of a memory area or by constituting the deviation storage section 32 from a shift register.

An output selection section 33 selects three of the deviations $d_1$ to $d_5$ stored in the deviation storage section 32 except those two which have the highest and lowest values among them, and outputs the selected three deviations. It is to be noted that, when a total of five deviations are not stored in the deviation storage section 32 as yet upon starting of feeding of the magnetic tape 1, the discrimination for the highest and lowest values is not performed, but the output selection section 33 outputs three or less deviations stored in the deviation storage section 32.

An average value calculation section 34 calculates an average value $d_{AU}$ among three deviations supplied thereto from the output selection section 33.

A controller 35 controls operation of the deviation storage section 32, the output selection section 33 and the average value calculation section 34. Particularly, the controller 35 controls the write/read address of the deviation storage section 32 so that a deviation d newly calculated is stored as a deviation $d_1$ into the deviation storage section 32, and thereupon, deviations held, as deviations $d_1$ to $d_4$ are shifted so that they are thereafter held as deviations $d_2$ to $d_5$.

The controller 35 normally controls the output selection section 33 so that three deviations except two deviations which exhibit the highest and lowest values are outputted, but it effects output selection control when the number of deviations stored in the deviation storage section 32 is smaller than 5. Further, the controller 35 controls the average value calculation section 34 so that the dominator for calculation of an average value is normally set to 5, but when the number of deviations stored in the deviation storage section 32 is smaller than 5, the denominator is set to 1 or 2 in accordance with the number of outputs of the output selection section 33.

In the recording and reproducing apparatus of the present embodiment having such a construction as described above, the speed of rotation of the reel motor 11 is controlled by servo control so that the feeding speed of the magnetic tape 1 may be kept substantially constant from the the start end to the terminal end of the magnetic tape 1. Then, since the average value $d_{AU}$ calculated by the average value calculation section 34 is used as the deviation d for calculation of a servo control value $L_N$ by the control output calculation section 25, even if a great error in detection of feeding of the tape is temporarily caused by a disturbance or the like, its possible influence is cancelled or minimized.

Figure 21:
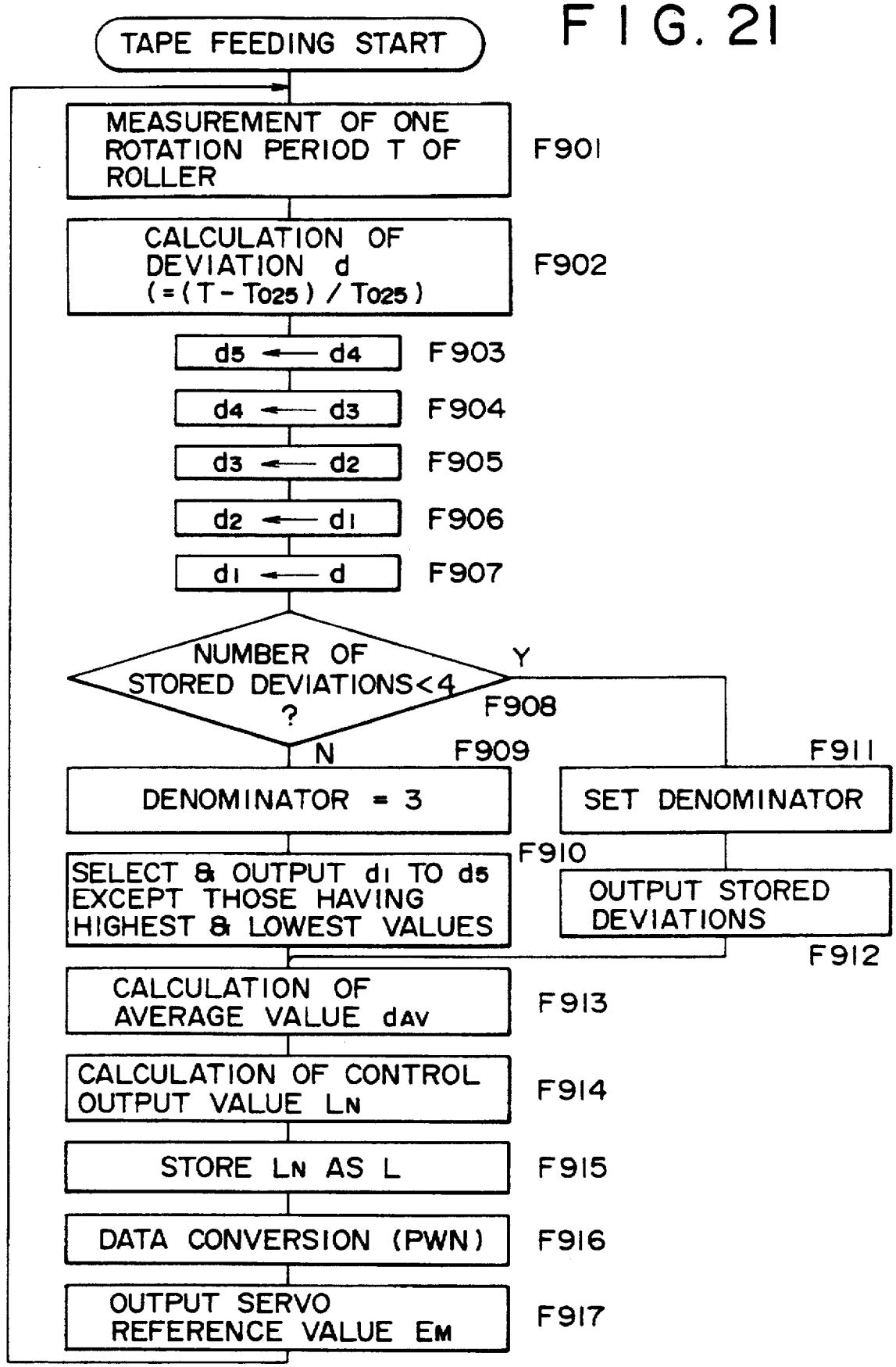
FIG. 21 is a flow chart illustrating operation of the recording and/or reproducing apparatus of FIG. 20.

A servo operation for the speed of rotation of the reel motor 11 is illustrated in FIG. 21. Referring to FIG. 21, when the magnetic tape 1 is fed to rotate the roller 12a so that rotational speed information Sa is outputted from the rotary encoder 12 to the waveform shaping circuit 20 and a waveform shaped output Sb is outputted from the waveform shaping circuit 20, a one rotation period T of the roller 12a is measured by the rotation time measurement section 21 (step F901). Then, a deviation d is calculated using the one rotation period T by the deviation calculation section 22 as described above (step F902).

Here, deviations stored in the deviation storage section 32 are shifted under the control of the controller 35. In particular, the deviation $d_4$ is shifted to the deviation $d_5$; the deviation $d_3$ is shifted to the deviation $d_4$; the deviation $d_2$ is shifted to the deviation $d_3$; and the deviation $d_1$ is shifted to the deviation $d_2$. Then, the deviation d newly calculated is stored as the deviation $d_1$ into the deviation storage section 32 (steps F903 to F907). Accordingly, the last five deviations including the newly calculated deviation d are thereafter held in the deviation storage section 32.

The controller 35 determines the number of stored deviations in the deviation storage section 32 (step F908), and if it determines that a total of five deviations are stored in the deviation storage section 32, then it sets the denominator of the calculation equation of the average value calculation section 34 to 3 (step F909) so that those three of the deviations $d_1$ to $d_5$ except those which exhibit the highest and lowest values among them are outputted from the output selection section 33.

On the other hand, when the number of stored deviations is smaller than 5 as upon starting of feeding of the magnetic tape 1, the controller 35 sets the denominator for calculation of an average value in response to the number of stored deviations (step F911) so that a suitable deviation is outputted from the output selection section 33. For example, if the number of stored deviations is 1, then the denominator is set to 1 so that the deviation $d_1$ is outputted; if the number of stored deviations is 2, then the denominator is set to 2 so that the the deviations $d_1$ and $d_2$ are outputted; if the number of stored deviations is 3, then the denominator is set to 3 so that the deviations $d_1$, $d_2$ and $d_3$ are outputted; and if the number of stored deviations is 4, then the denominator is set to 3 so that the deviations $d_2$, $d_3$ and $d_4$ are outputted.

The average value calculation section 34 thus calculates an average value $d_{AU}$ of the deviations supplied thereto from the output selection sections 33 (step F913) and supplies it to the control output calculation section 25. The control output calculation section 25 calculates a servo control value $L_N$ for a current control cycle from the average value $d_{AU}$ of the relevant deviations, the gain coefficient K, the control constant A and the servo control value L in a preceding control cycle (step F914), the servo control value $L_N$ is supplied to and stored in the output storage section 26 (step F915) by the control output calculation section 25. The thus stored servo control value L is converted into a PWM signal by the data conversion section 27 (step F116), and the motor servo circuit 28 develops a servo output EM in response to the PWM signal to effect driving-control of the reel motor 11 (step F917).

The sequence of operations described above is repeated, and as the operations proceed, the speed of rotation of the reel motor 11 decreases gradually in accordance with the feeding position of the magnetic tape 1, that is, the diameter of the magnetic tape 1 wound on the take-up reel 3. Accordingly, the feeding speed of the magnetic tape 1 is kept substantially constant. Accordingly, a recording medium such as, for example, a compact cassette tape which is used with the recording and/or reproducing apparatus of the present embodiment is compatible with a recording and/or reproducing apparatus of the capstan type, and besides, the frequency characteristic and the signal to noise ratio do not fluctuate from the the start end to the terminal end of the magnetic tape and a recording or reproducing operation is achieved with fidelity.

Furthermore, since a servo control value $L_N$ is calculated from an average value of the last five deviations except those which exhibit the highest and lowest values among them, even if a temporary error in detection of a speed (period) or the like is caused by some irregularity of the period of the roller 12 which is caused by an irregular thickness or a wrinkle of the magnetic tape so that the deviation d is increased to an excessively high value, this will not have an influence upon the calculation of the servo control value $L_N$. Consequently, the servo control us stabilized and the stability in fixed speed feeding of the magnetic tape is improved.

Figure 22:
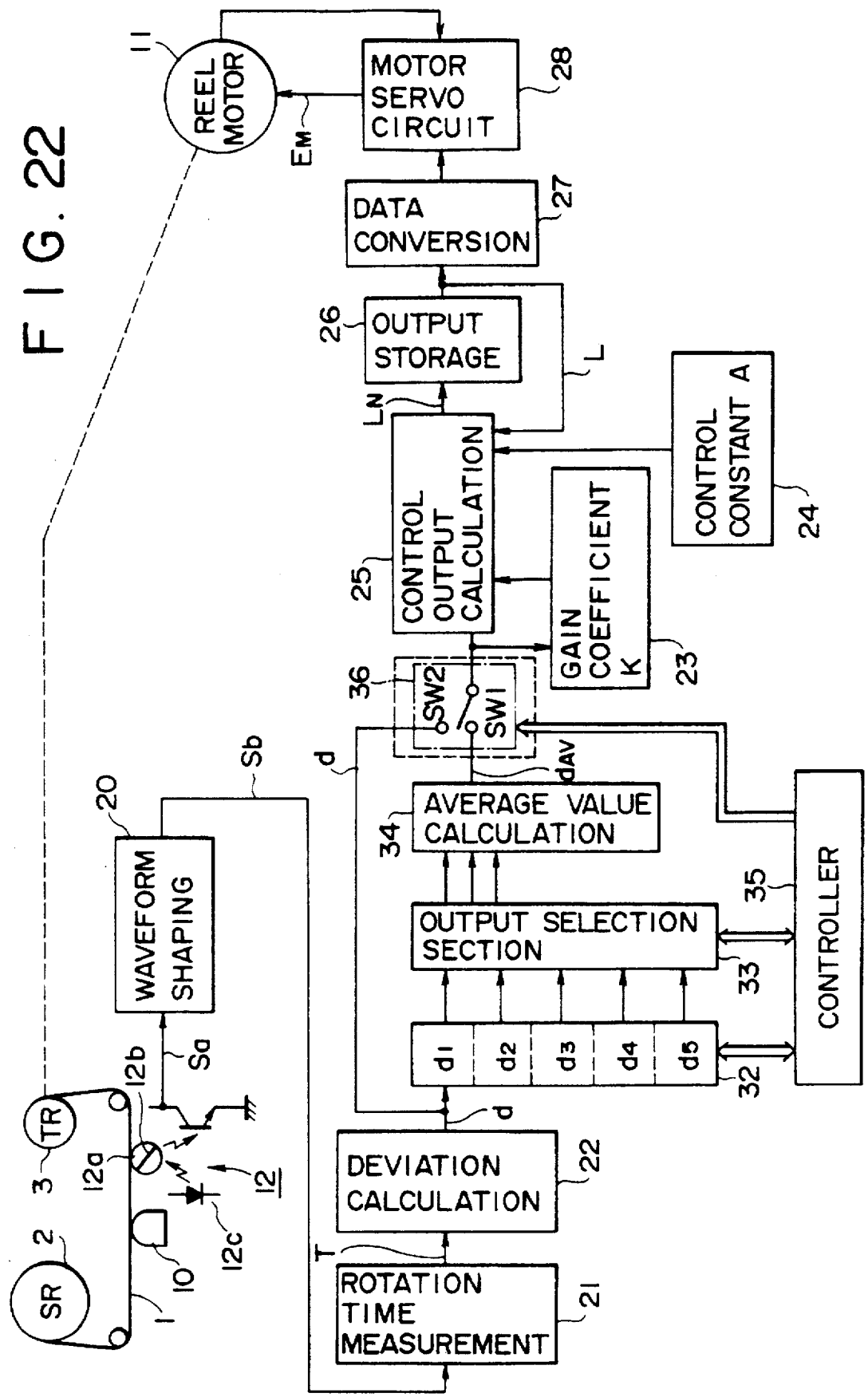
FIG. 22 is a block diagram of a yet further recording and/or reproducing apparatus showing a ninth preferred embodiment of the present invention.

Referring now to FIG. 22, there is shown in block diagram a recording and/or reproducing apparatus according to a ninth preferred embodiment of the present invention. The recording and/or reproducing apparatus of the present embodiment is a modification to the recording and/or reproducing apparatus of the eighth embodiment shown in FIG. 20 in that a deviation d outputted from the deviation output section 22 and an average value $d_{AU}$ outputted from the average value calculation section 34 are selectively used to calculate a servo control value $L_N$. To this end, a switching circuit 36 is provided additionally. The switching circuit 36 has a contact SW1 to which the output of the average value calculation section 34 is supplied, and another contact SW2 to which the output of the deviation output section 22 is supplied. The switching control of the switching circuit 36 is effected by the controller 35. Further, the denominator of the average value calculation equation of the average value calculation section 34 is fixed to 3.

In short, the recording and/or reproducing apparatus of the present embodiment uses the deviation d as it is when the number of stored deviations in the deviation storage section 32 is smaller than 5. Accordingly, the servo operation of the recording and/or reproducing apparatus is such as illustrated in the flow chart of FIG. 23. In the flow chart of F16. 23, the processing at steps F1101 to F1107 is similar to the processing at steps F901 to F907 of FIG. 21 while the processing at steps F1113 to F1116 is similar to the processing at steps F914 to F917 of FIG. 21, respectively, and overlapping description of them will be omitted herein to avoid redundancy.

Figure 23:
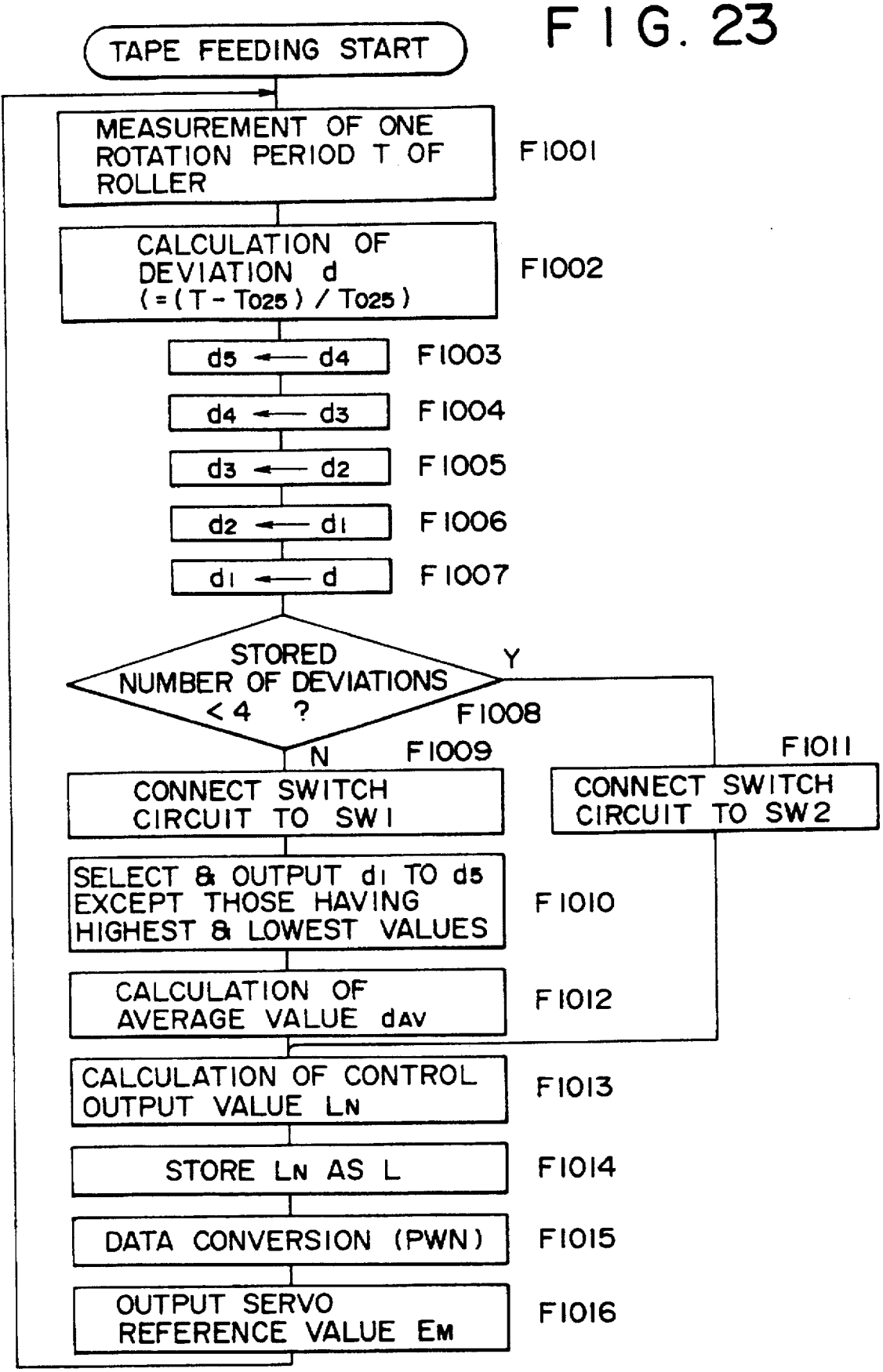
FIG. 23 is a flow chart illustrating operation of the recording and/or reproducing apparatus of FIG. 22.

Referring to FIGS. 22 and 23, the controller 35 determines, at step F1108, the number of deviations stored in the deviation storage section 35, and if a total of five deviations are stored in the deviation storage section 35, then the controller 35 connects the switching circuit 36 to the contact SW1 (step F1109). Then, the output selection section 33 outputs three of the deviations $d_1$ to $d_5$ except those which exhibit the highest and lowest values among them (step F1110). Consequently, the average value calculation section 34 calculates an average value $d_{AU}$ (step F1112) and supplies it to the control output calculation section 25. In this instance, the control output calculation section 25 calculates a servo control value $L_N$ for a current control cycle from the average value $d_{AU}$ of the relevant deviations, the gain coefficient K, the control constant A and the servo control value L in a preceding control cycle (step F1113).

On the other hand, when the number of stored deviations is smaller than 5 as at start of feeding of the magnetic tape, the controller 35 connects the switching circuit 36 to the other contact SW2 (step F1111). Consequently, the deviation d outputted from the deviation calculation section 22 is supplied as it is to the control output calculation section 25. In this instance, the control output calculation section 25 calculates a servo control value $L_N$ for a current control cycle from the deviation d, the gain coefficient K, the control constant A and the servo control value L in a preceding control cycle (step F1113).

The recording and/or reproducing apparatus of the present embodiment is advantageous, in addition to advantages similar to those of the recording and/or reproducing apparatus of the eighth embodiment, in that the averaging processing of deviations can be simplified.

It is to be noted that the number of stored deviations of the deviation storage section is not limited to 5 in the eighth or ninth embodiment, and the number of deviations to be selected is not limited to the number of deviations except those which exhibit the highest and lowest values. Particularly where the number of stored deviations is sufficiently great, an average of all of stored deviations can cancel an influence of a temporary error in detection of a speed.

Figure 24:
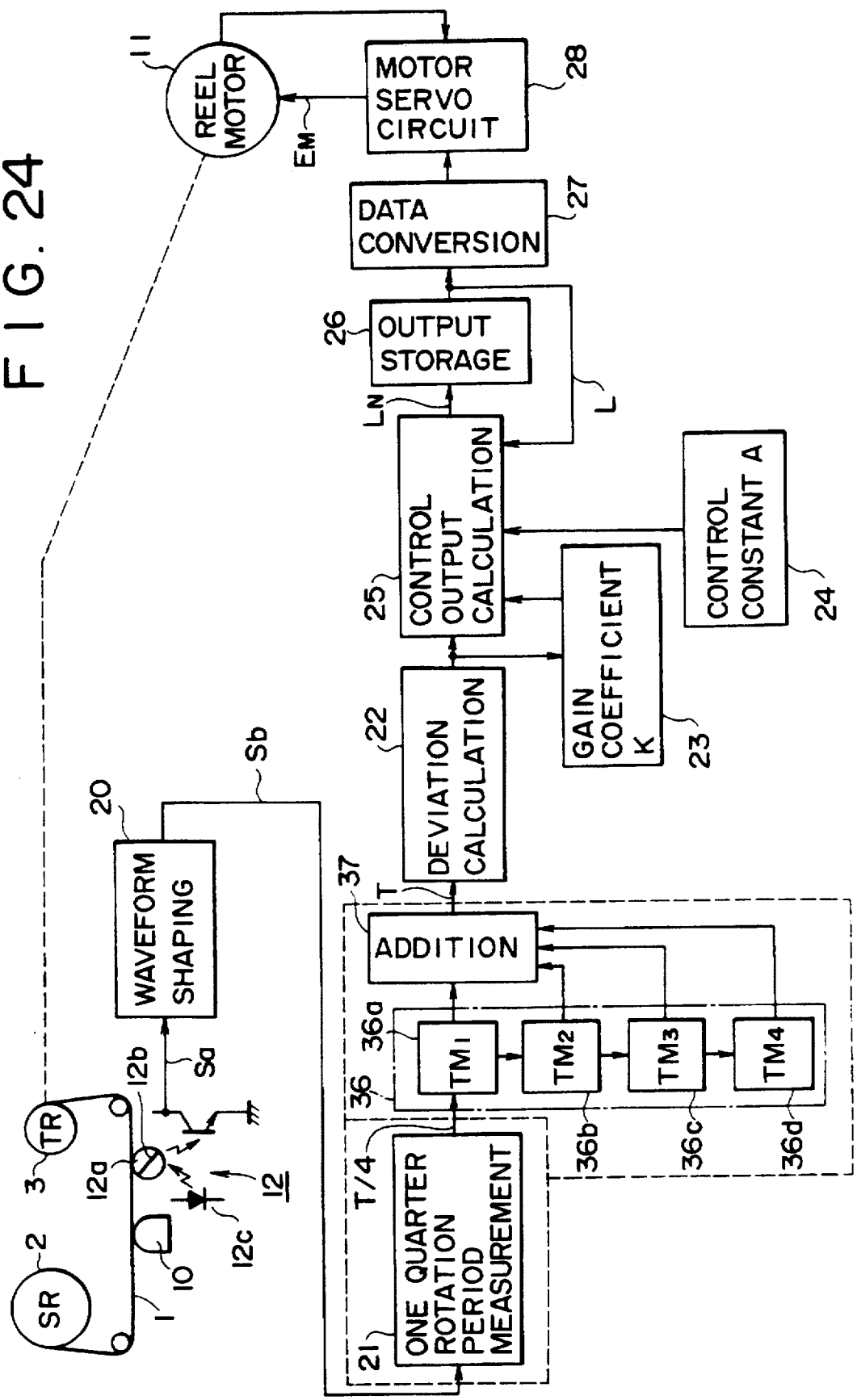
FIG. 24 is a block diagram of a yet further recording and/or reproducing apparatus showing a tenth preferred embodiment of the present invention.

Referring now to FIG. 24, there is shown in block diagram a recording and/or reproducing apparatus according to a tenth preferred embodiment of the present invention. The recording and/or reproducing apparatus includes a one quarter rotation period storage section 36 which stores the last four ¼ rotation periods (T/4) of the roller 12a outputted from the one quarter rotation period measurement section 21. In particular, the one quarter rotation period storage section 36 holds the last one quarter rotation period (T/4) available at present as a period $TM_1$ in a recording area 36a and holds three one quarter rotation periods (T/4) obtained in the preceding three control cycles as periods $TM_2$ to $TM_4$ in recording areas 36b to 36d, respectively. The holding operation can be realized, for example, by means of data control by address shifting of the memory areas or by constituting the one quarter rotation period storage section from a shift register.

An addition section 37 calculates a one rotation period T of the roller 12a using data held in the one quarter rotation period storage section 38, that is, the periods $TM_1$ to $TM_4$. The one rotation period T is the sum of the last four one quarter rotation periods (T/4). Accordingly, it can be presented by the following equation:

$$T = TM_1 + TM_2 + TM_3 + TM_4 \qquad (7)$$

In the recording and/or reproducing apparatus of the present embodiment having the construction described above, servo control is executed in accordance with a servo control value $L_N$ obtained by calculation of the equation (3) given hereinabove based on a deviation d calculated from a one rotation period of the roller 12a obtained from the deviation calculation section 22 during feeding of the magnetic tape 1, and the speed of rotation of the reel motor 11 is controlled so that the feeding speed of the magnetic tape 1 may be kept substantially constant from the starting end to the last end of the magnetic tape 1.

Further, while only two pulses are outputted during one rotation of the roller 12a, since, in the recording and/or reproducing apparatus of the present embodiment, a one rotation period T is calculated and a deviation d is calculated by the deviation calculation section 42 to execute servo control each time one quarter period information (T/4) is obtained from the one quarter rotation time measurement section 21, a fine servo operation is realized in units of a short time.

Figure 25:
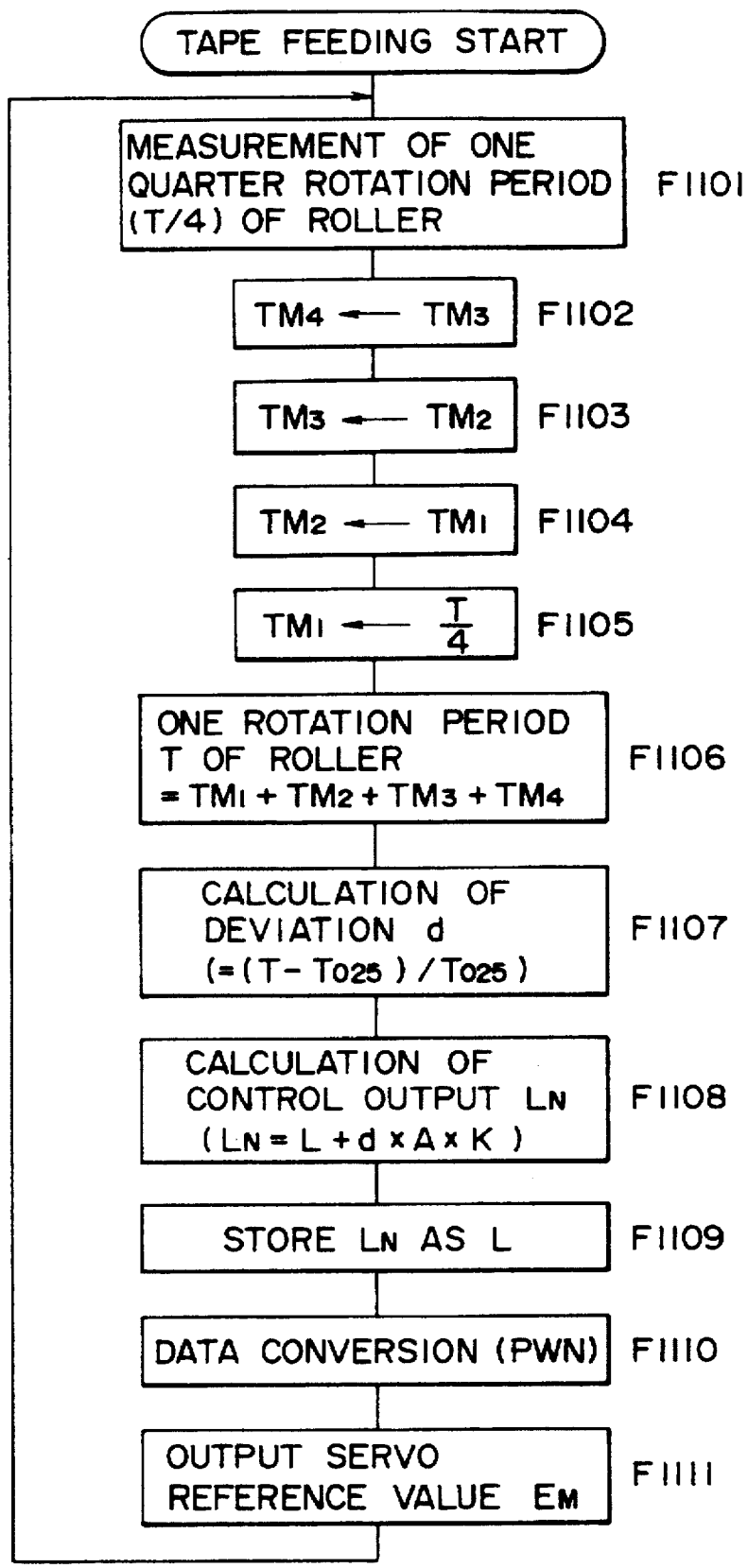
FIG. 25 is a flow chart illustrating operation of the recording and/or reproducing apparatus of FIG. 24.

The servo operation for the speed of rotation of the reel motor 11 in the recording and/or reproducing apparatus of the present embodiment is illustrated in FIG. 25. Referring to FIGS. 24 and 25, during feeding of the magnetic tape 1, a one quarter rotation period (T/4) of the roller 12a is measured by the one quarter rotation time measurement section 21 (step F1101) and is supplied to the one quarter rotation period storage section 38.

Thereupon, shifting of stored data is executed in the one quarter rotation period storage section 36. In particular, the period $TM_3$ is shifted to the period $TM_4$; the period $TM_2$ is shifted to the period $TM_3$; and the period $TM_1$ is shifted to the period $TM_2$, and then, the newly inputted one quarter rotation period (T/4) is held as the period $TM_1$ (steps F1102 to F1105).

In short, the last four one quarter rotation periods (T/4) are held in the one quarter rotation period storage section 36.

The periods $TM_1$ to $TM_4$ held in the one quarter rotation period storage section S8 are supplied to the addition section 37, in which a period T of one rotation of the roller 12a is calculated by calculation of the equation (7) given hereinabove (step F1106). Then, the deviation calculation section 22 calculates a deviation d by calculation of the equation (1) given hereinabove (step F1107). The deviation d is supplied to the control output calculation section 25, in which a servo control value $L_N$ is calculated by calculation of the equation (3) given hereinabove (step F1108).

The servo control value $L_N$ is supplied to and stored as a servo control value h into the output storage section 28 (step F1109), and the thus stored servo control value h is converted into a PWM signal by the data conversion section 27 (step F1110). The motor servo circuit 28 develops a servo output EM in response to the PWM signal to effect driving control of the reel motor 11 (step F1111).

The sequence of operations described above is repeated, and as the operations proceed, the speed of rotation of the reel motor 11 decreases gradually in accordance with the feeding position of the magnetic tape 1, that is, the diameter of the magnetic tape 1 wound on the take-up reel 3. Accordingly, the feeding speed of the magnetic tape 1 is kept substantially constant. Consequently, a recording medium such as, for example, a compact cassette tape which is used with the recording and/or reproducing apparatus of the present embodiment is compatible with a recording and/or reproducing apparatus of the capstan type, and besides, the frequency characteristic and the S/N ratio do not fluctuate from the start end to the terminal end of the magnetic tape and a recording or reproducing operation is achieved with fidelity.

Furthermore, a one rotation period T of the roller 12a, is calculated, for each one quarter rotation of the roller 12a, from periods $TM_1$ to $TM_4$ held in the one quarter rotation period storage section 36 as seen from FIGS. 26(a) to 26(h), and a servo control value L is obtained from the one rotation period T. In short, fine servo control in units of a one quarter rotation time of the roller 12a is executed. Accordingly, a delay in servo control is eliminated, and a recovering operation to the rated speed is achieved rapidly when the tape feeding speed is displaced by a great amount from a predetermined speed, for example, during recording and/or reproduction or a like case.

Besides, the rotary encoder 12 can be constructed with a small size which only outputs a small number of pulses (two) by one rotation of the roller 12a.

Figure 27:
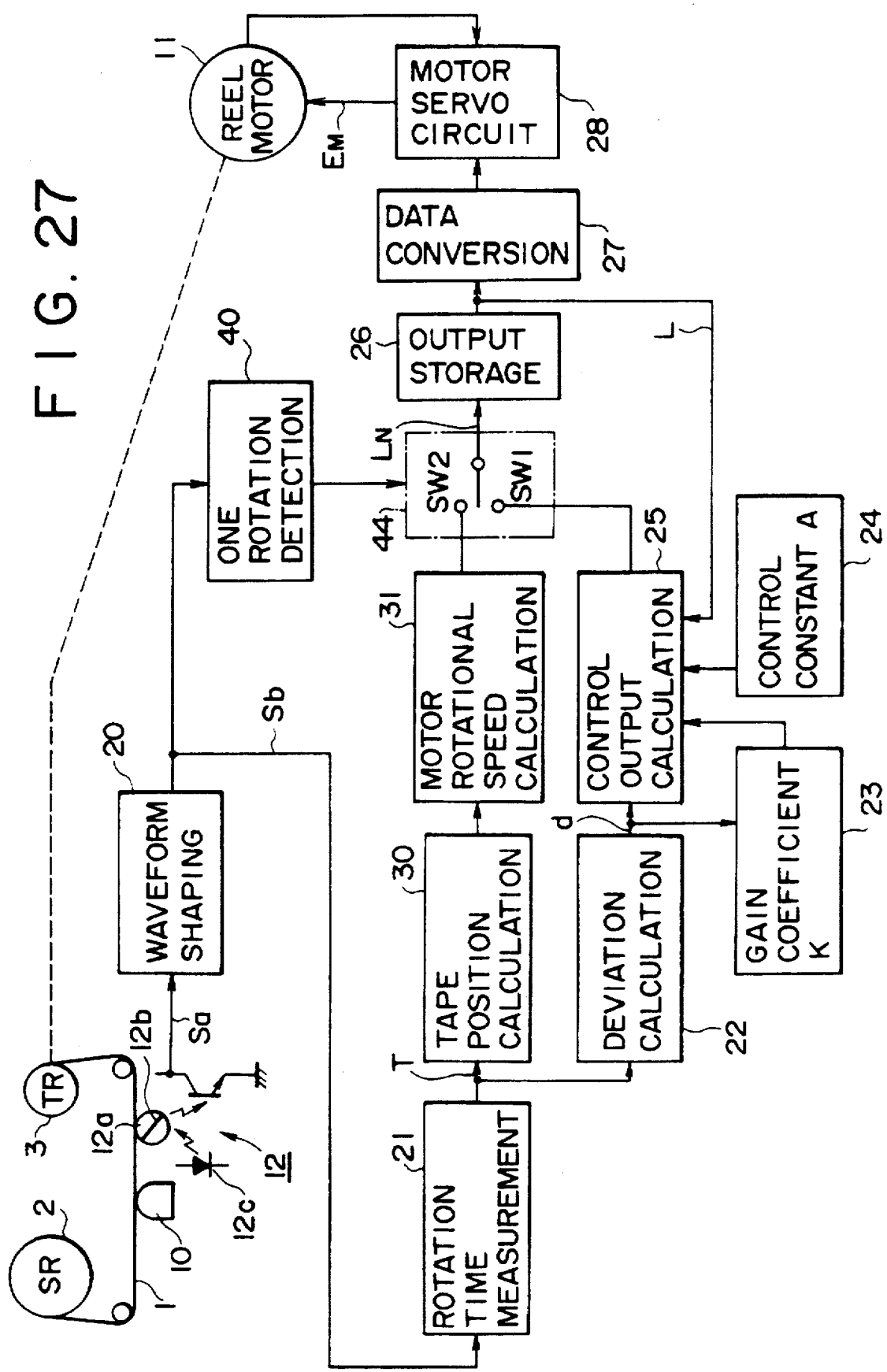
FIG. 27 is a block diagram of a yet further recording and/or reproducing apparatus showing an eleventh preferred embodiment of the present invention.

Referring now to FIG. 27, there is shown in block diagram a recording and/or reproducing apparatus according to an eleventh preferred embodiment of the present invention. The recording and/or reproducing apparatus of the present embodiment is a modification to and different from the recording and/or reproducing apparatus of the fifth embodiment of FIG. 13 described hereinabove in that it additionally includes a one rotation detection circuit 40 for detecting one rotation of the roller 12a from a signal from the waveform shaping circuit 20 and the switch 44 is controlled to be switched in response to an output signal of the one rotation detection circuit 40.

In the recording and/or reproducing apparatus of the present embodiment having the construction described above, except when feeding of the magnetic tape is started, servo control is executed in accordance with a servo control value LN obtained by calculation of the equation (3) given hereinabove based on a deviation d calculated from a one rotation period of the roller 12a obtained from the deviation calculation section 22. Further, the current feeding position of the magnetic tape 1 is calculated from the one rotation period of the roller 12a, and a speed M of rotation of the reel motor 11 is calculated from the feeding position thus calculated, whereafter a servo control value $L_N$ is calculated from the speed M of rotation of the reel motor 11. Then, the speed of rotation of the reel motor 11 is controlled so that the feeding speed of the magnetic tape 1 may be kept substantially constant from the start end to the terminal end of the magnetic tape 1.

Figure 28:
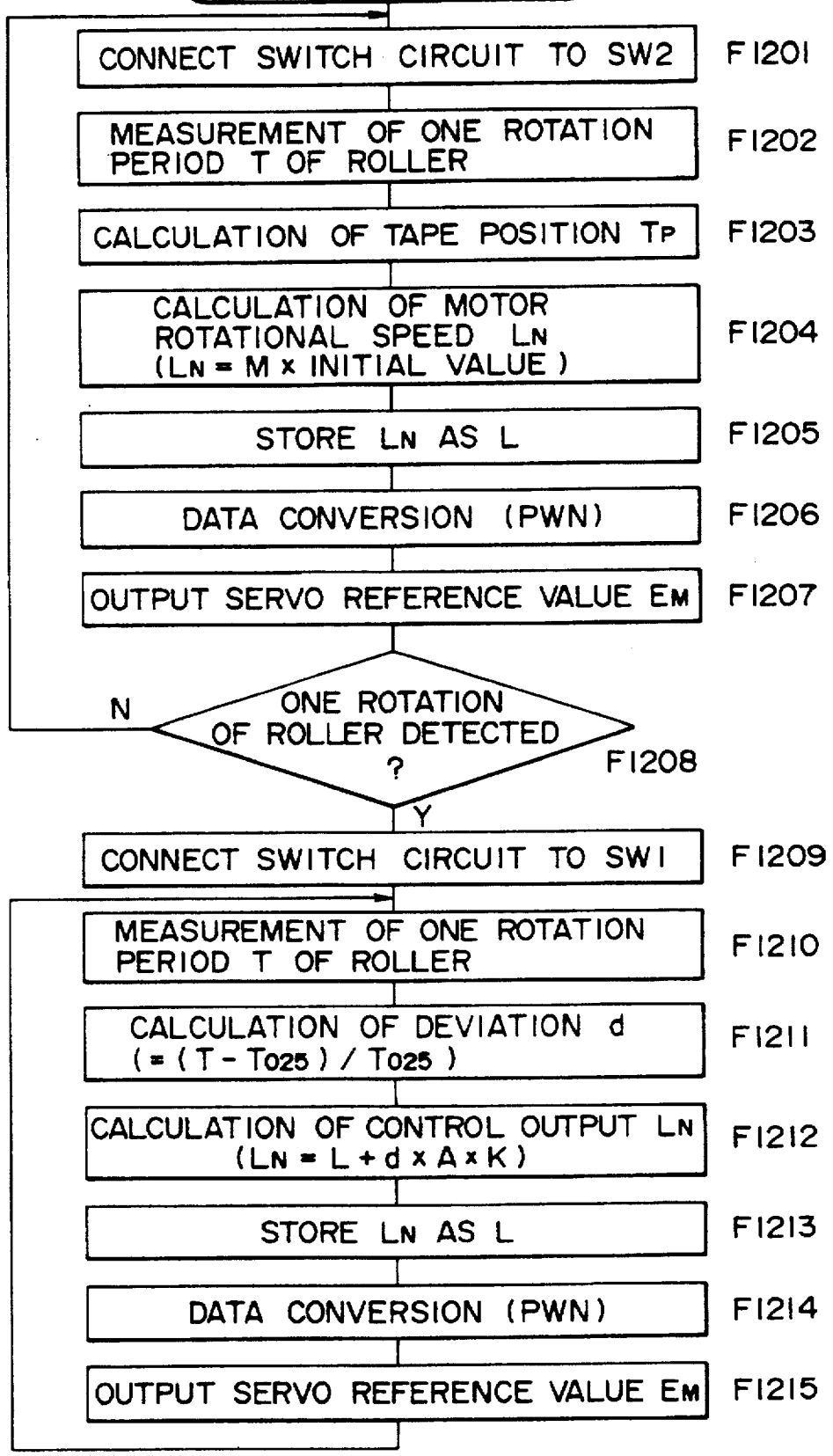
FIG. 28 is a flow chart illustrating operation of the recording and/or reproducing apparatus of FIG. 27.

A servo operation is illustrated in the flow chart of FIG. 28. Referring to FIGS. 27 and 28, when feeding of the magnetic tape 1 is to be started, the switching circuit 44 is first controlled to connect to the contact SW2 (step F1201). Consequently, a tape position TP is calculated by the tape position calculation section 30 in accordance with the equation (4) given hereinabove from a rotation period (T) measured by the rotation time measurement section 21 (steps F1202 and F1203), and the motor rotational speed calculation section 31 calculates a magnification M in accordance with the equation (5) given hereinabove and calculates a servo control value LN in accordance with the equation of the initial value×M (step F1204).

The servo control value LN is supplied to and stored as a servo control value L in the output storage section 26 (step F1205), and the servo control value L thus stored is converted into a PWM signal by the data conversion section 27 (step F1206). The motor servo circuit 28 develops a servo output EM in response to the PWM signal to effect driving control of the reel motor 11 (step F1207).

Since the servo operation is not an operation of the feedback type employing the deviation d, the reel motor 11 is caused to rise immediately (for example, in less than 1 second) to or around a motor rotational speed appropriate for the current tape position.

While such servo control is executed, the switch circuit 44 is connected to the contact SW1 in response to a one rotation detection signal from the one rotation detection section 40 (steps F1208 and F1209), and consequently, another servo control which converges, using the deviation d, the deviation d so as to be minimized is executed thereafter.

In particular, when a one rotation period T of the roller 12a is measured from the output of the rotary encoder 12 by the rotation time measurement section 21 (step F1210), a deviation d is calculated using the one rotation period T by the deviation calculation section 22 as described above and is supplied to the control output calculation section 25 (step F1211).

The control output calculation section 25 calculates a servo control value LN for a current control cycle by calculation of the equation (3) given hereinabove (step F1212) and supplies the thus calculated servo control value LN to the output storage section 26 so that it Is stored as a servo control value L (step F1213).

The thus stored servo control value L is converted into a PWM signal by the data conversion section 27 (step F1214), and the motor servo circuit 28 develops a servo output EM in response to the PWM signal to effect driving control of the reel motor 11 (step F1215).

Mechanical Arrangements

The servo control system for a reel motor which employs the rotary encoder 12 as tape feeding speed detection means as described above will be described subsequently with reference to FIGS. 32 to 48 which show different mechanical arrangements of the servo control system. As seen from FIGS. 32 to 48, the magnetic head 10 (10a, 10b, 10c, 10a (F), 10a (R), 10b (F), 10b (R), 10c(F) and 10c(R)) and the rotary encoder 12 (12(F), 12(R)) are secured to a head base 19 mounted on a mechanism chassis 19a so that, when the head base 19 is slidably moved, they are inserted into the tape cassette through a window in a front wall of the tape cassette until they contact the magnetic tape. It is to be noted that the recording medium to be used in any of the mechanical arrangements may be either a compact cassette tape or a micro cassette tape, whose structure is shown in FIG. 49 or 50.

Figure 49:
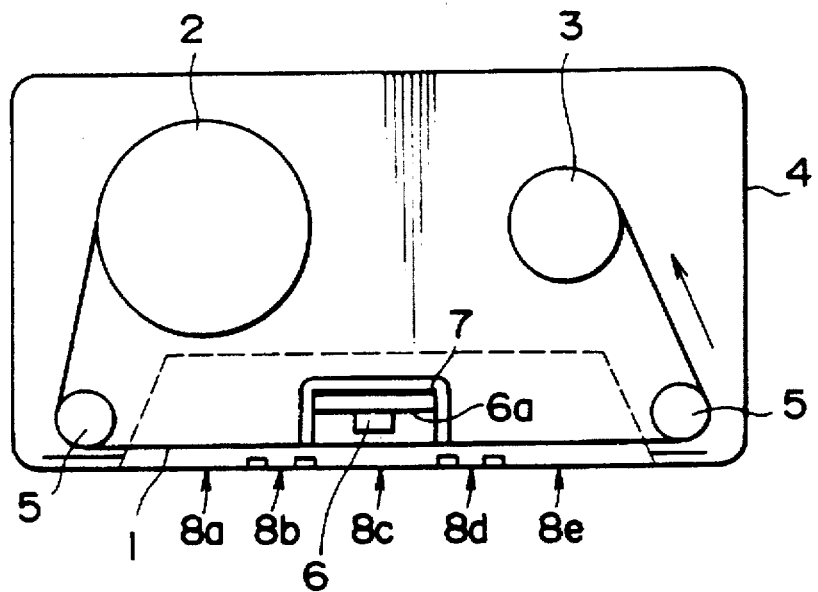
FIG. 49 is a schematic plan view of a compact cassette tape.

Referring first to FIG. 49 which shows a compact cassette tape, a magnetic tape 1 is wound around a supply reel 2 and a take-up reel 3 and accommodated in a housing 4, and a tape path is set by a pair of guide rollers so that the magnetic tape 1 is fed while it is exposed to the outside through windows 8a to 8e formed in a front wall of the housing 4. In the window 8c, a pad 6 for contacting the rear face of the magnetic tape 1 is secured to a leaf spring 6a and disposed in front of the front face of a shield plate 7.

Figure 50:
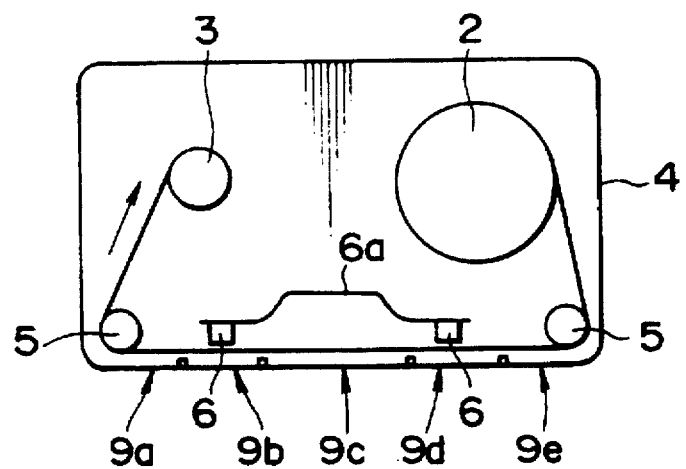
FIG. 50 is a schematic plan view of a micro cassette tape.

Referring now to FIG. 50 which shows a micro cassette tape, a magnetic tape 1 is wound around a supply reel 2 and a take-up reel 3 and accommodated in a housing 4, and a tape path is set by a pair of guide rollers so that the magnetic tape 1 is fed while it is exposed to the outside through windows 9a to 9e formed in a front wall of the housing 4. A pair of pads 6 for contacting the rear face of the magnetic tape 1 are secured to a leaf spring 8a in the windows 9b and 9d, respectively.

The head 10 and the rotary encoder 12 are disposed in the following manner in the mechanical arrangements of the recording and/or reproducing apparatus of the present invention which uses a compact cassette tape or a micro cassette tape of the construction described above.

Arrangement 1 (FIG. 32)
  Recording medium: compact cassette tape
  Tape feeding: one-directional feeding
  Magnetic head: erasing/recording/reproducing head 10a . . . inserted through window 8c
  Rotary encoder: rotary encoder 12 . . . inserted through window 8e
  Accordingly, the rotary encoder 12 is contacted the magnetic tape 1 in the tape path between the magnetic head 10 and the take-up reel 3.

Arrangement 2 (FIG. 33)
  Recording medium: compact cassette tape
  Tape feeding: one-directional feeding
  Magnetic head: erasing/recording/reproducing head 10b . . . inserted through window 8e
  Rotary encoder: rotary encoder 12 . . . inserted through window 8c
  Accordingly, the rotary encoder 12 contacts the magnetic tape 1 with the magnetic tape 1 held between the rotary encoder 12 and the pad 6 (refer to 49).

Arrangement 3 (FIG. 34)
  Recording medium: compact cassette tape
  Tape feeding: one-directional feeding
  Magnetic head: recording/reproducing head 10b . . . inserted through window 8c
    erasing head 10c . . . inserted through window 8b
  Rotary encoder: rotary encoder 12 . . . inserted through window 8e
  Accordingly, the rotary encoder 12 contacts the magnetic tape 1 in the tape path between the magnetic head 10 and the take-up reel 3.

Arrangement 4 (FIG. 35)
  Recording medium: compact cassette tape
  Tape feeding: one-directional feeding
  Magnetic head: recording/reproducing head 10b . . . inserted through window 8c
    erasing head 10c . . . inserted through window 8a
  Rotary encoder: rotary encoder 12 . . . inserted through window 8e
  Accordingly, the rotary encoder 12 contacts the magnetic tape 1 in the tape path between the magnetic head 10 and the take-up reel 3.

Arrangement 5 (FIG. 36)
  Recording medium: compact cassette tape
  Tape feeding: normal/reverse bi-directional feeding
  Magnetic head: recording/reproducing head 10b . . . inserted through window 8c
    normal direction erasing head 10c(F) . . . inserted through window 8b
    reverse direction erasing head 10c(R) . . . inserted through window 8d
  Rotary encoder: normal direction rotary encoder 12(F) . . . inserted through window 8e
    reverse direction rotary encoder 12(R) . . . inserted through window 8a
  Accordingly, when the magnetic tape 1 is fed in the normal direction, the normal direction rotary encoder 12(F) contacts the magnetic tape 1 in the tape path between the magnetic head 10 and the take-up reel 3, but when the magnetic tape 1 is fed in the reverse direction, the reverse direction rotary encoder 12(R) contacts the magnetic tape 1 in the tape path between the magnetic head 10 and the supply reel 2 which functions as a take-up reel when the magnetic tape 1 is fed in the reverse direction.

Arrangement 6 (FIG. 37)
  Recording medium: compact cassette tape
  Tape feeding: normal/reverse hi-directional feeding
  Magnetic head: normal direction erasing/recording/reproducing head 10a(F) . . . inserted through window 8e
    reverse direction erasing/recording/reproducing head 10a(R) . . . inserted through window 8a
  Rotary encoder: normal/reverse bi-directional rotary encoder 12 . . . inserted through window 8c
  Accordingly, the normal/reverse bi-directional rotary encoder 12 contacts the magnetic tape 1 with the magnetic tape 1 held between the rotary encoder 12 and the pad 6 (refer to FIG. 49).

Arrangement 7 (FIG. 38)
  Recording medium: micro cassette tape
  Tape feeding: one-directional feeding
  Magnetic head: recording/reproducing head 10b . . . inserted through window 9d
    erasing head 10c . . . inserted through window 9e
  Rotary encoder: rotary encoder 12 . . . inserted through window 9c
  Accordingly, the rotary encoder 12 contacts the magnetic tape 1 in the tape path between the magnetic head 10 and the take-up reel 3.

Arrangement 8 (FIG. 39)
  Recording medium: micro cassette tape
  Tape feeding: one-directional feeding
  Magnetic head: recording/reproducing head 10b . . . inserted through window 9d
    erasing head 10c . . . inserted through window 9e
  Rotary encoder: rotary encoder 12 . . . inserted through window 9b
  Accordingly, the rotary encoder 12 contacts the magnetic tape 1 in the tape path between the magnetic head 10 and the take-up reel 3 with the magnetic tape 1 held between the rotary encoder 12 and the pad 6 (refer to FIG. 50).

Arrangement 9 (FIG. 40)
  Recording medium: micro cassette tape
  Tape feeding: one-directional feeding
  Magnetic head: erasing/recording/reproducing head 10a . . . inserted through window 9d
  Rotary encoder: rotary encoder 12 . . . inserted through window 9c
  Accordingly, the rotary encoder 12 contacts the magnetic tape 1 in the tape path between the magnetic head 10 and the take-up reel 3.

Arrangement 10 (FIG. 41)
  Recording medium: micro cassette tape
  Tape feeding: one-directional feeding
  Magnetic head: erasing/recording/reproducing head 10a . . . inserted through window 9d
  Rotary encoder: rotary encoder 12 . . . inserted through window 9b
  Accordingly, the rotary encoder 12 contacts the magnetic tape 1 in the tape path between the magnetic head 10 and the take-up reel 3 with the magnetic tape 1 held between-the rotary encoder 12 and the pad 6 (refer to FIG. 50).

Arrangement 11 (FIG. 42)
  Recording medium: micro cassette tape
  Tape feeding: one-directional feeding
  Magnetic head: erasing/recording/reproducing head 10a . . . inserted through window 9d Rotary encoder: rotary encoder 12 . . . inserted through window 9a Accordingly, the rotary encoder 12 contacts the magnetic tape 1 in the tape path between the magnetic head 10 and the take-up reel 3. Further, in this instance, the location of contact is in the proximity of one of the guide rollers 5 (refer to FIG. 50).

Figure 43:
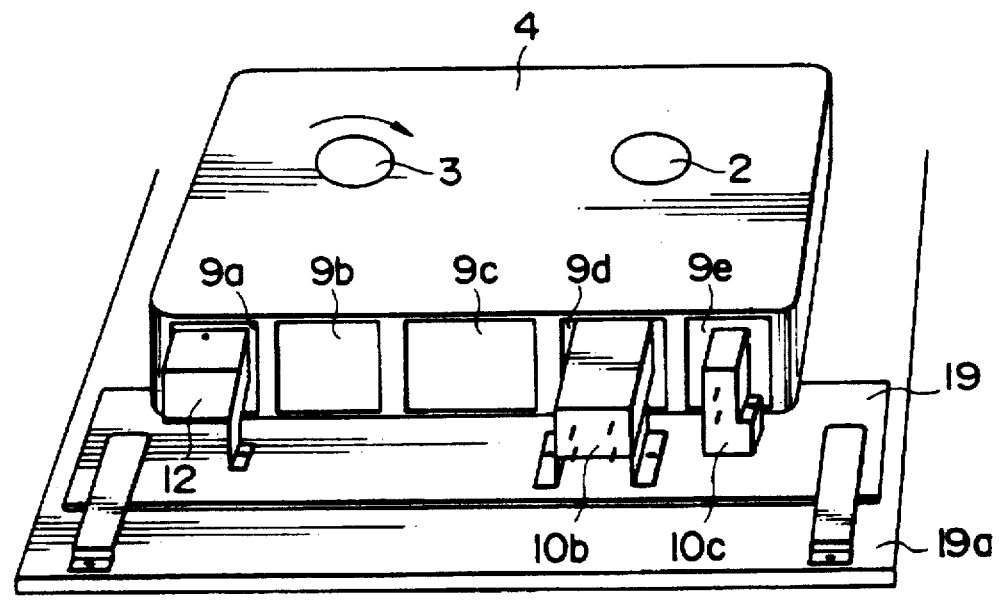

Arrangement 12 (FIG. 43)

Recording medium: micro cassette tape

Tape feeding: one-directional feeding

Magnetic head: recording/reproducing head 10b . . . inserted through window 9d erasing head 10c . . . inserted through window 9e Rotary encoder: rotary encoder 12 . . . inserted through window 9a Accordingly, the rotary encoder 12 contacts the magnetic tape 1 in the tape path between the magnetic head 10 and the take-up reel 3. Further, in this instance, the location of contact is in the proximity of one of the guide rollers 5 (refer to FIG. 50).

Figure 44:
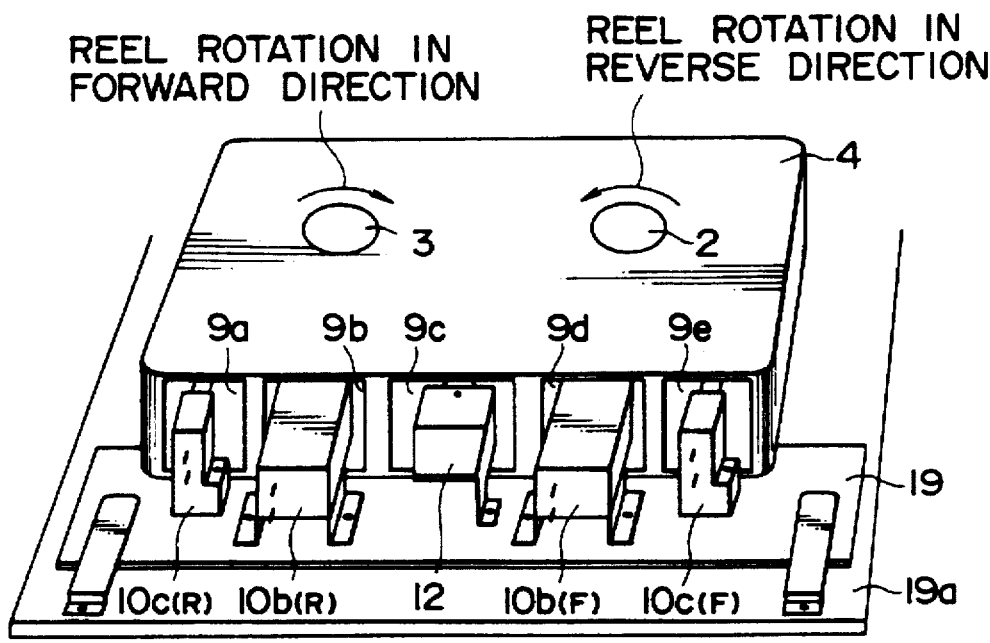

Arrangement 13 (FIG. 44)

Recording medium: micro cassette tape

Tape feeding: normal/reverse bi-directional feeding

Magnetic head: normal direction recording/reproducing head 10b(F) . . . inserted through window 9d reverse direction recording/reproducing head 10b(R) . . . inserted through window 9b normal direction erasing head 10c(F) . . . inserted through window 9e reverse direction erasing head 10c(R) . . . inserted through window 9a Rotary encoder: normal/reverse hi-directional rotary encoder 12 . . . inserted through window 9c Accordingly, when the magnetic tape 1 is fed in the normal direction, the normal/reverse bi-directional rotary encoder 12 contacts the magnetic tape 1 in the tape path between the magnetic head 10 (10b(F)) and the take-up reel 3, but when the magnetic tape 1 is fed in the reverse direction, the normal/reverse bi-directional rotary encoder 12 contacts the magnetic tape 1 in the tape path between the magnetic head 10 (10b(R)) and the supply reel 2 which functions as a take-up reel when the magnetic tape 1 is fed in the reverse direction.

Figure 45:
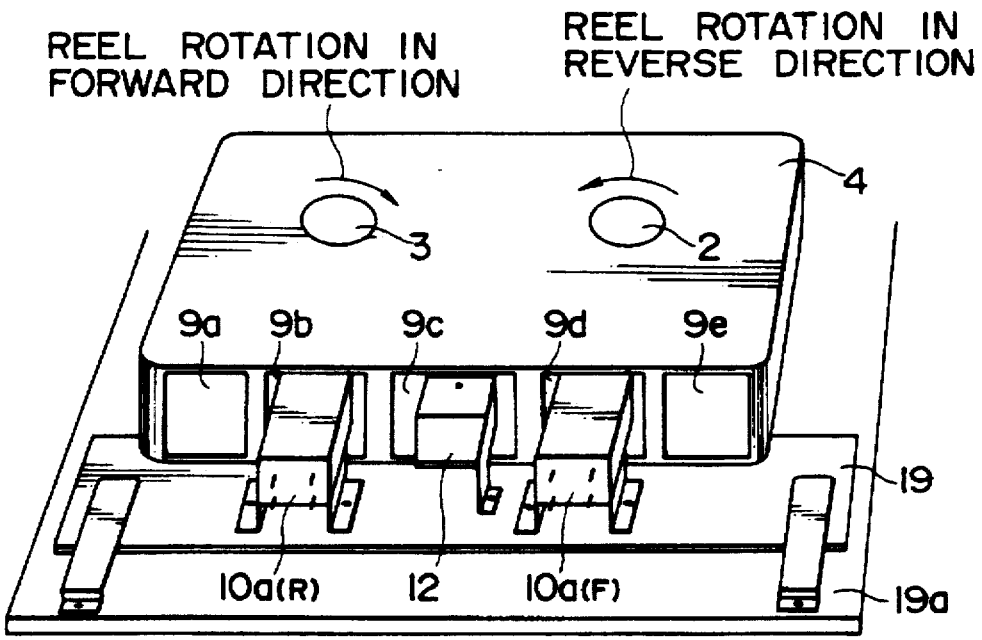

Arrangement 14 (FIG. 45)

Recording medium: micro cassette tape

Tape feeding: normal/reverse hi-directional feeding

Magnetic head: normal direction erasing/recording/reproducing head 10a(F) . . . inserted through window 9d reverse direction erasing/recording/reproducing head 10a(R) . . . inserted through window 9b Rotary encoder: normal/reverse bi-directional rotary encoder 12 . . . inserted through window 9c Accordingly, when the magnetic tape 1 is fed in the normal direction, the normal/reverse bi-directional rotary encoder 12 contacts the magnetic tape 1 in the tape path between the magnetic head 10 (10a(F)) and the take-up reel 3, but when the magnetic tape 1 is fed in the reverse direction, the normal/reverse bi-directional rotary encoder 12 contacts the magnetic tape 1 in the tape path between the magnetic head 10 (10a(R)) and the supply reel 2 which functions as a take-up reel when the magnetic tape 1 is fed in the reverse direction.

Arrangement 15 (FIG. 46)

Recording medium: micro cassette tape

Tape feeding: one-directional feeding

Magnetic head: erasing/recording/reproducing head 10a . . . inserted through window 9b Rotary encoder: rotary encoder 12 . . . inserted through window 9a Accordingly, the rotary encoder 12 contacts the magnetic tape 1 in the tape path between the magnetic head 10 and the take-up reel 3. Further, in this instance, the location of contact is in the proximity of one of the guide rollers 5 (refer to FIG. 50).

Arrangement 16 (FIG. 47)

Recording medium: micro cassette tape

Tape feeding: one-directional feeding

Magnetic head: recording/reproducing head 10b . . . inserted through window 9b erasing head 10c . . . inserted through window 9d Rotary encoder: rotary encoder 12 . . . inserted through window 9a Accordingly, the rotary encoder 12 contacts the magnetic tape 1 in the tape path between the magnetic head 10 and the take-up reel 3. Further, in this instance, the location of contact is in the proximity of one of the guide rollers 5 (refer to FIG. 50).

Figure 48:
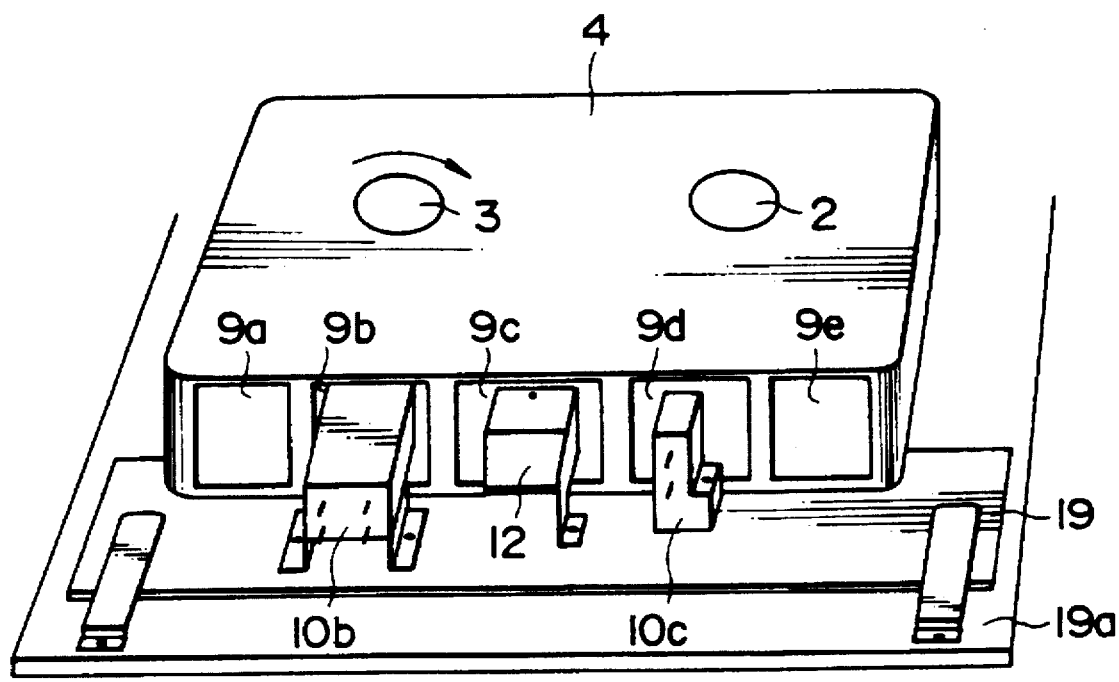

Arrangement 17 (FIG. 48)

Recording medium: micro cassette tape

Tape feeding: one-directional feeding

Magnetic head: recording/reproducing head 10b . . . inserted through window 9b erasing head 10c . . . inserted through window 9d Rotary encoder: rotary encoder 12 . . . inserted through window 9c Accordingly, the rotary encoder 12 contacts the magnetic tape 1 in the tape path between the magnetic head 10 (erasing head 10c) and the take-up reel 3. Further, in this instance, the location of contact is between the recording/reproducing head 10b and the erasing head 10c.

As described above, in the present invention, the rotary encoder 12 (or 12(F) or 12(R)) either contacts the magnetic tape 1 in the tape path section between the magnetic head 10 and the take-up reel 3 (supply reel 2 upon feeding in the reverse direction), that is, in the section in which tension of a certain magnitude is obtained irrespective of the magnitude of back tension provided by the supply side reel, or contacts the magnetic tape 1 with the magnetic tape 1 held between the rotary encoder 12 and the pad 6. Consequently, a good contact condition (good in contact force and contact area) is obtained between the roller 12a of the rotary encoder 12 and the magnetic tape 1, and a slip can be eliminated from occurring between the roller 12a and the magnetic tape 1. Accordingly, accurate tape feeding speed information can be obtained.

Where, in addition to the arrangement and construction described above, the position at which the rotary encoder 12 is inserted into the tape cassette is set to a position in the proximity of one of the guide rollers 5 where good tape tension is obtained as in the arrangement 11, 12 or 16, a good contact condition can be obtained. Also where the rotary encoder 12 is inserted into the tape cassette between the recording/reproducing head 10b and the erasing head 10c as in the arrangement 17 described above, a good contact condition can be assured similarly.

It is to be noted that naturally the present invention can be applied not only to the arrangements described above but also to various arrangements and can be applied widely to recording apparatus constructed only for recording, reproducing apparatus constructed only for reproduction, recording and reproducing apparatus and so forth which use a recording medium such a compact cassette tape, a micro cassette tape, an open reel tape, a digital audio tape or the like.

Further, a recording and/or reproducing apparatus which uses an open reel tape may be constructed such that a pad for contacting the rear face of a tape is provided therein so as to cooperate with the roller of the rotary encoder to hold the tape between them.

As apparent from the foregoing description, a recording medium such as, for example, a compact cassette tape which is used in a recording and/or reproducing apparatus having no pinch roller and no capstan according to the present invention is compatible with a recording and/or reproducing apparatus of the capstan type and allows recording and reproducing operations with fidelity without any variation in frequency characteristic and signal to noise ratio from the start end to the terminal end thereof.

Further, since the calculations of various values in the first to eleventh embodiments are very simple calculations, the circuit configurations therefor can be realized readily with integrated circuits excepting the analog multipliers and dividers or by way of servo control employing a microcomputer.

Meanwhile, since the accuracy of the tape feeding speed which is controlled by such a servo system as in any of the first to eleventh embodiments depends upon the accuracy of the roller 12a and/or the rated period information $T_{o25}$ which makes a reference to calculation of the deviation d, the accuracy (for example, the temperature characteristics, part characteristics, operating voltage and so forth) of circuit elements from the waveform shaping circuit 50 to the motor servo circuit 28 both inclusive may be comparatively rough, and accordingly, there is an advantage In that the circuit elements can be constructed from simple and inexpensive circuits.

Further, while the gain coefficient K is used for calculation of the servo control value $L_N$ in the first to eleventh embodiments, by setting the gain coefficient K so that it may conform to various operation characteristics of the servo system and the mechanical driving system, a system free from servo oscillations and free from wow and flutter can be realized readily.

Further, in the first to eleventh embodiments, tape feeding speed information is obtained in units of a one rotation period of the roller 12. Consequently, even where the accuracy of the roller 12a (an eccentricity of the shaft portion 12a1, a molding error and a mounting error of the shutter plate 12b, a roundness error of the circumferential face of the roller 12a and so forth) is rather low, a possible influence of the rather low accuracy is cancelled, and accurate information (a one rotation period T) can be obtained as tape feeding direction information. Further, since a one rotation period is used as a unit, a large number of output pulses of the rotary encoder is not required, but outputting of only two pulses for one rotation is sufficient as in the embodiments described above. At least a pulse output of a cycle in one rotation should be obtained. Consequently, reduction in size and cost of a rotary encoder can be realized.

Furthermore, by varying the gain coefficient as described above, the reduction of the servo rise time to the rated speed and the enhancement in stability can be promoted.

It is to be noted that the present invention can be applied widely to recording apparatus constructed only for recording, reproducing apparatus constructed only for reproduction, recording and reproducing apparatus and so forth which conform to such recording media as a compact cassette tape, a micro cassette tape, an open reel tape and a digital audio tape.

Further, in the present invention, the rotary encoder 12 (or 12(F), 12(R)) contacts the magnetic tape 1 and/or cooperates with the pad 6 to hold the magnetic tape 1 between them in a section of the tape path between the magnetic head 10 and the take-up reel 3 (supply reel 2 during reverse feeding), that is, in a section of the tape path in which a certain tension of the magnetic tape 1 is obtained irrespective of the magnitude of back tension by the supply side reel. Accordingly, a good contact condition (a contact force and a contact area) is obtained between the roller 12a of the rotary encoder 12 and the magnetic tape 1, and such a situation that a slip occurs between the roller 12 and the tape 1 can be eliminated. Consequently, accurate information of the tape feeding speed can be obtained.

Furthermore, In addition to the arrangements and constructions described above, where the position at which the rotary encoder 12 is inserted into the tape cassette is set to a position In the proximity of the guide roller 5 where good tape tension is obtained as in the arrangement 11. 12 or 16 described above, a good contact condition can be obtained. A good contact condition can be obtained also where the rotary encoder 12 is inserted into the tape cassette between the recording/reproducing head 10b and the erasing head 10c as in the arrangement 17 described above.

Having now fully described the invention, it will be apparent to one of ordinary skill in the art that many changes and modifications can be made thereto without departing from the spirit and scope of the invention as set forth herein.

What is claimed is:

1. A recording and/or reproducing apparatus of a tape which has no capstan and no pinch roller, comprising:

reel driving means including a motor for driving a reel to rotate to perform a feeding operation of a recording medium in the form of a tape;

tape feeding speed detection means including a roller for contacting the recording medium so as to be rotated by the recording medium when the recording medium is fed;

rotation period measurement means for measuring a period of rotation of said roller of said tape feeding speed detection means;

deviation calculation means for calculating a deviation from a predetermined speed of the recording medium using a measured value from said rotation period measurement means;

constant generation means for generating a constant which defines a servo control output range corresponding to a rotational speed range of said motor of said reel driving means;

servo control value calculation means for calculating a servo control value, which increases in proportion to the rotational speed range of said motor of said reel driving means, using the deviation calculated by said deviation calculation means, the constant generated from said constant generation means, and a servo control value calculated in a last control cycle by said servo control value calculation means;

storage means for storing the servo control value output from said servo control value calculation means and supplying the stored servo control value as a servo control value in the last control cycle to said control value calculation means; and servo means for controlling a rotational speed of said motor of said reel driving means in response to the servo control value calculated by said servo control value calculation means so that a feeding speed of the recording medium may be equal to the predetermined speed, wherein said deviation calculation means includes first deviation calculation means for measuring a one rotation period of said roller of said tape feeding speed detection means and calculating a deviation from the predetermined speed of the recording medium using a measured value of the one rotation period, second deviation calculation means for measuring a 1/n rotation period of said roller of said tape feeding speed detection means and calculating a deviation from the predetermined speed of the recording medium using a measured value of the 1/n rotation period, change-over means for selectively switching between said first deviation calculation means and said second deviation calculation means, and one rotation detection means for detecting completion of one rotation of said roller after feeding of the recording medium is started, and wherein said one rotation detection means controls said changeover means to output the deviation from said second deviation means after feeding of the recording medium is started, and after said one rotation detection means detects completion of one rotation of said roller, said change-over means switches from said second deviation calculation means to said first deviation calculation means.

2. A recording and/or reproducing apparatus according to claim 1, wherein said rotation period measurement means includes period measurement means for measuring a 1/n rotation period of said roller, n being a natural number, period information storage means for storing the last n 1/n rotation period information values including a current 1/n rotation period information value output from said period measurement means, and one rotation period calculation means for calculating a one rotation period of said roller from the n 1/n rotation period information values stored in said period information storage means.

3. A controlling method for a reel motor of a recording and/or reproducing apparatus which includes no capstan and no pitch roller and wherein a rotatable roller contacts a recording medium in the form of a tape to measure a period of rotation of said roller and a reel is driven to rotate by a reel motor in accordance with the period of rotation thus measured, comprising the steps of:

measuring, upon the start of feeding of the tape, a 1/n rotation period T of said roller by rotation detection means, n being a natural number, and switching an effective servo system to a first servo system which calculated a first deviation d in accordance with the thus calculated 1/n rotation period;

servo controlling said reel motor in accordance with the thus calculated first deviation d;

determining whether said roller has rotated one rotation;

switching, in response to determination of one rotation of said roller, the effective servo system to a second serve system which calculates a second deviation d in accordance with a one rotation period measured by said rotation detection means; and servo controlling said reel motor in accordance with the thus calculated second deviation d.

4. A controlling method for a reel motor according to claim 3, wherein the step of servo controlling said reel motor in accordance with the first deviation d calculated in accordance with the 1/n rotation period includes the steps of;

measuring a 1/n rotation period T of said roller by said rotation detection means;

calculating the first deviation d from the 1/n rotation period T obtained at the measurement step and a predetermined rated period;

calculating a servo control value LN for a present control cycle from the thus calculated first deviation d, a gain coefficient K, a constant A, and a servo control value L in the last control cycle;

storing the thus calculated servo control value LN for the present control cycle as a servo control value L in the last control cycle;

converting the thus stored servo control value LN into a PWM signal; and controlling driving of said reel motor in response to the PWM signal obtained by the step of converting.

5. A controlling method for a reel motor according to claim 3, wherein the step of servo controlling said reel motor in accordance with the second deviation d calculated in accordance with the one rotation period includes the steps of:

measuring a one rotation period T of said roller by said rotation detection means;

calculating the second deviation d from the one rotation period T obtained at the measurement step and a predetermined rated period;

calculating a servo control value LN for a present control cycle from the thus calculated second deviation d, a gain coefficient K, a control constant A, and a servo control value L in the last control cycle;

storing the thus calculated servo control value LN for the present control cycle as a servo control value L in the last control cycle;

converting the thus stored servo control value LN into a PWM signal; and controlling driving of said reel motor in response to the PWM signal obtained by the step of converting.

* * * * *